(12) United States Patent
Vacquerie

(10) Patent No.: US 12,328,515 B2
(45) Date of Patent: Jun. 10, 2025

(54) IMAGE CAPTURE FLOWS

(71) Applicant: GoPro, Inc., San Mateo, CA (US)

(72) Inventor: Vincent Vacquerie, Longnes (FR)

(73) Assignee: GoPro, Inc., San Mateo, CA (US)

( * ) Notice: Subject to any disclaimer, the term of this patent is extended or adjusted under 35 U.S.C. 154(b) by 129 days.

(21) Appl. No.: 18/166,167

(22) Filed: Feb. 8, 2023

(65) Prior Publication Data

US 2023/0254593 A1    Aug. 10, 2023

Related U.S. Application Data

(60) Provisional application No. 63/308,176, filed on Feb. 9, 2022.

(51) Int. Cl.
| | |
|---|---|
| *H04N 23/80* | (2023.01) |
| *H04N 5/77* | (2006.01) |
| *H04N 5/91* | (2006.01) |
| *H04N 19/423* | (2014.01) |
| *H04N 23/698* | (2023.01) |
| *H04N 23/81* | (2023.01) |
| *H04N 23/85* | (2023.01) |

(52) U.S. Cl.
CPC .......... *H04N 23/815* (2023.01); *H04N 5/772* (2013.01); *H04N 5/91* (2013.01); *H04N 19/423* (2014.11); *H04N 23/698* (2023.01); *H04N 23/81* (2023.01); *H04N 23/85* (2023.01)

(58) Field of Classification Search
CPC ...... H04N 19/59; H04N 23/815; H04N 9/946; G06T 3/40; G06T 2207/10024; G06T 2207/20208; G06T 5/50
USPC ...................................... 361/679.01; 396/374
See application file for complete search history.

(56) References Cited

U.S. PATENT DOCUMENTS

| | | | |
|---|---|---|---|
| 2013/0215291 A1* | 8/2013 | Baek ..................... | H04N 19/426 348/231.99 |
| 2020/0053356 A1* | 2/2020 | Mao ...................... | H04N 19/149 |
| 2021/0073956 A1* | 3/2021 | Guerin ...................... | G06T 5/50 |

* cited by examiner

*Primary Examiner* — Xi Wang
(74) *Attorney, Agent, or Firm* — Young Basile Hanlon & MacFarlane, P.C.

(57) ABSTRACT

Image processing using various video and still flows is described. The resolution and bit depth at each stage of the image processing are described. In some examples, image scalers are used to resize image resolution. In some examples, a warp engine is used to distort per frame images to apply image stabilization, zoom, or a user digital lens. An image processing pipeline includes a double data rate (DDR) memory buffer that supports lossy compression with a constant 50% compression. In some examples, the image processing pipeline includes a DDR memory buffer that is uncompressed.

20 Claims, 34 Drawing Sheets

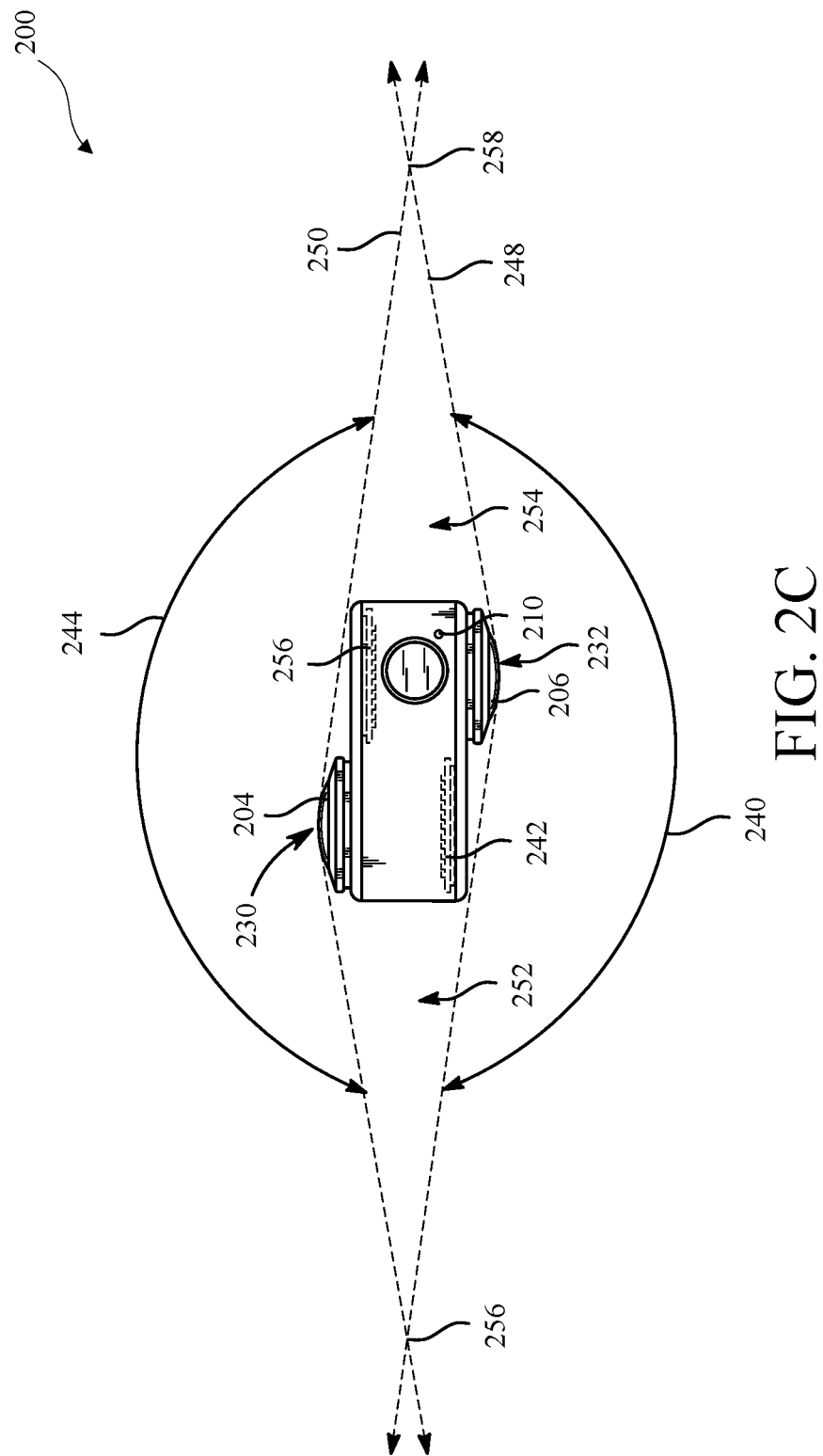

IMAGE CAPTURE FLOWS

CROSS-REFERENCE TO RELATED APPLICATION(S)

This application claims priority to and the benefit of U.S. Provisional Application Patent Ser. No. 63/308,176, filed Feb. 9, 2022, the entire disclosure of which is hereby incorporated by reference.

TECHNICAL FIELD

This disclosure relates to image processing.

SUMMARY

Disclosed herein are implementations for video and still flows for image capture devices, including spherical image capture devices. In addition, some implementations display a preview on a display of the image capture device while simultaneously processing high resolution raw images.

An aspect includes a method for use in an image capture device. The method may include obtaining first video data from an image sensor. The method may include performing raw processing on the first video data to obtain Bayer video data. The method may include performing RGB processing on the Bayer video data to obtain high dynamic range (HDR) video data. The method may include performing YUV processing on the HDR video data to obtain high resolution YUV video data and low resolution YUV video data. The method may include storing the high resolution YUV video data in a first double data rate (DDR) memory buffer. The method may include storing the low resolution YUV video data in a second DDR memory buffer. The method may include performing delayed processing on the high resolution YUV video data to obtain second video data to store in a memory. The method may include performing live processing on the low resolution YUV video data to obtain third video data to display on a display of the image capture device.

An aspect includes an image capture device. The image capture device includes an image sensor, a first DDR memory buffer, a second DDR memory buffer, and a processor. The image sensor may be configured to obtain first video data. The processor may be configured to obtain the first video data from the image sensor. The processor may be configured to process the first video data to obtain high resolution YUV video data and low resolution YUV video data. The first DDR memory buffer may be configured to store the high resolution YUV video data. The second DDR memory buffer may be configured to store the low resolution YUV video data. The processor may be further configured to obtain the low resolution YUV video data from the second DDR memory buffer. The processor may be further configured to warp the low resolution YUV video data to obtain warped video data. The processor may be further configured to scale the warped video data to obtain scaled video data. The processor may be further configured to output the scaled video data to a display of the image capture device.

An aspect includes a non-transitory computer-readable medium that has instructions stored on a memory, that when executed by a processor, cause the processor to perform operations. The operations may include obtaining first video data from an image sensor. The operations may include performing raw processing on the first video data to obtain Bayer video data. The operations may include performing RGB processing on the Bayer video data to obtain HDR video data. The operations may include performing YUV processing on the HDR video data to obtain high resolution YUV video data and low resolution YUV video data. The operations may include storing the high resolution YUV video data in a first DDR memory buffer. The operations may include storing the low resolution YUV video data in a second DDR memory buffer. The operations may include performing delayed processing on the high resolution YUV video data to obtain second video data to store in a memory. Performing the delayed processing may include obtaining the high resolution YUV video data from the first DDR memory buffer. Performing the delayed processing may include warping the high resolution YUV video data to obtained warped video data. Performing the delayed processing may include performing a noise reduction on the warped video data to obtain denoised video data. Performing the delayed processing may include scaling the denoised video data to obtain scaled video data. Performing the delayed processing may include encoding the scaled video data.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 2C is a top view of the image capture apparatus of FIGS. 2A-B.

DETAILED DESCRIPTION

Disclosed herein are implementations for video and still flows for image capture devices, including spherical image capture devices. In particular, the resolution and/or bit depth at each stage of image processing are disclosed along with how each output is connected. In addition, some implementations display a preview on a display of the image capture device while simultaneously processing high resolution raw images.

Figure 1A:
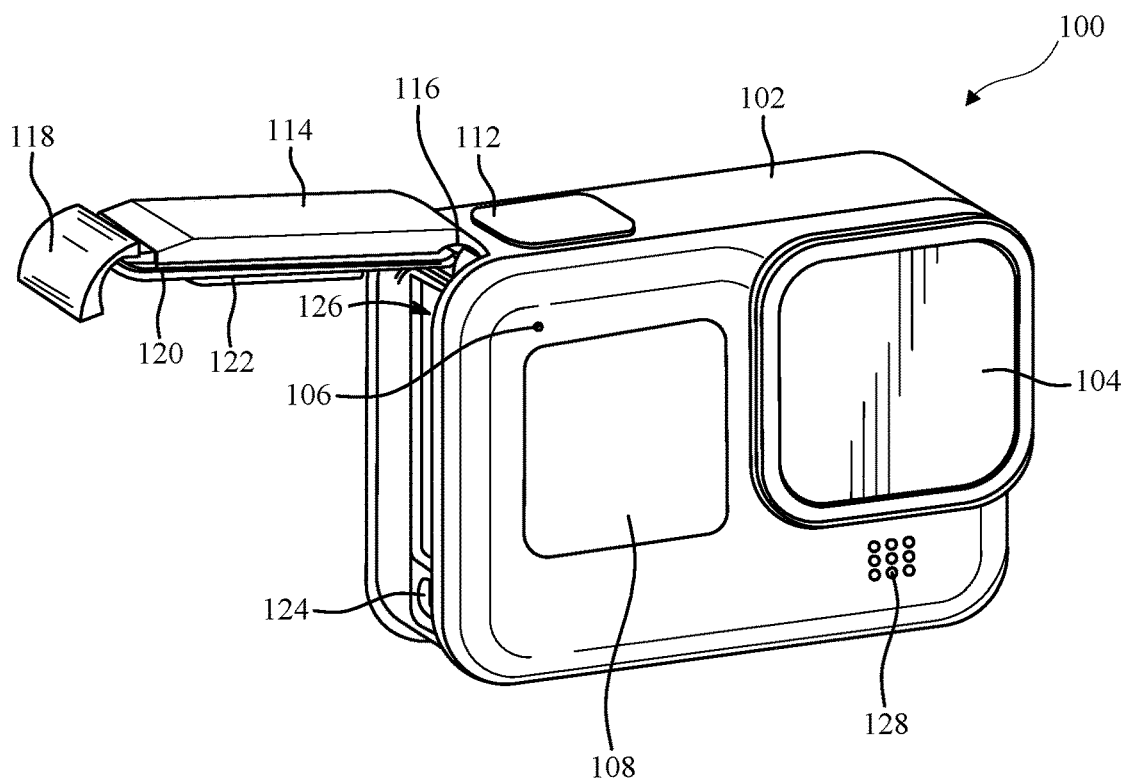
FIGS. 1A-B are isometric views of an example of an image capture apparatus.
Figure 1B:
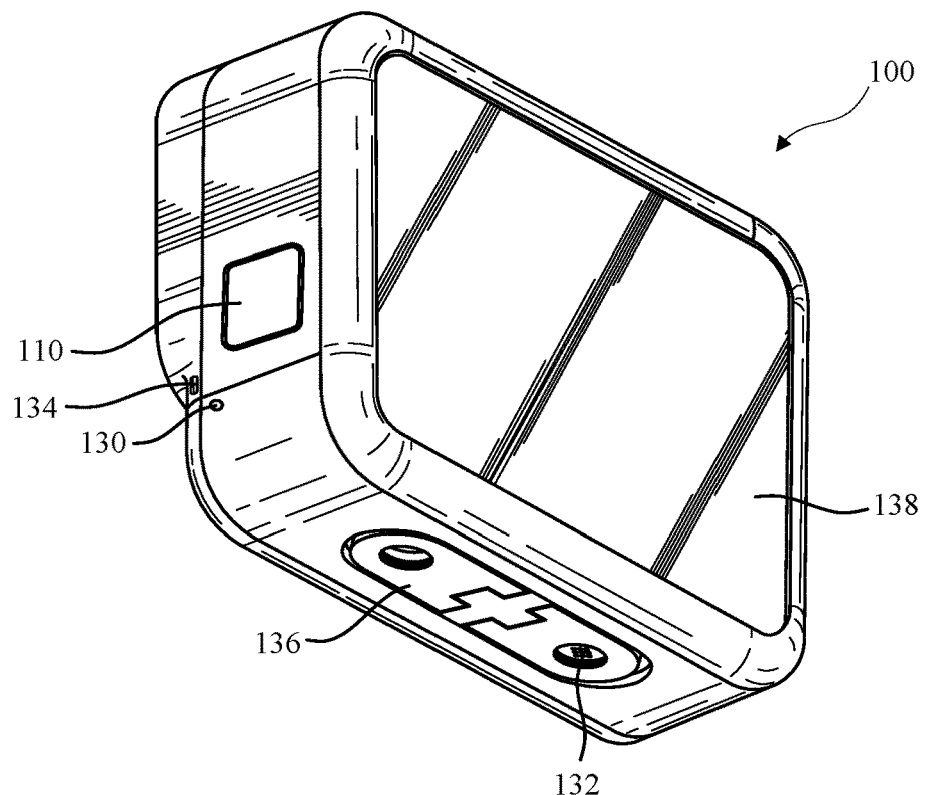
Figure 3:
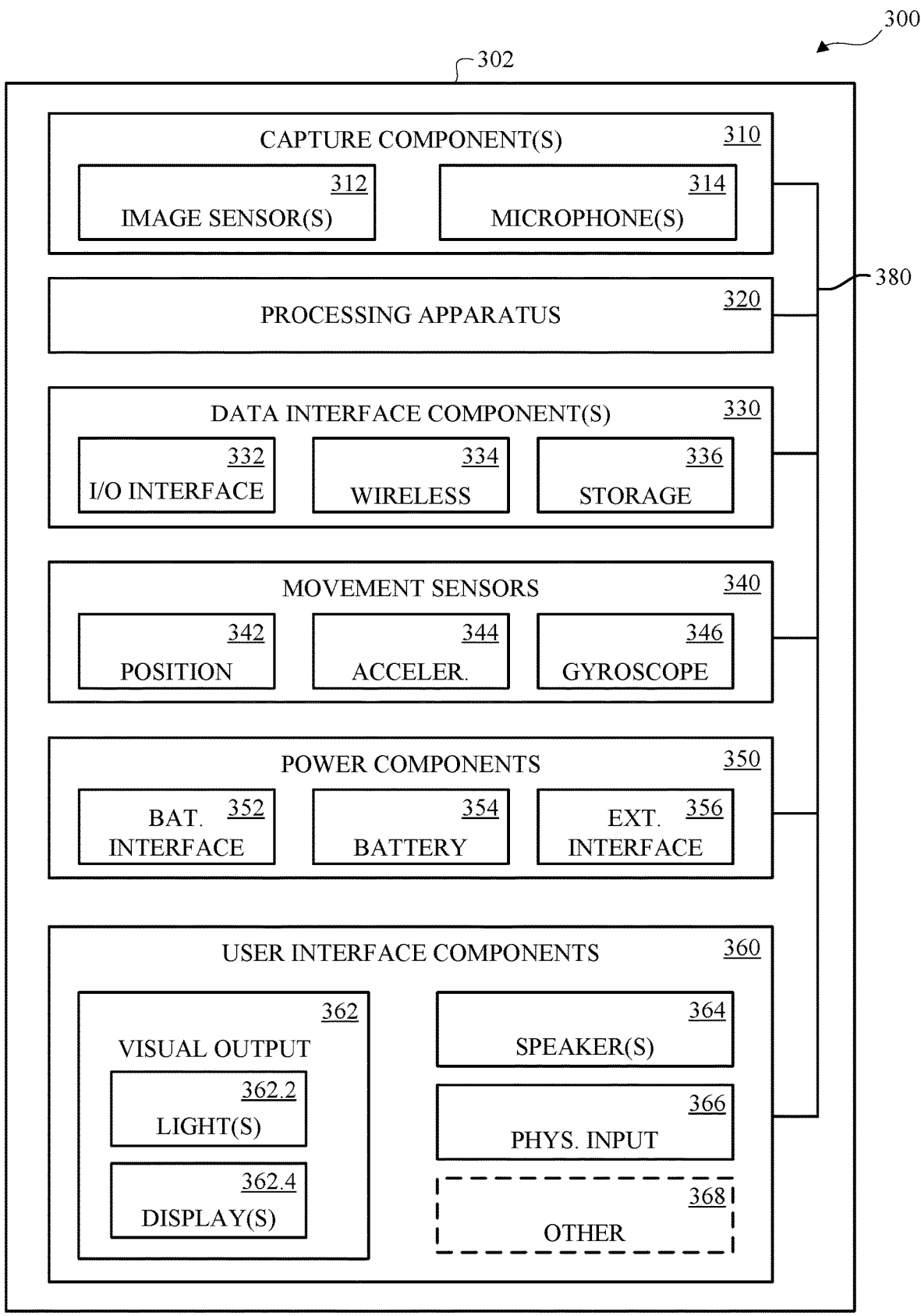
FIG. 3 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 136, an interconnect mechanism 138, and a display 140. Although not expressly shown in FIG. 1, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used.

As shown in FIG. 1A, the image capture apparatus 100 includes the image capture device 104 structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. Although one display 108 is shown in FIG. 1A, the image capture apparatus 100 may include multiple displays, which may be structured on respective surfaces of the body 102. In some implementations, the display 108 may be omitted or combined with another component of the image capture apparatus 100.

As shown in FIG. 1B, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1B, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. Although described as a button, the shutter button 112 may be another type of input device, such as a switch, a toggle, a slider, or a dial. Although one shutter button 112 is shown in FIG. 1A, the image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1A, the image capture apparatus 100 includes the door 114 coupled to the body 102, such as using the hinge mechanism 116. The door 114 may be secured to the body 102 using the latch mechanism 118 that releasably engages the body 102 at a position generally opposite the hinge mechanism 116. As shown in FIG. 1A, the door 114 includes the seal 120 and the battery interface 122. Although one door 114 is shown in FIG. 1A, the image capture apparatus 100 may include multiple doors respectively forming respective surfaces of the body 102, or portions thereof. Although not shown in FIGS. 1A-B, the door 114 may be removed from the body 102 by releasing the latch mechanism 118 from the body 102 and decoupling the hinge mechanism 116 from the body 102.

In FIG. 1A, the door 114 is shown in an open position such that the data interface 124 is accessible for communicating with external devices and the battery receptacle 126 is accessible for placement or replacement of a battery (not shown).

In FIG. 1B, the door 114 is shown in a closed position. In implementations in which the door 114 is in the closed position the seal 120 engages a flange (not shown) to provide an environmental seal. In implementations in which the door 114 is in the closed position the battery interface 122 engages the battery to secure the battery in the battery receptacle 126.

As shown in FIG. 1A, the image capture apparatus 100 includes the battery receptacle 126 structured to form a portion of an interior surface of the body 102. The battery receptacle 126 includes operative connections (not shown) for power transfer between the battery and the image capture apparatus 100. In some implementations, the battery receptacle 126 may be omitted. Although one battery receptacle 126 is shown in FIG. 1A, the image capture apparatus 100 may include multiple battery receptacles.

As shown in FIG. 1A, the image capture apparatus 100 includes a first microphone 128 structured on a front surface of the body 102. As shown in FIG. 1A, the image capture apparatus 100 includes a second microphone 130 structured on a top surface of the body 102. As shown in FIG. 1B, the image capture apparatus 100 includes the drain microphone 132 structured on a side surface of the body 102. The drain microphone 132 is a microphone located behind a drain cover, including a drainage channel 134 for draining liquid from audio components of the image capture apparatus 100, including the drain microphone 132. The image capture apparatus 100 may include other microphones (not shown) on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 136 structured on a bottom surface of the body 102. The speaker 136 outputs or presents audio, such as by playing back recorded audio or emitting sounds associated with notifications. Although one speaker 136 is shown in FIG. 1B, the image capture apparatus 100 may include multiple speakers structured on respective surfaces of the body 102.

As shown in FIG. 1B, the image capture apparatus 100 includes the interconnect mechanism 138 structured on a bottom surface of the body 102. The interconnect mechanism 138 removably connects the image capture apparatus 100 to an external structure, such as a handle grip, another mount, or a securing device. As shown in FIG. 1B, the interconnect mechanism 138 includes folding protrusions configured to move between a nested or collapsed position as shown in FIG. 1B and an extended or open position (not shown in FIG. 1B). The folding protrusions of the interconnect mechanism 138 shown in the collapsed position in FIG. 1B may be similar to the folding protrusions of the interconnect mechanism 214 shown in the extended or open position in FIGS. 2A-2B, except as is described herein or as is otherwise clear from context. The folding protrusions of the interconnect mechanism 138 in the extended or open position may be coupled to reciprocal protrusions of other devices such as handle grips, mounts, clips, or like devices. Although one interconnect mechanism 138 is shown in FIG. 1B, the image capture apparatus 100 may include multiple interconnect mechanisms structured on, or forming a portion of, respective surfaces of the body 102. In some implementations, the interconnect mechanism 138 may be omitted.

As shown in FIG. 1B, the image capture apparatus 100 includes the display 140 structured on, and forming a portion of, a rear surface of the body 102. The display 140 outputs, such as presents or displays, such as by emitting visible light, data, such as to show image information such as image previews, live video capture, or status information such as battery life, camera mode, elapsed time, and the like. In some implementations, the display 140 may be an interactive display, which may receive, detect, or capture input, such as user input representing user interaction with the image capture apparatus 100. Although one display 140 is shown in FIG. 1B, the image capture apparatus 100 may include multiple displays structured on respective surfaces of the body 102. In some implementations, the display 140 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100.

Although not shown in FIGS. 1A-1B, the image capture apparatus 100 may communicate with an external device, such as an external user interface device (not shown), via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link. The external device may store, process, display, or combination thereof, the images. The external user interface device may be a computing device, such as a smartphone, a tablet computer, a phablet, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 26:
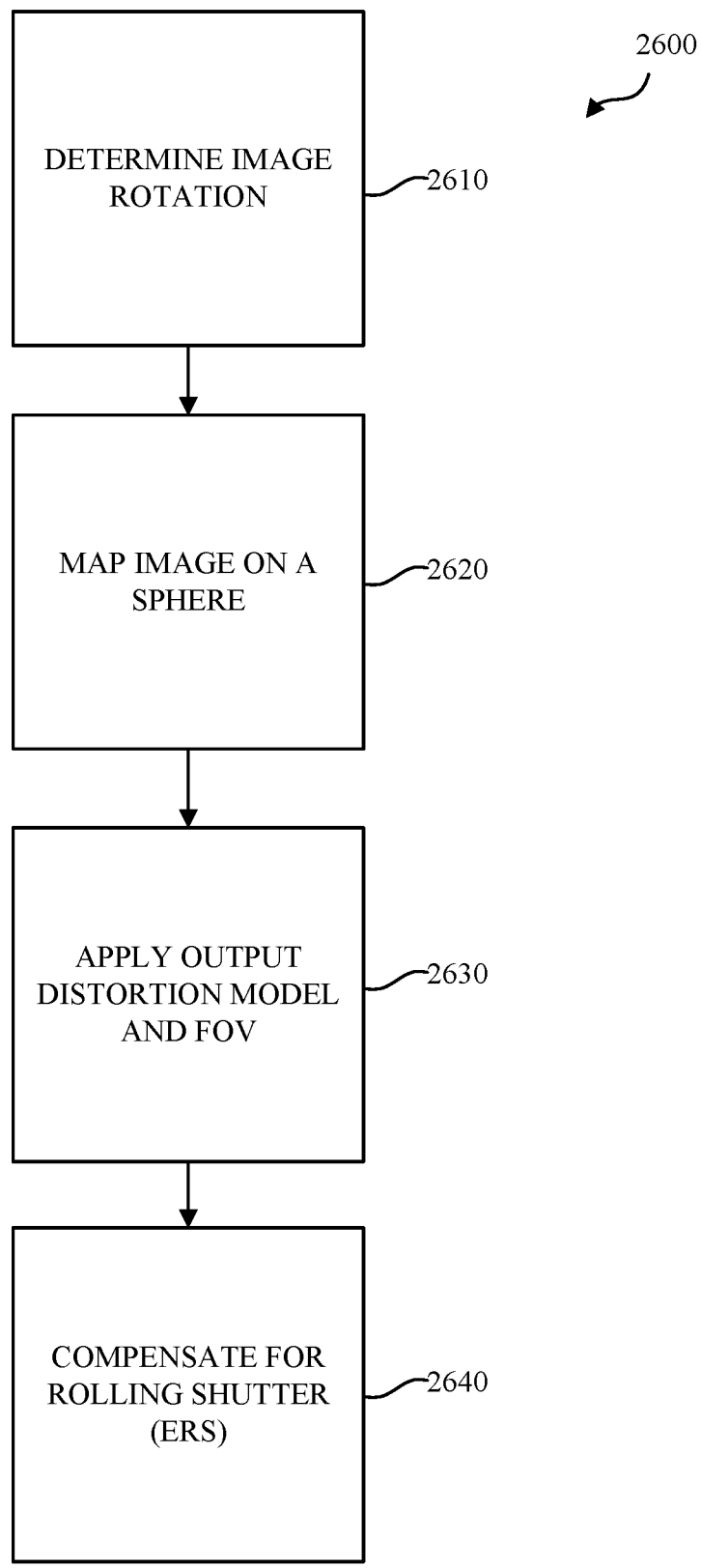
FIG. 26 is a flow chart of an example of a method for a digital lens.
Figure 27:
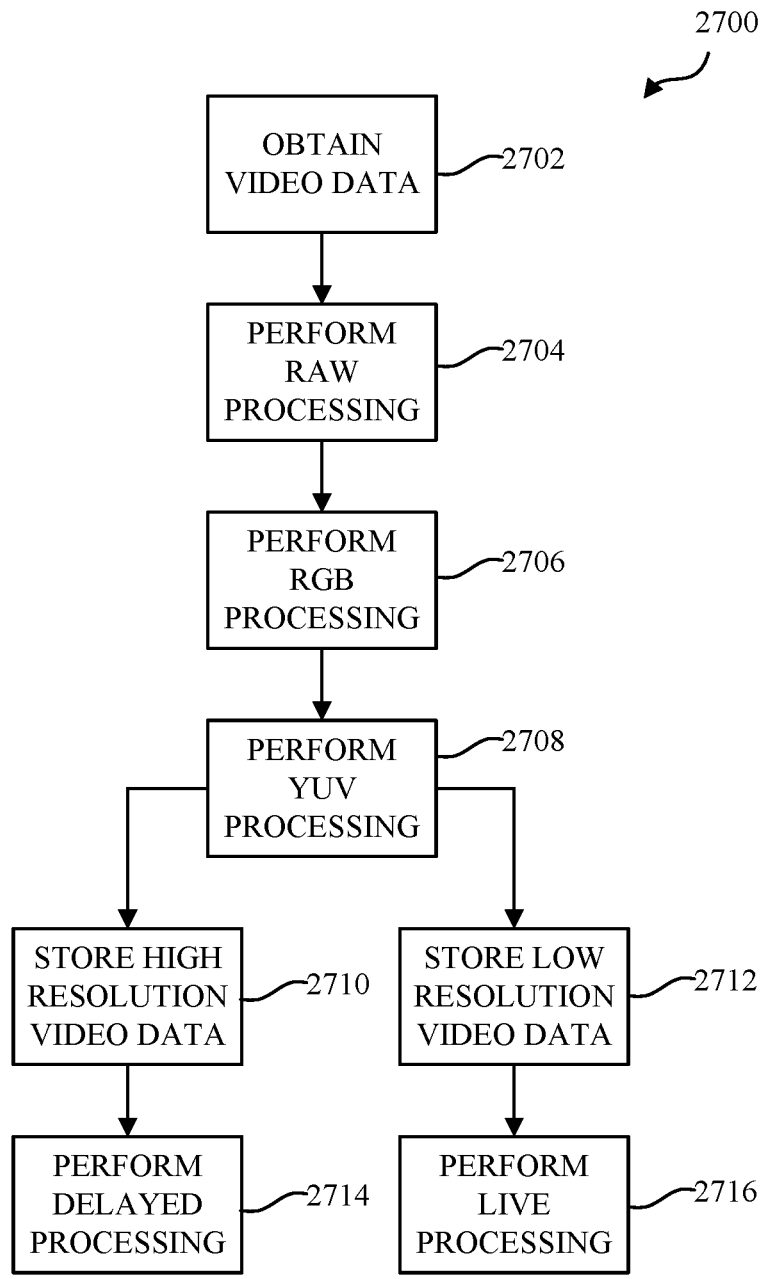
FIG. 27 is a flow diagram of an example of a method for use in an image capture device for common processing.
Figure 28:
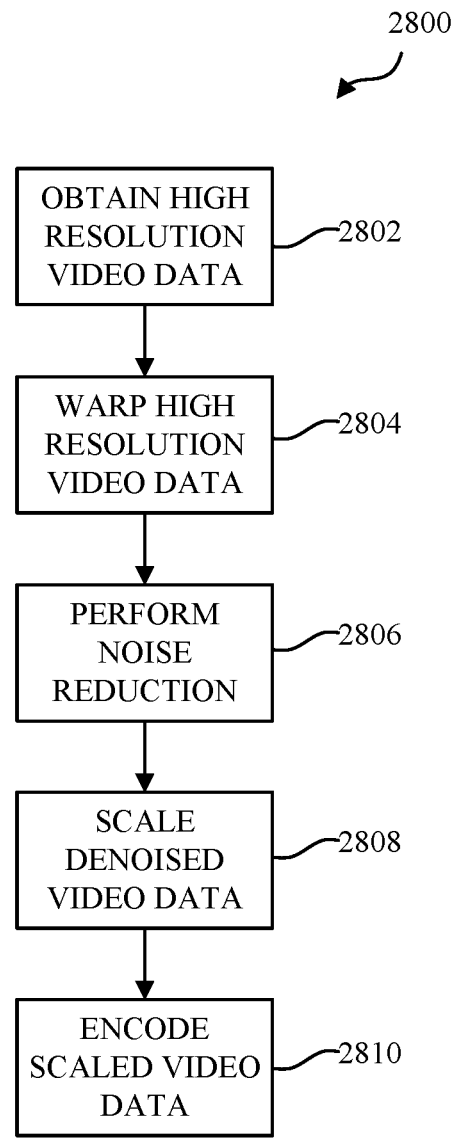
FIG. 28 is a flow diagram of an example of a method for use in an image capture device for delayed processing.
Figure 29:
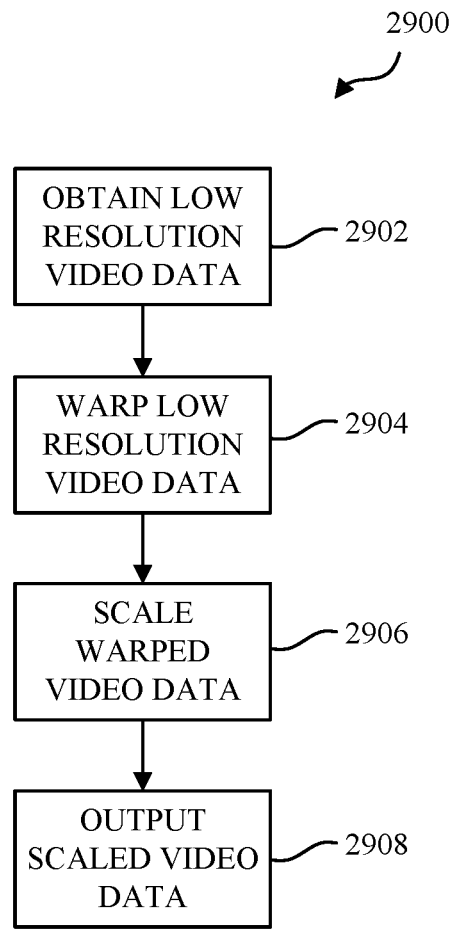
FIG. 29 is a flow diagram of an example of a method for use in an image capture device for live processing.

The image capture apparatus 100 may be used to implement some or all of the techniques described in this disclosure, such as the technique 2600 described in FIG. 26, technique 2700 described in FIG. 27, technique 2800 described in FIG. 28, or technique 2900 described in FIG. 29, for example.

Figure 2A:
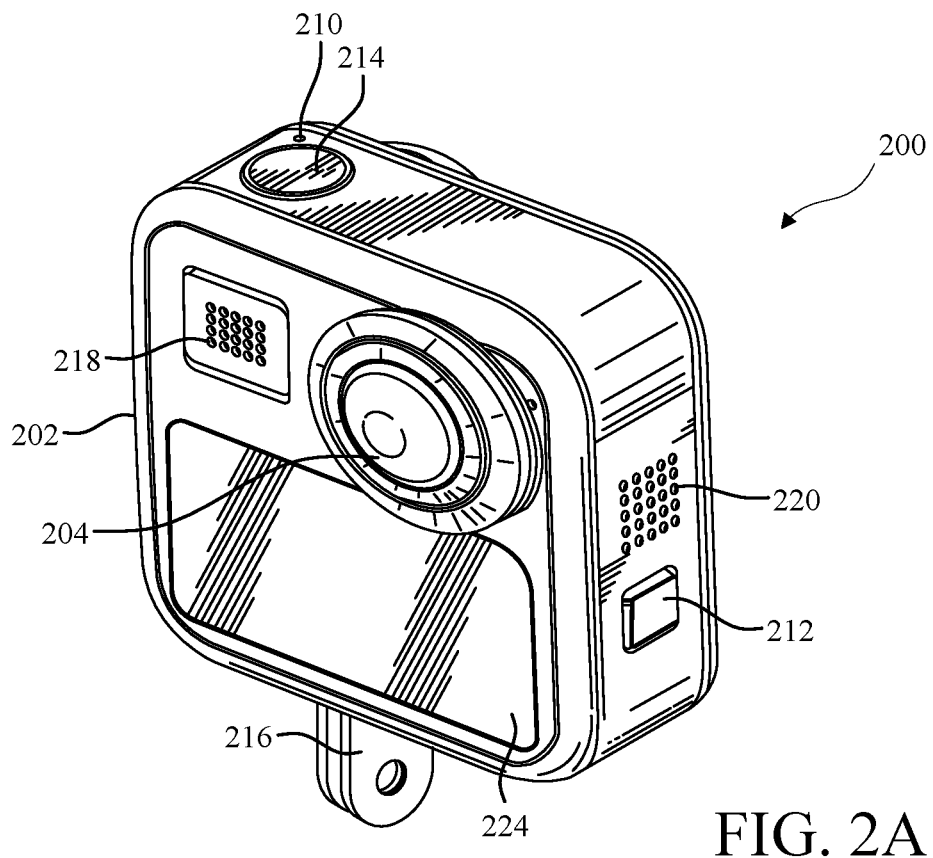
FIGS. 2A-B are isometric views of another example of an image capture apparatus.
Figure 2B:
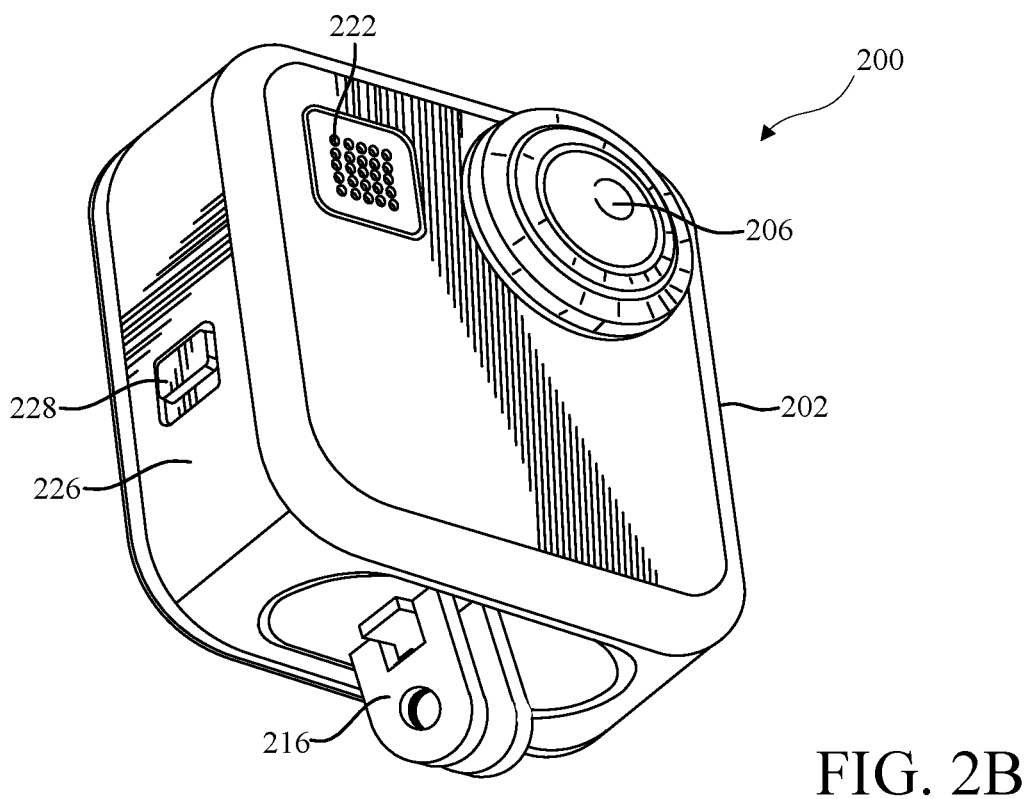

FIGS. 2A-2B illustrate another example of an image capture apparatus 200. The image capture apparatus 200 is similar to the image capture apparatus 100 shown in FIGS. 1A-B, except as is described herein or as is otherwise clear from context. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used, except as is described herein or as is otherwise clear from context.

The body 202 of the image capture apparatus 200 may be similar to the body 102 shown in FIGS. 1A-1B, except as is described herein or as is otherwise clear from context.

As shown in FIG. 2A, the image capture apparatus 200 includes the first image capture device 204 structured on a front surface of the body 202. The first image capture device 204 includes a first lens. The first image capture device 204 may be similar to the image capture device 104 shown in FIG. 1A, except as is described herein or as is otherwise clear from context. As shown in FIG. 2B, the image capture apparatus 200 includes the second image capture device 206 structured on a rear surface of the body 202. The second image capture device 206 includes a second lens. The second image capture device 206 may be similar to the image capture device 104 shown in FIG. 1A, except as is described herein or as is otherwise clear from context. The image capture devices 204, 206 are disposed on opposing surfaces of the body 202, for example, in a back-to-back configuration, Janus configuration, or offset Janus configuration. Although two image capture devices 204, 206 are shown in FIGS. 2A-2B, the image capture apparatus 200 may include other image capture devices structured on respective surfaces of the body 202.

As shown in FIG. 2A, the image capture apparatus 200 includes the indicators 208 structured on a top surface of the body 202. The indicators 208 may be similar to the indicator 106 shown in FIG. 1A, except as is described herein or as is otherwise clear from context. For example, one of the indicators 208 may indicate a status of the first image capture device 204 and another one of the indicators 208 may indicate a status of the second image capture device 206. Although two indicator 208 are shown in FIGS. 2A-2B, the image capture apparatus 200 may include other indictors structured on respective surfaces of the body 202.

As shown in FIGS. 2A-B, the image capture apparatus 200 includes input mechanisms including a mode button 210, structured on a side surface of the body 202, and a shutter button 212, structured on a top surface of the body 202. The mode button 210 may be similar to the mode button 110 shown in FIG. 1B, except as is described herein or as is otherwise clear from context. The shutter button 212 may be similar to the shutter button 112 shown in FIG. 1A, except as is described herein or as is otherwise clear from context.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanism 214 structured on a bottom surface of the body 202. The interconnect mechanism 214 may be similar to the interconnect mechanism 138 shown in FIG. 1B, except as is described herein or as is otherwise clear from context. For example, the interconnect mechanism 138 shown in FIG. 1B is shown in the nested or collapsed position and the interconnect mechanism 214 shown in FIGS. 2A-2B are shown in an extended or open position.

As shown in FIG. 2A, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 136 shown in FIGS. 1A-1B, except as is described herein or as is otherwise clear from context. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts. As shown in FIG. 2A, a first audio component 218 is located on a front surface of the body 202. As shown in FIG. 2B, a second audio component 220 is located on a side surface of the body 202, and a third audio component 222 is located on a back surface of the body 202. Other numbers and configurations for the audio components may be used.

As shown in FIG. 2A, the image capture apparatus 200 includes the display 224 structured on a front surface of the body 202. The display 224 may be similar to the displays 108, 140 shown in FIGS. 1A-1B, except as is described herein or as is otherwise clear from context. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. Although one display 224 is shown in FIG. 2A, the image capture apparatus 200 may include multiple displays structured on respective surfaces of the body 202. In some implementations, the display 224 may be omitted or combined with another component of the image capture apparatus 200.

As shown in FIG. 2A, the image capture apparatus 200 includes the door 226 structured on, or forming a portion of, the side surface of the body 202. The door 226 may be similar to the door 114 shown in FIG. 1A, except as is described herein or as is otherwise clear from context. For example, the door 226 shown in FIG. 2A includes a release mechanism 228. The release mechanism 228 may include a latch, a button, or another mechanism configured to receive a user input that allows the door 226 to change position. The release mechanism 228 may be used to open the door 226 for a user to access a battery, a battery receptacle, an I/O interface, a memory card interface, etc. (not shown).

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

FIG. 2C is a top view of the image capture apparatus 200 of FIGS. 2A-2B. For simplicity, some features, or components of the image capture apparatus 200 shown in FIGS. 2A-2B are omitted from FIG. 2C.

As shown in FIG. 2C, the first image capture device 204 includes a first lens 230 and the second image capture device 206 includes a second lens 232. The image capture apparatus 200 captures spherical images. For example, the first image capture device 204 may capture a first image, such as a first hemispheric, or hyper-hemispherical, image, the second image capture device 206 may capture a second image, such as a second hemispheric, or hyper-hemispherical, image, and the image capture apparatus 200 may generate a spherical image incorporating or combining the first image and the second image, which may be captured concurrently, or substantially concurrently.

The first image capture device 204 defines a first field-of-view 240 wherein the first lens 230 of the first image capture device 204 receives light. The first lens 230 directs the received light corresponding to the first field-of-view 240 onto a first image sensor 242 of the first image capture device 204. For example, the first image capture device 204 may include a first lens barrel (not expressly shown), extending from the first lens 230 to the first image sensor 242.

The second image capture device 206 defines a second field-of-view 244 wherein the second lens 232 receives light. The second lens 232 directs the received light corresponding to the second field-of-view 244 onto a second image sensor 246 of the second image capture device 206. For example, the second image capture device 206 may include a second lens barrel (not expressly shown), extending from the second lens 232 to the second image sensor 246.

A boundary 248 of the first field-of-view 240 is shown using broken directional lines. A boundary 250 of the second field-of-view 244 is shown using broken directional lines. As shown, the image capture devices 204, 206 are arranged in a back-to-back (Janus) configuration such that the lenses 230, 232 face in generally opposite directions, such that the image capture apparatus 200 may capture spherical images. The first image sensor 242 captures a first hyper-hemispherical image plane from light entering the first lens 230. The second image sensor 246 captures a second hyper-hemispherical image plane from light entering the second lens 232.

As shown in FIG. 2C, the fields-of-view 240, 244 partially overlap such that the combination of the fields-of-view 240, 244 form a spherical field-of-view, except that one or more uncaptured areas 252, 254 may be outside of the fields-of-view 240, 244 of the lenses 230, 232. Light emanating from or passing through the uncaptured areas 252, 254, which may be proximal to the image capture apparatus 200, may be obscured from the lenses 230, 232 and the corresponding image sensors 242, 246, such that content corresponding to the uncaptured areas 252, 254 may be omitted from images captured by the image capture apparatus 200. In some implementations, the image capture devices 204, 206, or the lenses 230, 232 thereof, may be configured to minimize the uncaptured areas 252, 254.

Examples of points of transition, or overlap points, from the uncaptured areas 252, 254 to the overlapping portions of the fields-of-view 240, 244 are shown at 256, 258.

Images contemporaneously captured by the respective image sensors 242, 246 may be combined to form a combined image, such as a spherical image. Generating a combined image may include correlating the overlapping regions captured by the respective image sensors 242, 246, aligning the captured fields-of-view 240, 244, and stitching the images together to form a cohesive combined image. Stitching the images together may include correlating the overlap points 256, 258 with respective locations in corresponding images captured by the image sensors 242, 246. Although a planar view of the fields-of-view 240, 244 is shown in FIG. 2C, the fields-of-view 240, 244 are hyper-hemispherical.

A change in the alignment, such as position, tilt, or a combination thereof, of the image capture devices 204, 206, such as of the lenses 230, 232, the image sensors 242, 246, or both, may change the relative positions of the respective fields-of-view 240, 244, may change the locations of the overlap points 256, 258, such as with respect to images captured by the image sensors 242, 246, and may change the uncaptured areas 252, 254, which may include changing the uncaptured areas 252, 254 unequally.

Incomplete or inaccurate information indicating the alignment of the image capture devices 204, 206, such as the locations of the overlap points 256, 258, may decrease the accuracy, efficiency, or both of generating a combined image. In some implementations, the image capture apparatus 200 may maintain information indicating the location and orientation of the image capture devices 204, 206, such as of the lenses 230, 232, the image sensors 242, 246, or both, such that the fields-of-view 240, 244, the overlap points 256, 258, or both may be accurately determined, which may improve the accuracy, efficiency, or both of generating a combined image.

The lenses 230, 232 may be aligned along an axis (not shown), laterally offset from each other, off-center from a central axis of the image capture apparatus 200, or laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture apparatus 200 may be close to the length of a single lens barrel as opposed to twice the length of a single lens barrel as in a back-to-back lens configuration. Reducing the lateral distance between the lenses 230, 232 may improve the overlap in the fields-of-view 240, 244, such as by reducing the uncaptured areas 252, 254.

Images or frames captured by the image capture devices 204, 206 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 256, 258, may be matched accurately to minimize boundary discontinuities.

The image capture device 200 may be used to implement some or all of the techniques described in this disclosure, such as the technique 2600 described in FIG. 26, technique 2700 described in FIG. 27, technique 2800 described in FIG. 28, or technique 2900 described in FIG. 29, for example.

FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-B, or the image capture apparatus 200 shown in FIGS. 2A-C, may be implemented as shown in FIG. 3, except as is described herein or as is otherwise clear from context.

The image capture apparatus 300 includes a body 302. The body 302 may be similar to the body 102 shown in FIGS. 1A-1B, or the body 202 shown in FIGS. 2A-B, except as is described herein or as is otherwise clear from context. The body 302 includes electronic components such as capture components 310, processing components 320, data interface components 330, spatial sensors 340, power components 350, user interface components 360, and a bus 370.

The capture components 310 include an image sensor 312 for capturing images. Although one image sensor 312 is shown in FIG. 3, the capture components 310 may include multiple image sensors. The image sensor 312 may be similar to the image sensors 242, 246 shown in FIG. 2C, except as is described herein or as is otherwise clear from context. The image sensor 312 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 312 detects light, such as within a defined spectrum, such as the visible light spectrum or the infrared spectrum, incident through a corresponding lens such as the lens 230 with respect to the image sensor 242 as shown in FIG. 2C or the lens 232 with respect to the image sensor 246 as shown in FIG. 2C. The image sensor 312 captures detected light as image data and conveys the captured image data as electrical signals (image signals or image data) to the other components of the image capture apparatus 300, such as to the processing components 320, such as via the bus 370.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIGS. 1A-1B or the audio components 218, 220, 222 shown in FIGS. 2A-2B, except as is described herein or as is otherwise clear from context.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 370. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include executable instructions and data that can be accessed by the processing components 320.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1A, except as is described herein or as is otherwise clear from context.

The wireless data interface 334 may send, receive, or both, wireless electronic communications signals. The wireless data interface 334 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1A, except as is described herein or as is otherwise clear from context.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1A, except as is described herein or as is otherwise clear from context.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1A, except as is described herein or as is otherwise clear from context. The external power interface 356 obtains or receives power from an external source, such as a wall plug or external battery, and distributes the power to the components of the image capture apparatus 300, which may include distributing power to the battery 354 via battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 362.2, such as a light, and a display 362.4. The indicator 362.2 may be similar to the indicator 106 shown in FIG. 1A or the indicators 208 shown in FIG. 2A, except as is described herein or as is otherwise clear from context. The display 362.4 may be similar to the display 108 shown in FIG. 1A, the display 140 shown in FIG. 1B, or the display 224 shown in FIG. 2A, except as is described herein or as is otherwise clear from context. Although the visual output components 362 are shown in FIG. 3 as including one indicator 362.2, the visual output components 362 may include multiple indicators. Although the visual output components 362 are shown in FIG. 3 as including one display 362.4, the visual output components 362 may include multiple displays. In some implementations, one or more of the indicator 362.2 or the display 362.4 may be omitted or combined.

As shown in FIG. 3, the user interface components 360 include a speaker 364. The speaker 364 may be similar to the speaker 136 shown in FIG. 1B or the audio components 218, 220, 222 shown in FIGS. 2A-B, except as is described herein or as is otherwise clear from context. Although one speaker 364 is shown in FIG. 3, the user interface components 360 may include multiple speakers. In some implementations, the speaker 364 may be omitted or combined with another component of the image capture apparatus 300, such as the microphone 314.

As shown in FIG. 3, the user interface components 360 include a physical input interface 366. The physical input interface 366 may be similar to the shutter button 112 shown in FIG. 1A, the mode button 110 shown in FIG. 1B, the shutter button 212 shown in FIG. 2A, or the mode button 210 shown in FIG. 2B, except as is described herein or as is otherwise clear from context. Although one physical input interface 366 is shown in FIG. 3, the user interface components 360 may include multiple physical input interfaces. In some implementations, the physical input interface 366 may be omitted or combined with another component of the image capture apparatus 300. The physical input interface 366 may be, for example, a button, a toggle, a switch, a dial, or a slider.

As shown in FIG. 3, the user interface components 360 include a broken line border box labeled "other" 368, to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

The image capture device 300 may be used to implement some or all of the techniques described in this disclosure, such as the technique 2600 described in FIG. 26, technique 2700 described in FIG. 27, technique 2800 described in FIG. 28, or technique 2900 described in FIG. 29, for example.

Figure 4:
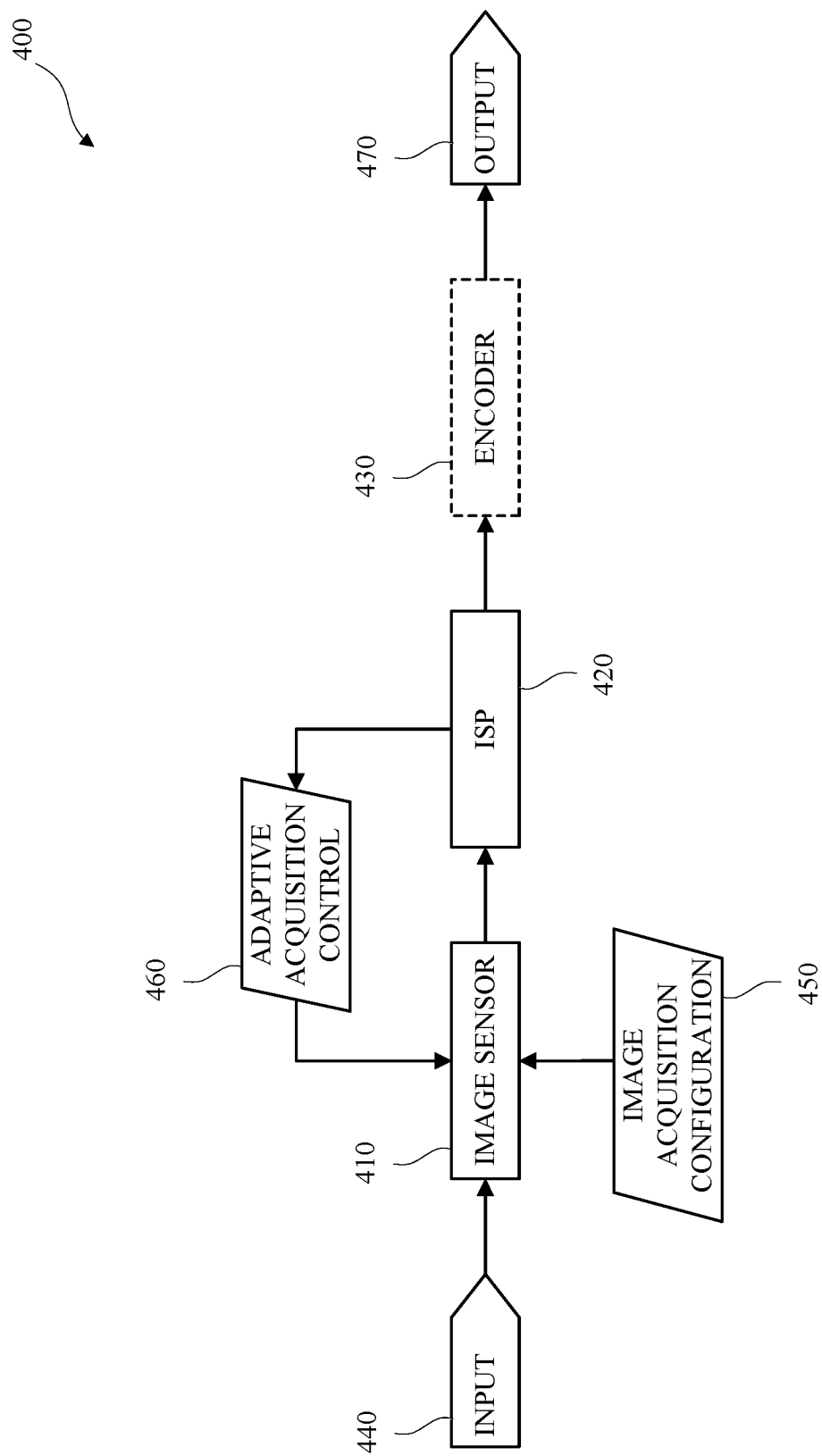
FIG. 4 is a flow diagram of an example of an image processing pipeline.

FIG. 4 is a block diagram of an example of an image processing pipeline 400. The image processing pipeline 400, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, or another image capture apparatus. In some implementations, the image processing pipeline 400 may be implemented in a digital signal processor (DSP), an application-specific integrated circuit (ASIC), or a combination of a digital signal processor and an application-specific integrated circuit. One or more components of the pipeline 400 may be implemented in hardware, software, or a combination of hardware and software.

As shown in FIG. 4, the image processing pipeline 400 includes an image sensor 410, an image signal processor (ISP) 420, and an encoder 430. The encoder 430 is shown with a broken line border to indicate that the encoder may be omitted, or absent, from the image processing pipeline 400. In some implementations, the encoder 430 may be included in another device. In implementations that include the encoder 430, the image processing pipeline 400 may be an image processing and coding pipeline. The image processing pipeline 400 may include components other than the components shown in FIG. 4. In some implementations, the ISP 420 and/or the encoder 430 may be implemented on a system on a chip (SOC).

The image sensor 410 receives input 440, such as photons incident on the image sensor 410. The image sensor 410 captures image data (source image data). Capturing source image data includes measuring or sensing the input 440, which may include counting, or otherwise measuring, photons incident on the image sensor 410, such as for a defined temporal duration or period (exposure). Capturing source image data includes converting the analog input 440 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 410 is shown in FIG. 4, the image processing pipeline 400 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 410 obtains image acquisition configuration data 450. The image acquisition configuration data 450 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 450 may include receiving the image acquisition configuration data 450 from a source other than a component of the image processing pipeline 400. For example, the image acquisition configuration data 450, or a portion thereof, may be received from another component, such as a user interface component, of the image capture apparatus implementing the image processing pipeline 400, such as one or more of the user interface components 360 shown in FIG. 3. The image sensor 410 obtains, outputs, or both, the source image data in accordance with the image acquisition configuration data 450. For example, the image sensor 410 may obtain the image acquisition configuration data 450 prior to capturing the source image.

The image sensor 410 receives, or otherwise obtains or accesses, adaptive acquisition control data 460, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 410 receives the adaptive acquisition control data 460 from the image signal processor 420. The image sensor 410 obtains, outputs, or both, the source image data in accordance with the adaptive acquisition control data 460.

The image sensor 410 controls, such as configures, sets, or modifies, one or more image acquisition parameters or settings, or otherwise controls the operation of the image sensor 410, in accordance with the image acquisition configuration data 450 and the adaptive acquisition control data 460. For example, the image sensor 410 may capture a first source image using, or in accordance with, the image acquisition configuration data 450, and in the absence of adaptive acquisition control data 460 or using defined values for the adaptive acquisition control data 460, output the first source image to the image signal processor 420, obtain adaptive acquisition control data 460 generated using the first source image data from the image signal processor 420, and capture a second source image using, or in accordance with, the image acquisition configuration data 450 and the adaptive acquisition control data 460 generated using the first source image.

The image sensor 410 outputs source image data, which may include the source image signal, image acquisition data, or a combination thereof, to the image signal processor 420.

The image signal processor 420 receives, or otherwise accesses or obtains, the source image data from the image sensor 410. The image signal processor 420 processes the source image data to obtain input image data. In some implementations, the image signal processor 420 converts the raw image signal (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

Processing the source image data includes generating the adaptive acquisition control data 460. The adaptive acquisition control data 460 includes data for controlling the acquisition of a one or more images by the image sensor 410.

The image signal processor 420 includes components not expressly shown in FIG. 4 for obtaining and processing the source image data. For example, the image signal processor 420 may include components not shown in FIG. 4, such as one or more sensor input (SEN) components, one or more sensor readout (SRO) components, one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 420, or respective components thereof, may be implemented in hardware, software, or a combination of hardware and software. Although one image signal processor 420 is shown in FIG. 4, the image processing pipeline 400 may include multiple image signal processors. In implementations that include multiple image signal processors, the functionality of the image signal processor 420 may be divided or distributed among the image signal processors.

In some implementations, the image signal processor 420 may implement or include multiple parallel, or partially parallel paths for image processing. For example, for high dynamic range image processing based on two source images, the image signal processor 420 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 420, or one or more components thereof, such as the sensor input components, may perform black-point removal for the image data. In some implementations, the image sensor 410 may compress the source image data, or a portion thereof, and the image signal processor 420, or one or more components thereof, such as one or more of the sensor input components or one or more of the image data decompression components, may decompress the compressed source image data to obtain the source image data.

The image signal processor 420, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 420, or one or more components thereof, such as the image data compression components, may obtain the image data, or a portion thereof, such as from another component of the image signal processor 420, compress the image data, and output the compressed image data, such as to another component of the image signal processor 420, such as to a memory component of the image signal processor 420.

The image signal processor 420, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 420 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 420 may include multiple uncompression components, which may be respectively optimized for uncompression with respect to one or more defined image data formats.

The image signal processor 420, or one or more components thereof, may include internal memory, or data storage, components. The memory components store image data, such as compressed image data internally within the image signal processor 420 and are accessible to the image signal processor 420, or to components of the image signal processor 420. In some implementations, a memory component may be accessible, such as write accessible, to a defined component of the image signal processor 420, such as an image data compression component, and the memory component may be accessible, such as read accessible, to another defined component of the image signal processor 420, such as an uncompression component of the image signal processor 420.

The image signal processor 420, or one or more components thereof, such as the Bayer-to-Bayer components, may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 4, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform blackpoint removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 420, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 420, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 420.

The image signal processor 420, or one or more components thereof, such as the global motion compensation components, may receive, or otherwise access, global motion data, such as global motion data from a gyroscopic unit of the image capture apparatus, such as the gyroscope 346 shown in FIG. 3, corresponding to the current frame. The global motion compensation component may apply the global motion data to a current image to obtain a global motion compensated image, which the global motion compensation component may output, or otherwise make available, to one or more other components of the image signal processor 420.

The image signal processor 420, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 420.

The image signal processor 420, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 420.

The image signal processor 420, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 420.

The high dynamic range components of the image signal processor 420 may, respectively, include one or more high dynamic range core components, one or more tone control (TC) components, or one or more high dynamic range core components and one or more tone control components. For example, the image signal processor 420 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 420. The Tone Control component may compress the combined image data, such as from the unsigned 23-bit RGB format data to an unsigned 17-bit RGB format (enhanced dynamic data).

The image signal processor 420, or one or more components thereof, such as the three-dimensional noise reduction components reduce image noise for a frame based on one or more previously processed frames and output, or otherwise make available, noise reduced images to one or more other components of the image signal processor 420. In some implementations, the three-dimensional noise reduction component may be omitted or may be replaced by one or more lower-dimensional noise reduction components, such as by a spatial noise reduction component. The three-dimensional noise reduction components of the image signal processor 420 may, respectively, include one or more temporal noise reduction (TNR) components, one or more raw-to-raw (R2R) components, or one or more temporal noise reduction components and one or more raw-to-raw components. For example, the image signal processor 420 may include a three-dimensional noise reduction component that includes a temporal noise reduction component and a raw-to-raw component.

The image signal processor 420, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 420.

The image signal processor 420, or one or more components thereof, such as the raw-to-YUV components, may transform, or convert, image data, such as from the raw image format to another image format, such as the YUV format, which includes a combination of a luminance (Y) component and two chrominance (UV) components. The raw-to-YUV components may, respectively, demosaic, color process, or a both, images.

Although not expressly shown in FIG. 4, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 4, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a blackpoint RGB removal (BPRGB) component, which may process image data, such as low intensity values, such as values within a defined intensity threshold, such as less than or equal to, 28, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 420, or one or more components thereof, such as the Chroma Noise Reduction (CNR) components, may perform chroma denoising, luma denoising, or both.

The image signal processor 420, or one or more components thereof, such as the local tone mapping components, may perform multi-scale local tone mapping using a single pass approach or a multi-pass approach on a frame at different scales. The local tone mapping components may, respectively, enhance detail and may omit introducing artifacts. For example, the local tone mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 420, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 420, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 420, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 420, or one or more components thereof, such as the scaler components, may scale images, such as in patches, or blocks, of pixels, such as 16×16 blocks, 8×8 blocks, or patches or blocks of any other size or combination of sizes.

The image signal processor 420, or one or more components thereof, such as the configuration controller, may control the operation of the image signal processor 420, or the components thereof.

The image signal processor 420 outputs processed image data, such as by storing the processed image data in a memory of the image capture apparatus, such as external to the image signal processor 420, or by sending, or otherwise making available, the processed image data to another component of the image processing pipeline 400, such as the encoder 430, or to another component of the image capture apparatus.

The encoder 430 encodes or compresses the output of the image signal processor 420. In some implementations, the encoder 430 implements one or more encoding standards, which may include motion estimation. The encoder 430 outputs the encoded processed image to an output 470. In an embodiment that does not include the encoder 430, the image signal processor 420 outputs the processed image to the output 470. The output 470 may include, for example, a display, such as a display of the image capture apparatus, such as one or more of the displays 108, 140 shown in FIG. 1, the display 224 shown in FIG. 2, or the display 362.4 shown in FIG. 3, to a storage device, or both. The output 470 is a signal, such as to an external device.

The image processing pipeline 400 may be used to implement some or all of the techniques described in this disclosure, such as the technique 2600 described in FIG. 26, technique 2700 described in FIG. 27, technique 2800 described in FIG. 28, or technique 2900 described in FIG. 29, for example.

Figure 5:
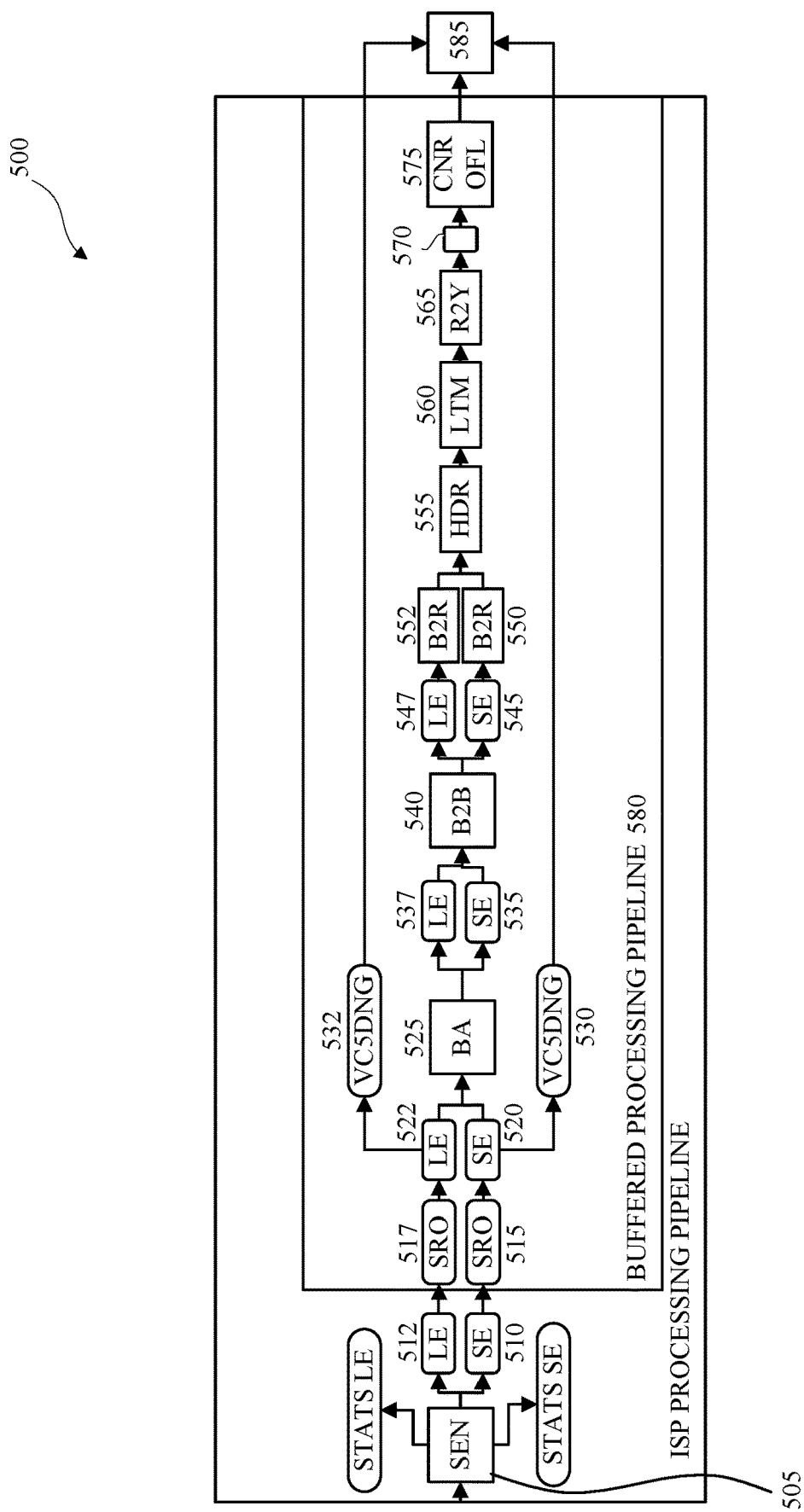
FIG. 5 is a flow diagram of an example of an image signal processor processing pipeline.

FIG. 5 is a flow diagram of an example of an image signal processor (ISP) processing pipeline 500. The ISP processing pipeline 500, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, the image processing pipeline 400 of FIG. 4, another image capture apparatus, or another image processing pipeline. In some implementations, the ISP processing pipeline 500 may be implemented in a digital signal processor (DSP), an application-specific integrated circuit (ASIC), or a combination of a digital signal processor and an application-specific integrated circuit. One or more components of the ISP processing pipeline 500 may be implemented in hardware, software, or a combination of hardware and software.

The ISP processing pipeline 500 may include one or more sensor input (SEN) components 505, one or more internal memory, or data storage, short exposure (SE) component 510 and long exposure (LE) component 512, one or more sensor readout (SRO) components 515 and 517, one or more internal memory, or data storage, components 520 and 522, one or more Bayer Analyzer or Noise Reduction (BA) components 525, one or more VCSDNG encoders (VCSDNG) 530 and 532, one or more internal memory, or data storage, components 535 and 537, one or more Bayer-to-Bayer components (B2B) 540, one or more internal memory, or data storage, components 545 and 547, one or more Bayer-to-RGB (B2R) components 550 and 552, one or more HDR components 555, one or more local tone mapping (LTM) components 560, one or more RGB-to-YUV (R2Y) components 565, one or more internal memory, or data storage, components 570, and one or more Chroma Noise Reduction offline (CNR OFL) components 575. The ISP processing pipeline 500 includes components not expressly shown in FIG. 5.

For example, there may be components following the CNR OFL components 575 which modify or transform an image prior to outputting by the ISP processing pipeline 500 (referred to herein as pipeline output processing components). In some implementations, the one or more internal memory, or data storage, components 510, the one or more internal memory, or data storage, components 520, the one or more internal memory, or data storage, components 535, the one or more internal memory, or data storage, components 545, and the one or more internal memory, or data storage, components 570 may be internal memory or data storage such as provided for the image signal processor 420 of FIG. 4. The ISP processing pipeline 500, or respective components thereof, may be implemented in hardware, software, or a combination of hardware and software. The ISP processing pipeline 500 may include multiple image signal processors. In implementations that include multiple image signal processors, the functionality of the ISP processing pipeline 500 may be divided or distributed among the image signal processors. The components of the ISP processing pipeline 500 may be similar to the component description for the image processing pipeline 400 except as is described herein or as is otherwise clear from context.

The SEN components 505 may receive image data from an image sensor such as the image sensor 410 in FIG. 4. The image data may be multiple successive image sets, where each image set includes a long exposure image and a short exposure image (comprising a pair of images) of a same scene. That is, the image sensor may obtain, detect, or capture multiple sets of pairs of digitally overlapped multi exposure images in a burst action. The SEN components 505 may obtain, collect, or generate (collectively "obtain") statistics or control data for image capture apparatus or camera control such as auto exposure data, auto white balance data, global tone mapping data, auto color lens shading data, or other control data, based on the long exposure image data and the short exposure image data in the image data. That is, control data may be obtained specific to the long exposure image data and the short exposure image data. The SEN components 505 send and store (i.e., buffer) the short exposure image data and the long exposure image data in the one or more internal memory, or data storage, SE and LE components 510 and 512, respectively. The SEN components 505 operate in real-time with respect to the image data in contrast to a remaining operations which operate slower than real-time and are identified as buffered processing pipeline 580.

The one or more SRO components 515 and 517 may perform dead pixel correction and other image signal processing on the short exposure image data and the long exposure image data buffered in the one or more internal memory, or data storage, SE and LE components 510 and 512, respectively, and send and store the SRO processed short exposure image data and the long exposure image data in the one or more internal memory, or data storage, components 520 and 522, respectively. The SRO components 515 and 517 may embed down scaling processing. The SRO components 515 and 517 may perform the down scaling processing in the Bayer domain. In some examples, the scaling is applied in the YUV or RGB domain.

The one or more VCSDNG encoders 530 and 532 may generate RAW images from the short exposure image data and the long exposure image data buffered in the one or more internal memory, or data storage, components 520 and 522, respectively. Each of the RAW images may be sent and stored in storage 585 to apply post processing techniques, such as blending, using external software tools. The storage 585 may be an external memory or storage card as described herein.

The one or more BA components 525 may apply a two-dimensional Bayer noise reduction to the short exposure image data and the long exposure image data buffered in the one or more internal memory, or data storage, components 520 and 522, respectively. The one or more BA components 525 may send and store the BA processed short exposure image data and the long exposure image data to the one or more internal memory, or data storage, components 535 and 537, respectively.

The one or more B2B 540 may transform or otherwise process the short exposure image data and the long exposure image data buffered in the one or more internal memory, or data storage, components 535 and 537, respectively. For example, the one or more B2B 540 may transform or convert the short exposure image data and the long exposure image data from a first Bayer format to a second Bayer format. The one or more B2B 540 may send and store the BA processed short exposure image data and the long exposure image data to the one or more internal memory, or data storage, components 545 and 547, respectively.

The one or more B2R components 550 and 552 may transform or convert the short exposure image data and the long exposure image data buffered in the one or more internal memory, or data storage, components 545 and 547, respectively, from a Bayer format to a RGB format, to generate RGB-short exposure image data and RGB-long exposure image data.

The one or more high dynamic range (HDR) components 555 may be a hardware HDR component. The HDR components 555 may combine or blend a long exposure image and a short exposure image. For example, the HDR components 555 may combine or blend the RGB-short exposure image data and the RGB-long exposure image data to generate a HDR image for each image pair in the multiple successive image sets in the burst.

The one or more LTM components 560 may apply local tone mapping to each of the HDR images to enhance the local contrast in the respective HDR images.

The one or more R2Y components 565 may convert each enhanced HDR image to a YUV format and send and store each YUV-HDR image in the one or more internal memory, or data storage, components 570.

The one or more CNR OFL components 575 may perform chroma noise reduction on the buffered YUV-HDR image from the one or more internal memory, or data storage, components 570. The CNR OFL components 575 provide better noise reduction as compared to CNR on-the-fly as CNR OFL can use larger effective kernels by resizing (i.e., ½ and/or ¼) in the UV planes. That is, multiple passes may be made on each YUV-HDR image. The output of the CNR OFL components 575 may process through additional processing blocks in the ISP processing pipeline 500 and/or the buffered processing pipeline 580, after which each processed HDR image may be sent and stored in the storage 585. For example, the additional processing blocks may include rate controlled encoders which are used to encode the HDR images to JPEG, HEIF, or other image formats. The use of the rate controlled encoders may reduce a size of the files written to the storage 585 and the speed at which writing of the files is completed to the storage 585.

The ISP processing pipeline 500 may be used to implement some or all of the techniques, examples, and used cases described in this disclosure.

In the example use cases that follow below, the B2B to R2Y-CNR may be a chain that can be simplified such that it has a demosaicing image pipe (i.e., sensor raw Bayer to YUV processing. Some examples of use cases include image scalers that are used to resize image resolution, which are depicted as RSZ0, RSZ1, RSZ2, etc. Some examples of use cases include a warp engine to distort per frame images to apply image stabilization, zoom, a user digital lens, or any combination thereof. The motion compensation (MC) obtains the motion vector and compensates the reference image accordingly. Some examples of use cases include YUV image temporal denoising depicted as 3DNR. The 3DNR w/o MC is a 3DNR block without motion compensation, and the 3DNR w/ MC is a 3DNR block with motion compensation. Since it is temporal denoising, it may rely on a current image and on a previous image stored on a memory, which may be referred to as a reference image (ref). One or more of the embodiments disclosed herein include at least one double data rate (DDR) memory buffer that supports lossy compression with a constant 50% compression. This type of DDR memory buffer enables the minimization of the size of the 1 second video buffer required by the image stabilization algorithm. This type of memory buffer also allows for a lower overall DDR size requirement.

In the example use cases that follow below, the IMX677 is an image sensor. The SEN, SRO, and B2B blocks are configured to process Bayer images, including defective pixel correction, Bayer scaler, denoise, and the like. The B2R is a demosaicing block that is configured to output an RGB image. The LTM ResizeBlock (LTMRBK), LTMMAP, and LTM blocks are the processing blocks for local tone mapping. The LTMRBK may generate a binned resolution of the input Bayer image. The LTMMAP may obtain the downscaled resolution and compute a luminance map for the LTM block. The R2Y and chroma noise reduction (CNR) blocks are configured to convert an RGB image into a YUV image, for example with a gamma curve, color matrix processing, and noise reduction. The digital lens (i.e., warp) may be referred to as DCE.

Figure 6:
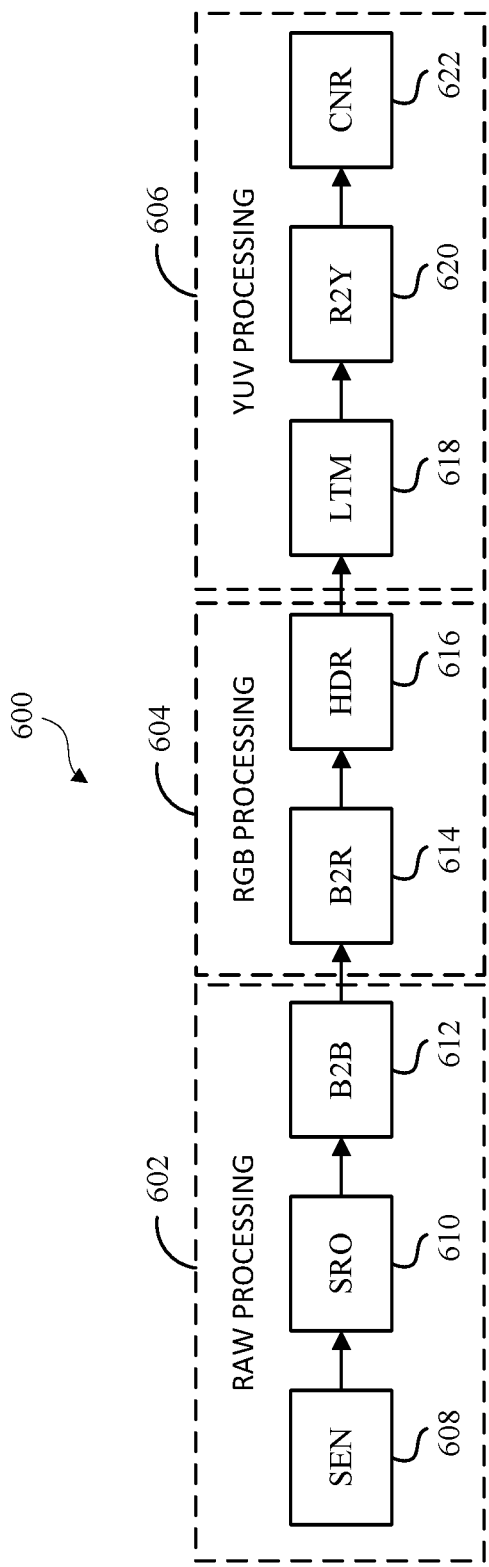
FIG. 6 is diagram of an example of an image signal processor processing pipeline used in common processing.

FIG. 6 is diagram of an example of an ISP processing pipeline 600 used in common processing. The ISP processing pipeline 600 is a simplified version of the ISP processing pipeline 500 shown in FIG. 5 to illustrate the use cases in accordance with the embodiments of this disclosure. The ISP processing pipeline 600 may be implemented on a processor, such as the ISP 420 shown in FIG. 4. The ISP processing pipeline 600 includes a raw processing component 602, an RGB processing component 604, and a YUV processing component 606.

The raw processing component 602 includes a SEN component 608, an SRO component 610, and a B2B component 612. The SEN component 608 may be the SEN component 505 shown in FIG. 5. The SRO component 610 may be the SRO components 515 and 517 shown in FIG. 5. The B2B component 612 may be the B2B component 540 shown in FIG. 5.

The RGB processing component 604 includes a B2R component 614 and an HDR component 616. The B2R component 614 may be the B2R components 550 and 552 shown in FIG. 5. The HDR component 616 may be the HDR component 555 shown in FIG. 5.

The YUV processing component 606 includes an LTM component 618, and R2Y component 620, and a CNR component 622. The LTM component 618 may be the LTM component 560 shown in FIG. 5. The R2Y component 620 may be the R2Y component 656 shown in FIG. 5. The CNR component 622 may be the CNR OFL component 575 shown in FIG. 5. The solid arrows shown in FIG. 6 depict a direct access path in which access to a DDR memory buffer is not required. The direct access path remains on the image processor. The direct access path is a direct communication between macros (i.e., function) via wires. The direct access path does not add any latency to the processing.

Figure 7:
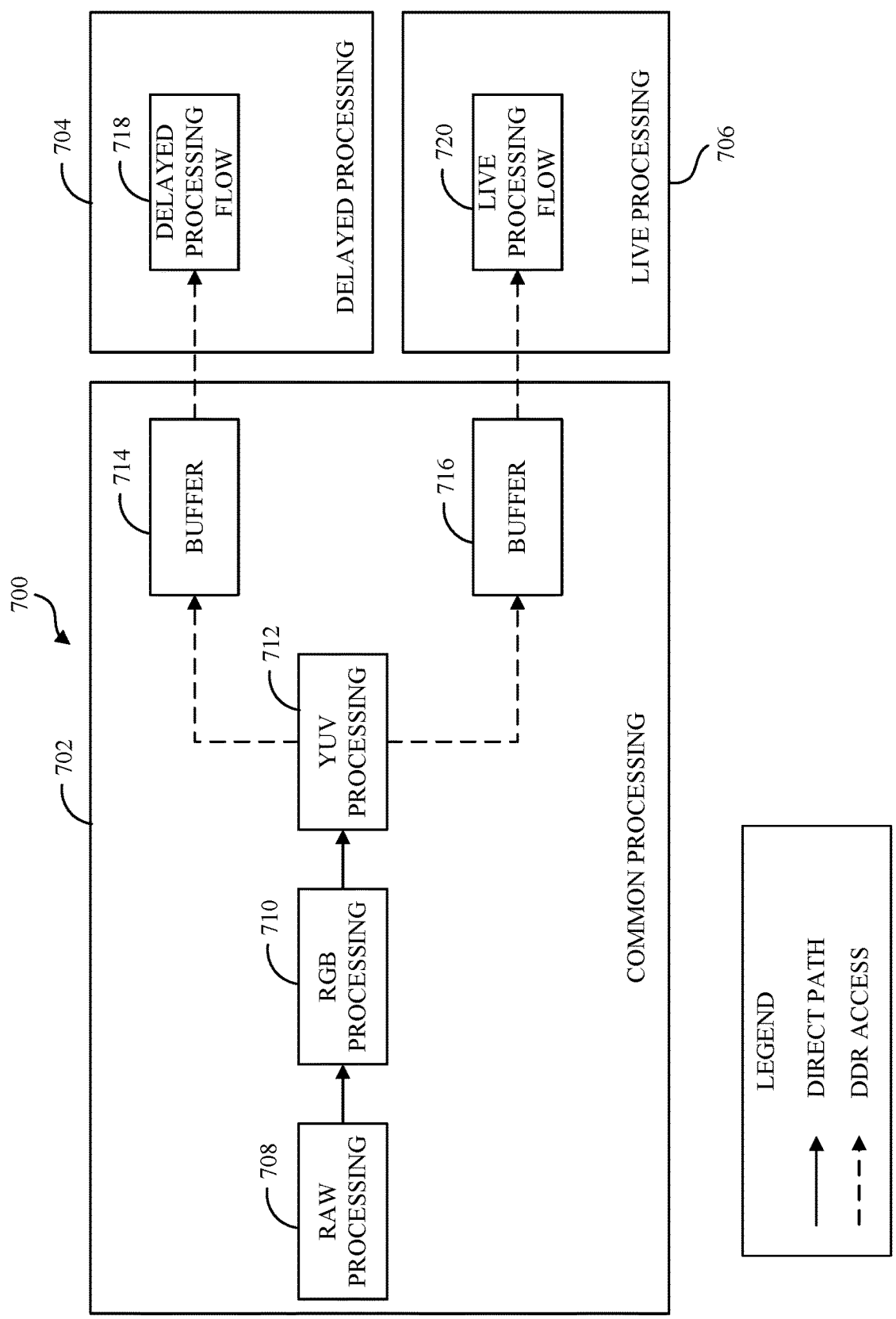
FIG. 7 is a diagram of an example of a video use case processing flow in accordance with embodiments of this disclosure.

FIG. 7 is diagram of an example of a video use case processing flow 700 in accordance with embodiments of this disclosure. The video use case processing flow 700 may be implemented on a processor, such as the ISP 420 shown in FIG. 4. The video use case processing flow 700 includes a common processing component 702, a delayed processing component 704, and a live processing component 706. The delayed processing component 704 is configured to process high resolution video data and store the processed high resolution video data in a memory, such as a secure digital (SD) card, a micro-SD card, or another suitable storage device. The live processing component 706 is configured to process low resolution video data, for example, to display on one or more displays of an image capture device, stream on social media, perform facial analysis, or display on a display of a mobile device.

The common processing component 702 includes a raw processing component 708, an RGB processing component 710, and a YUV processing component 712. The raw processing component 708 may be the raw processing component 602 shown in FIG. 6. The raw processing component 708 includes circuitry configured to obtain video data from an image sensor. The raw processing component 708 includes circuitry configured to perform raw processing on the video data to obtain Bayer video data. The raw processing component 708 includes circuitry to output the Bayer video data to the RGB processing component 710 via a direct path.

The RGB processing component 710 may be the RGB processing component 604 shown in FIG. 6. The RGB processing component 710 includes circuitry configured to obtain the Bayer video data from the raw processing component 708 via the direct path. The RGB processing component 710 includes circuitry configured to perform RGB processing on the Bayer video data to obtain HDR video data. The RGB processing component 710 includes circuitry configured to output the HDR video data to the YUV processing component 712 via a direct path.

The YUV processing component 712 may be the YUV processing component 606 shown in FIG. 6. The YUV processing component 712 includes circuitry configured to obtain the HDR video data from the RGB processing component 710 via the direct path. The YUV processing component 712 includes circuitry configured to perform YUV processing on the HDR video data to obtain high resolution YUV video data and low resolution YUV video data. The YUV processing component 712 includes circuitry configured to output the high resolution YUV video data to a buffer 714 via DDR access. DDR access may include communication between macros (i.e., function) via memory accesses. In particular, an emitter may write an entire frame into memory, and then determine that the receiver macro for the input frame is ready to be used. The buffer 714 may include one or more DDR memory buffers. The buffer 714 may support lossy compression with a constant 50% compression. The YUV processing component 712 includes circuitry configured to output the low resolution YUV video data to a buffer 716 via DDR access. The buffer 716 may be an uncompressed DDR memory buffer. In some implementations, the buffer 716 may be compressed depending on the use case.

The buffer 714 includes circuitry to obtain the high resolution YUV video data from the YUV processing component 712 via DDR access. The buffer 714 includes circuitry to output the high resolution video data via DDR access to be processed using a delayed processing flow 718. The buffer 716 includes circuitry to obtain the low resolution YUV video data from the YUV processing component 712 via DDR access. The buffer 716 includes circuitry to output the low resolution video data via DDR access to be processed using a live processing flow 720.

Figure 8:
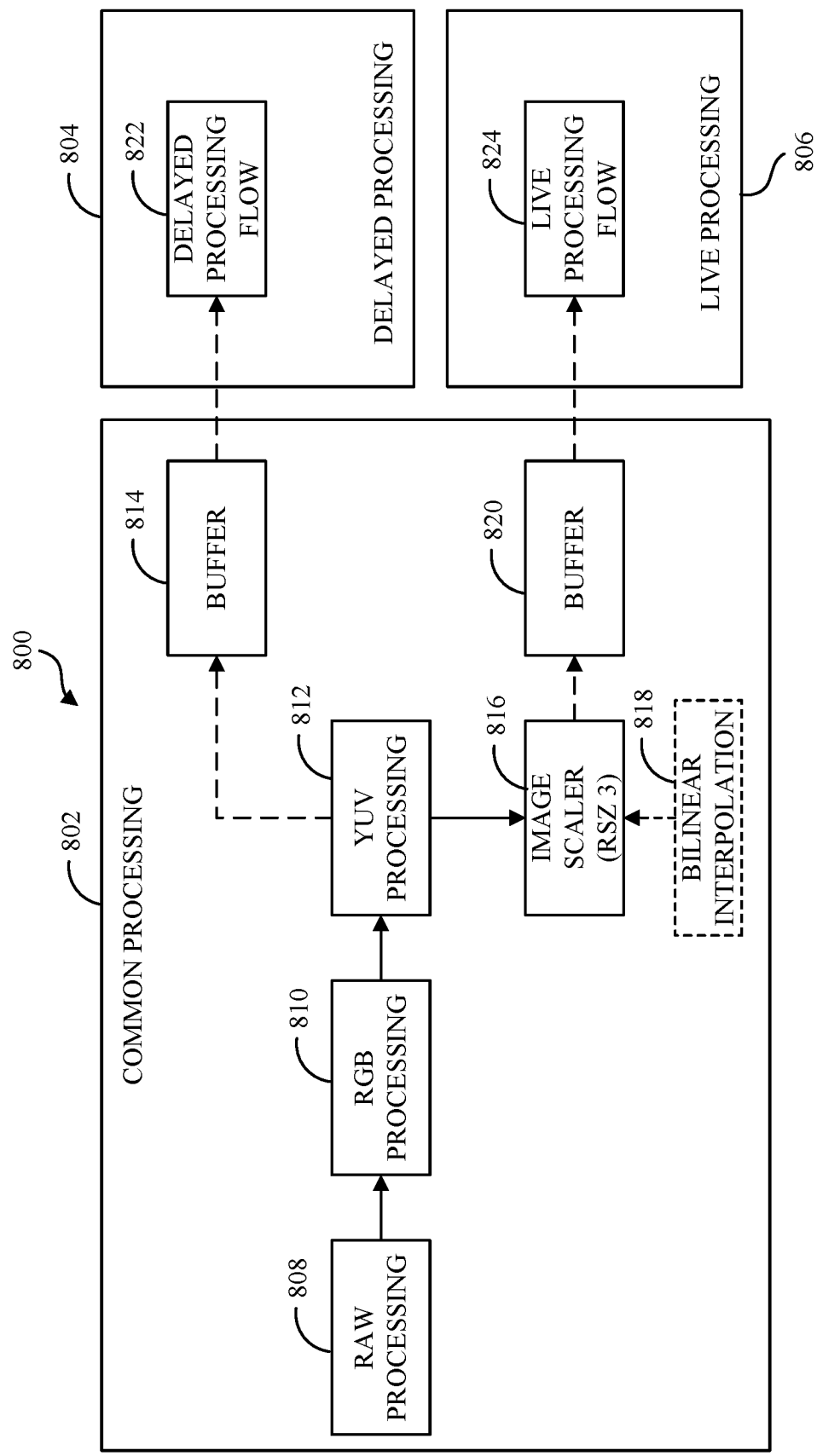
FIG. 8 is a diagram of an example of a common CNR RSZ3 use case processing flow in accordance with embodiments of this disclosure.

FIG. 8 is a diagram of an example of a common CNR RSZ3 use case processing flow 800 in accordance with embodiments of this disclosure. The common CNR RSZ3 use case processing flow 800 may be implemented on a processor, such as the ISP 420 shown in FIG. 4. The common CNR RSZ3 use case processing flow 800 includes a common processing component 802, a delayed processing component 804, and a live processing component 806. The delayed processing component 804 is configured to process high resolution video data and store the processed high resolution video data in a memory, such as an SD card, a micro-SD card, or another suitable storage device. The live processing component 806 is configured to process low resolution video data, for example, to display on one or more displays of an image capture device, stream on social media, perform facial analysis, or display on a display of a mobile device.

The common processing component 802 includes a raw processing component 808, an RGB processing component 810, and a YUV processing component 812. The raw processing component 808 may be the raw processing component 602 shown in FIG. 6. The raw processing component 808 includes circuitry configured to obtain video data from an image sensor. The raw processing component 808 includes circuitry configured to perform raw processing on the video data to obtain Bayer video data. The raw processing component 808 includes circuitry to output the Bayer video data to the RGB processing component 810 via a direct path.

The RGB processing component 810 may be the RGB processing component 604 shown in FIG. 6. The RGB processing component 810 includes circuitry configured to obtain the Bayer video data from the raw processing component 808 via the direct path. The RGB processing component 810 includes circuitry configured to perform RGB processing on the Bayer video data to obtain HDR video data. The RGB processing component 810 includes circuitry configured to output the HDR video data to the YUV processing component 812 via a direct path.

The YUV processing component 812 may be the YUV processing component 606 shown in FIG. 6. The YUV processing component 812 includes circuitry configured to obtain the HDR video data from the RGB processing component 810 via the direct path. The YUV processing component 812 includes circuitry configured to perform YUV processing on the HDR video data to obtain high resolution YUV video data and low resolution YUV video data. In some implementations, an LTM component, such as the LTM component 618 shown in FIG. 6, can be disabled. The YUV processing component 812 includes circuitry configured to output the high resolution YUV video data to a buffer 814 via DDR access. The buffer 814 may include one or more DDR memory buffers. The buffer 814 includes circuitry configured to store the high resolution YUV video data. The buffer 814 may support lossy compression with a constant 50% compression. The YUV processing component 812 includes circuitry configured to output the low resolution YUV video data to an image scaler 816 via a direct path.

The image scaler 816 includes circuitry configured to access the low resolution YUV video data via the direct path. The image scaler 816 includes circuitry configured to scale the low resolution YUV video data to obtain scaled low resolution YUV video data. In some implementations, the image scaler 816 may perform a bilinear interpolation 818 to scale the low resolution YUV video data. The bilinear interpolation 818 may use simple binning, for example, for improved image quality since DCE may use bi-cubic interpolation later in the process. The image scaler 816 includes circuitry configured to output the scaled low resolution YUV video data to a buffer 820 via DDR access. The buffer 820 includes circuitry configured to store the scaled low resolution YUV video data. The buffer 820 may be an uncompressed DDR memory buffer. In some implementations, the buffer 820 may be compressed depending on the use case.

The buffer 814 includes circuitry to obtain the high resolution YUV video data from the YUV processing component 812 via DDR access. The buffer 814 includes circuitry to output the high resolution video data via DDR access to be processed using a delayed processing flow 822. The buffer 820 includes circuitry to obtain the scaled low resolution YUV video data from the image scaler 816 via DDR access. The buffer 820 includes circuitry to output the scaled low resolution video data via DDR access to be processed using a live processing flow 824.

Figure 9:
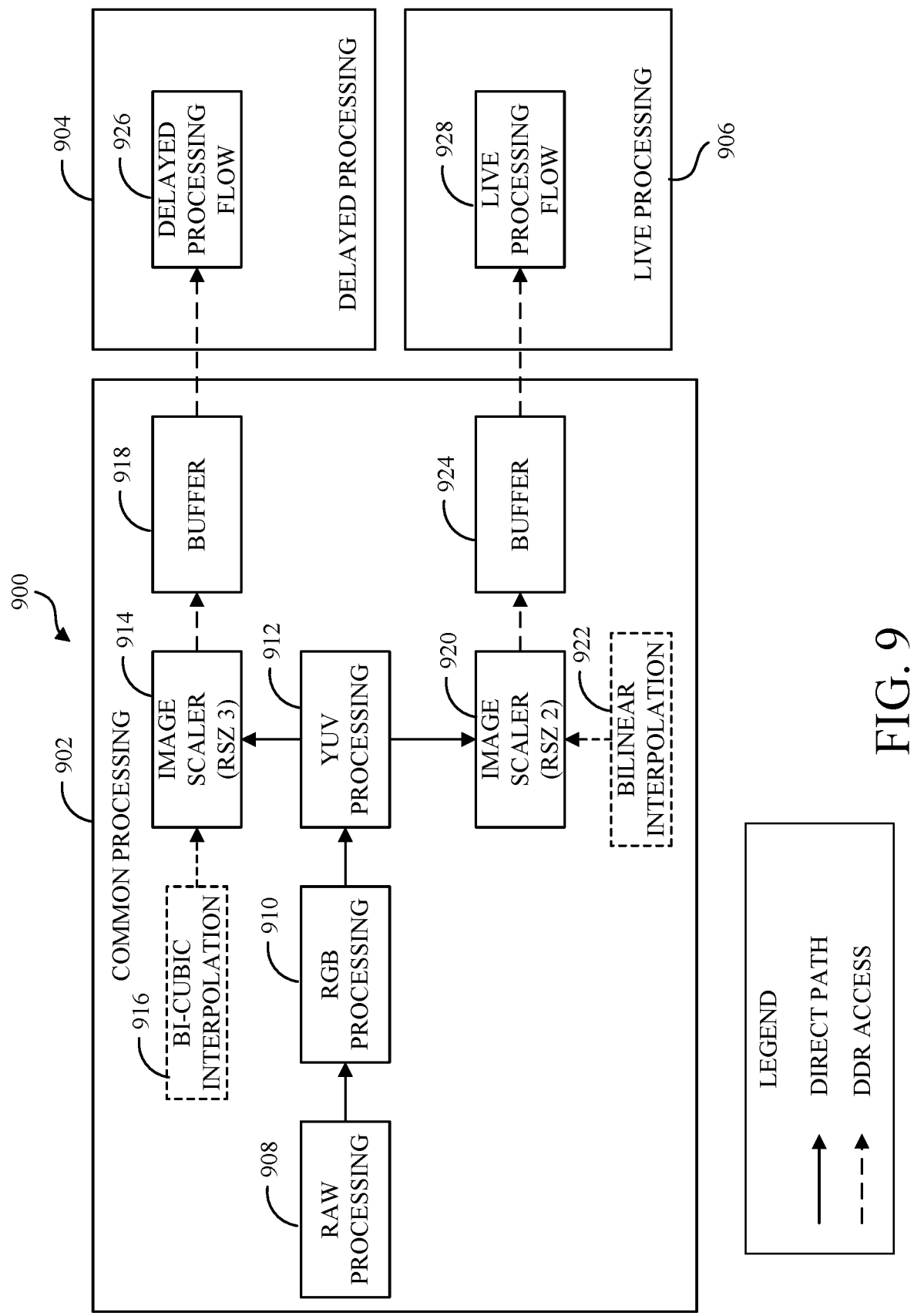
FIG. 9 is a diagram of an example of a common RSZ3/RSZ2 use case processing flow in accordance with embodiments of this disclosure.

FIG. 9 is a diagram of an example of a common RSZ3/RSZ2 use case processing flow 900 in accordance with embodiments of this disclosure. The common RSZ3/RSZ2 use case processing flow 900 may be implemented on a processor, such as the ISP 420 shown in FIG. 4. The common RSZ3/RSZ2 use case processing flow 900 includes a common processing component 902, a delayed processing component 904, and a live processing component 906. The delayed processing component 904 is configured to process high resolution video data and store the processed high resolution video data in a memory, such as an SD card, a micro-SD card, or another suitable storage device. The live processing component 906 is configured to process low resolution video data, for example, to display on one or more displays of an image capture device, stream on social media, perform facial analysis, or display on a display of a mobile device.

The common processing component 902 includes a raw processing component 908, an RGB processing component 910, and a YUV processing component 912. The raw processing component 908 may be the raw processing component 602 shown in FIG. 6. The raw processing component 908 includes circuitry configured to obtain video data from an image sensor. The raw processing component 908 includes circuitry configured to perform raw processing on the video data to obtain Bayer video data. The raw processing component 908 includes circuitry to output the Bayer video data to the RGB processing component 910 via a direct path.

The RGB processing component 910 may be the RGB processing component 604 shown in FIG. 6. The RGB processing component 910 includes circuitry configured to obtain the Bayer video data from the raw processing component 908 via the direct path. The RGB processing component 910 includes circuitry configured to perform RGB processing on the Bayer video data to obtain HDR video data. The RGB processing component 910 includes circuitry configured to output the HDR video data to the YUV processing component 912 via a direct path.

The YUV processing component 912 may be the YUV processing component 606 shown in FIG. 6. The YUV processing component 912 includes circuitry configured to obtain the HDR video data from the RGB processing component 910 via the direct path. The YUV processing component 912 includes circuitry configured to perform YUV processing on the HDR video data to obtain high resolution YUV video data and low resolution YUV video data. In some implementations, an LTM component, such as the LTM component 618 shown in FIG. 6, can be disabled. The YUV processing component 912 includes circuitry configured to output the high resolution YUV video data to an image scaler 914 via a direct path.

The image scaler 914 includes circuitry configured to access the high resolution YUV video data via the direct path. The image scaler 914 includes circuitry configured to scale the high resolution YUV video data to obtain scaled high resolution YUV video data. In some implementations, the image scaler 914 may perform a bi-cubic interpolation 916 to scale the high resolution YUV video data. The bi-cubic interpolation 916 may use simple binning, for example, for improved image quality. The image scaler 914 includes circuitry configured to output the scaled high resolution YUV video data to a buffer 918 via DDR access. The buffer 918 includes circuitry configured to store the scaled high resolution YUV video data. The buffer 918 may include one or more DDR memory buffers. The buffer 918 may support lossy compression with a constant 50% compression.

The YUV processing component 912 includes circuitry configured to output the low resolution YUV video data to an image scaler 920 via a direct path. The image scaler 920 includes circuitry configured to access the low resolution YUV video data via the direct path. The image scaler 920 includes circuitry configured to scale the low resolution YUV video data to obtain scaled low resolution YUV video data. In some implementations, the image scaler 920 may perform a bilinear interpolation 922 to scale the low resolution YUV video data. The bilinear interpolation 922 may use simple binning, for example, for improved image quality since DCE may use bi-cubic interpolation later in the process. The image scaler 920 includes circuitry configured to output the scaled low resolution YUV video data to a buffer 924 via DDR access. The buffer 924 includes circuitry configured to store the scaled low resolution YUV video data. The buffer 924 may be an uncompressed DDR memory buffer. In some implementations, the buffer 924 may be compressed depending on the use case.

The buffer 918 includes circuitry to obtain the scaled high resolution YUV video data from the image scaler 914 via DDR access. The buffer 918 includes circuitry to output the scaled high resolution video data via DDR access to be processed using a delayed processing flow 926. The buffer 924 includes circuitry to obtain the scaled low resolution YUV video data from the image scaler 920 via DDR access. The buffer 924 includes circuitry to output the scaled low resolution video data via DDR access to be processed using a live processing flow 928.

Figure 10:
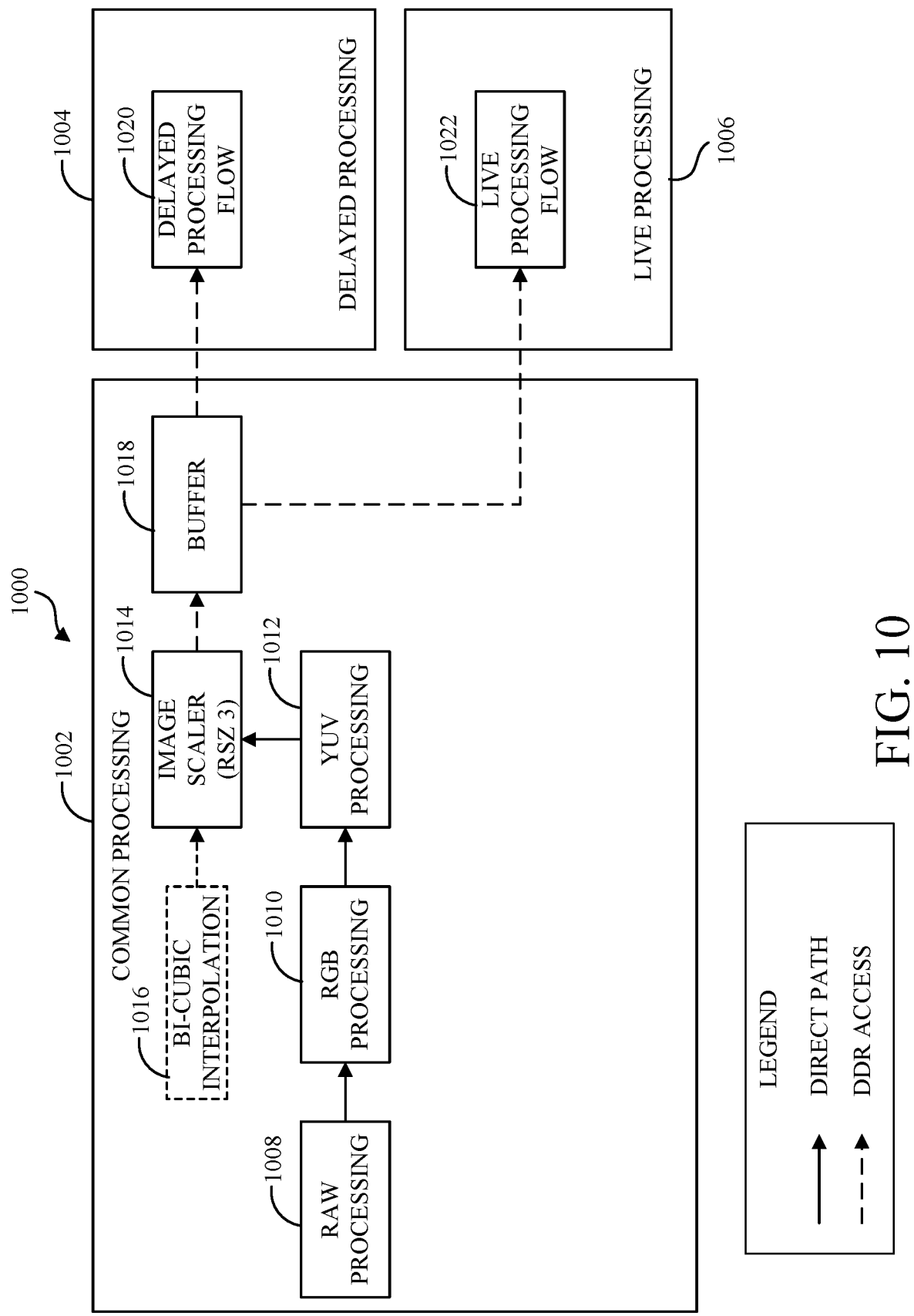
FIG. 10 is a diagram of an example of a common RSZ3 use case processing flow in accordance with embodiments of this disclosure.

FIG. 10 is a diagram of an example of a common RSZ3 use case processing flow 1000 in accordance with embodiments of this disclosure. This example use case may be applicable for preview (e.g., still (non-HDR) or video). The common RSZ3 use case processing flow 1000 may be implemented on a processor, such as the ISP 420 shown in FIG. 4. The common RSZ3 use case processing flow 1000 includes a common processing component 1002, a delayed processing component 1004, and a live processing component 1006. The delayed processing component 1004 is configured to process high resolution video data and store the processed high resolution video data in a memory, such as an SD card, a micro-SD card, or another suitable storage device. The live processing component 1006 is configured to process low resolution video data, for example, to display on one or more displays of an image capture device, stream on social media, perform facial analysis, or display on a display of a mobile device.

The common processing component 1002 includes a raw processing component 1008, an RGB processing component 1010, and a YUV processing component 1012. The raw processing component 1008 may be the raw processing component 602 shown in FIG. 6. The raw processing component 1008 includes circuitry configured to obtain video data from an image sensor. The raw processing component 1008 includes circuitry configured to perform raw processing on the video data to obtain Bayer video data. The raw processing component 1008 includes circuitry to output the Bayer video data to the RGB processing component 1010 via a direct path.

The RGB processing component 1010 may be the RGB processing component 604 shown in FIG. 6. The RGB processing component 1010 includes circuitry configured to obtain the Bayer video data from the raw processing component 1008 via the direct path. The RGB processing component 1010 includes circuitry configured to perform RGB processing on the Bayer video data to obtain HDR video data. The RGB processing component 1010 includes circuitry configured to output the HDR video data to the YUV processing component 1012 via a direct path.

The YUV processing component 1012 may be the YUV processing component 606 shown in FIG. 6. The YUV processing component 1012 includes circuitry configured to obtain the HDR video data from the RGB processing component 1010 via the direct path. The YUV processing component 1012 includes circuitry configured to perform YUV processing on the HDR video data to obtain high resolution YUV video data and low resolution YUV video data. In some implementations, an LTM component, such as the LTM component 618 shown in FIG. 6, can be disabled. The YUV processing component 1012 includes circuitry configured to output the high resolution YUV video data and the low resolution YUV video data to an image scaler 1014 via a direct path.

The image scaler 1014 includes circuitry configured to access the high resolution YUV video data and the low resolution YUV video data via the direct path. The image scaler 1014 includes circuitry configured to scale the high resolution YUV video data and the low resolution YUV video data to obtain scaled high resolution YUV video data and scaled low resolution YUV video data. In some implementations, the image scaler 1014 may perform a bi-cubic interpolation 1016 to scale the high resolution YUV video data and the low resolution YUV video data. The bi-cubic interpolation 1016 may use simple binning, for example, for improved image quality. The image scaler 1014 includes circuitry configured to output the scaled high resolution YUV video data and the scaled low resolution YUV video data to a buffer 1018 via DDR access. The buffer 1018 includes circuitry configured to store the scaled high resolution YUV video data and the scaled low resolution YUV video data. The buffer 1018 may include one or more DDR memory buffers. The buffer 1018 may support lossy compression with a constant 50% compression.

The buffer 1018 includes circuitry to obtain the scaled high resolution YUV video data and the scaled low resolution YUV video data from the image scaler 1014 via DDR access. The buffer 1018 includes circuitry to output the scaled high resolution video data via DDR access to be processed using a delayed processing flow 1020. The buffer 1018 includes circuitry to output the scaled low resolution video data via DDR access to be processed using a live processing flow 1022.

Figure 11:
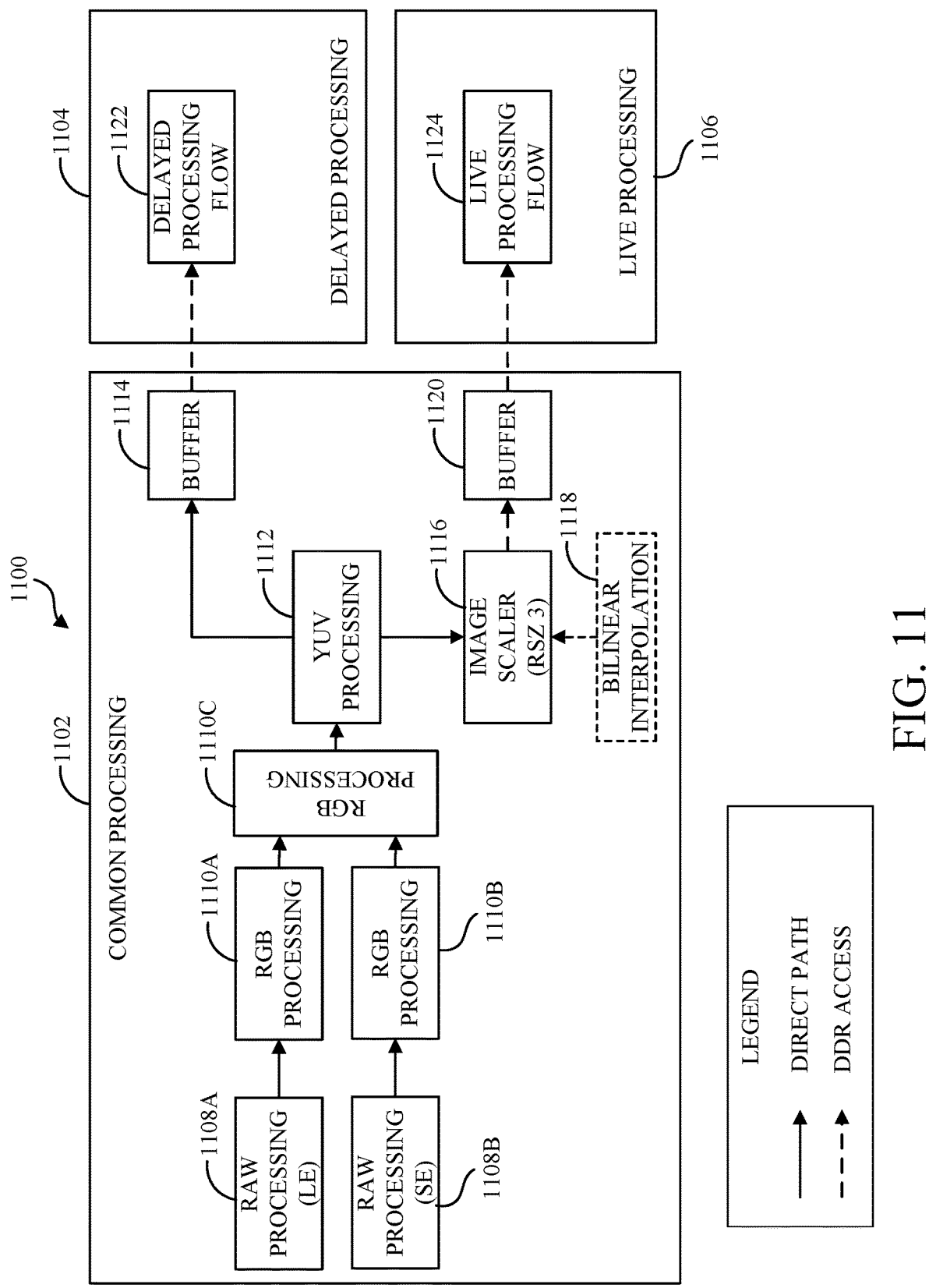
FIG. 11 is a diagram of an example of a high dynamic range (HDR) common CNR/RSZ3 use case processing flow in accordance with embodiments of this disclosure.

FIG. 11 is a diagram of an example of a high dynamic range (HDR) common CNR/RSZ3 use case processing flow 1100 in accordance with embodiments of this disclosure. The HDR common CNR/RSZ3 use case processing flow 1100 may be implemented on a processor, such as the ISP 420 shown in FIG. 4. The HDR common CNR/RSZ3 use case processing flow 1100 includes a common processing component 1102, a delayed processing component 1104, and a live processing component 1106. The delayed processing component 1104 is configured to process high resolution video data and store the processed high resolution video data in a memory, such as an SD card, a micro-SD card, or another suitable storage device. The live processing component 1106 is configured to process low resolution video data, for example, to display on one or more displays of an image capture device, stream on social media, perform facial analysis, or display on a display of a mobile device.

The common processing component 1102 includes a raw processing component 1108A, a raw processing component 1108B, an RGB processing component 1110A, an RGB processing component 1110B, an RGB processing component 1110C, and a YUV processing component 1112.

The raw processing component 1108A includes circuitry configured to obtain long exposure (LE) video data from an image sensor and the raw processing component 1108B includes circuitry configured to obtain short exposure (SE) video data from an image sensor. The raw processing components 1108A-B include circuitry configured to perform raw processing on the respective LE and SE video data to obtain LE and SE Bayer video data. The raw processing components 1108A-B include circuitry to output the LE and SE Bayer video data to the RGB processing component 1110A and the RGB processing component 1110B via respective direct paths. In some implementations, one or more DDR memory buffers that support lossy compression with a constant 50% compression may be used to store the long exposure frames and one or more DDR memory buffers that support lossless compression with a constant 75% compression may be used to store short exposure frames.

The RGB processing component 1110A includes circuitry configured to obtain the LE Bayer video data from the raw processing component 1108A via the direct path. The RGB processing component 1110A includes circuitry configured to perform RGB processing on the LE Bayer video data to obtain LE HDR video data. The RGB processing component 1110A includes circuitry configured to output the LE HDR video data to the RGB processing component 1110C via a direct path.

The RGB processing component 1110B includes circuitry configured to obtain the SE Bayer video data from the raw processing component 1108B via the direct path. The RGB processing component 1110B includes circuitry configured to perform RGB processing on the SE Bayer video data to obtain SE HDR video data. The RGB processing component 1110B includes circuitry configured to output the SE HDR video data to the RGB processing component 1110C via a direct path.

The RGB processing component 1110C includes circuitry configured to obtain the LE HDR video data from the RGB processing component 1110A. The RGB processing component 1110C includes circuitry configured to obtain the SE HDR video data from the RGB processing component 1110B. The RGB processing component 1110C includes circuitry configured to combine the LE HDR video data and the SE HDR video data and output the combined HDR video data to the YUV processing component 1112 via a direct path.

The YUV processing component 1112 may be the YUV processing component 606 shown in FIG. 6. The YUV processing component 1112 includes circuitry configured to obtain the combined HDR video data from the RGB processing component 1110C via the direct path. The YUV processing component 1112 includes circuitry configured to perform YUV processing on the combined HDR video data to obtain high resolution YUV video data and low resolution YUV video data. In some implementations, an LTM component, such as the LTM component 618 shown in FIG. 6, can be disabled. The YUV processing component 1112 includes circuitry configured to output the high resolution YUV video data to a buffer 1114 via a direct path. The buffer 1114 may include one or more DDR memory buffers. The buffer 1114 includes circuitry configured to store the high resolution YUV video data. The buffer 1114 may support lossy compression with a constant 50% compression.

The YUV processing component 1112 includes circuitry configured to output the low resolution YUV video data to an image scaler 1116 via a direct path. The image scaler 1116 includes circuitry configured to access the low resolution YUV video data via the direct path. The image scaler 1116 includes circuitry configured to scale the low resolution YUV video data to obtain scaled low resolution YUV video data. In some implementations, the image scaler 1116 may perform a bilinear interpolation 1118 to scale the low resolution YUV video data. The bilinear interpolation 1118 may use simple binning, for example, for improved image quality since DCE may use bi-cubic interpolation later in the process. The image scaler 1116 includes circuitry configured to output the scaled low resolution YUV video data to a buffer 1120 via DDR access. The buffer 1120 includes circuitry configured to store the scaled low resolution YUV video data. The buffer 1120 may be an uncompressed DDR memory buffer. In some implementations, the buffer 1120 may be compressed depending on the use case.

The buffer 1114 includes circuitry to obtain the high resolution YUV video data from the YUV processing component 1112 via DDR access. The buffer 1114 includes circuitry to output the high resolution video data via DDR access to be processed using a delayed processing flow 1122. The buffer 1120 includes circuitry to obtain the scaled low resolution YUV video data from the image scaler 1116 via DDR access. The buffer 1120 includes circuitry to output the scaled low resolution video data via DDR access to be processed using a live processing flow 1124.

Figure 12:
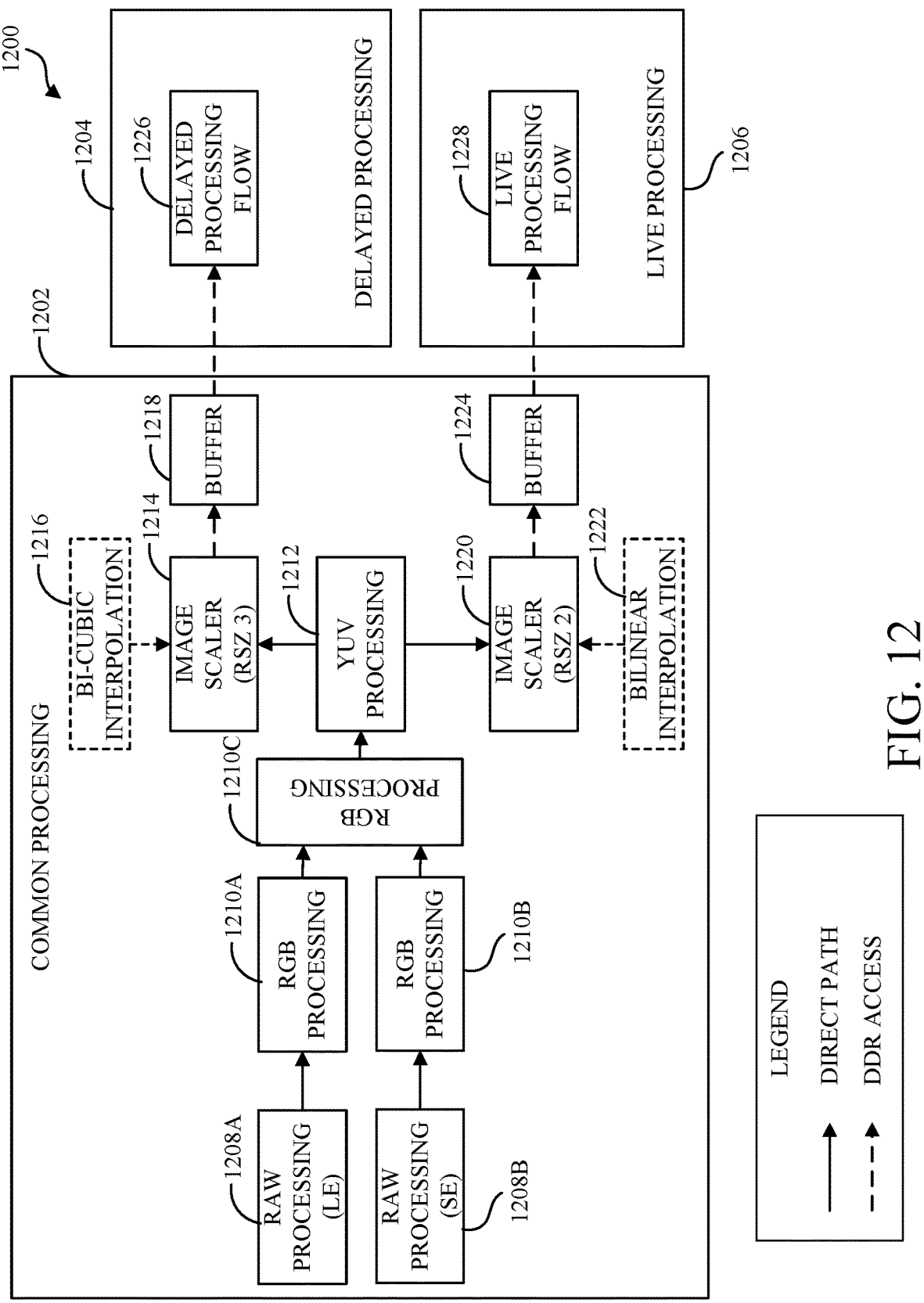
FIG. 12 is a diagram of an example of an HDR common RSZ3/RSZ2 use case processing flow in accordance with embodiments of this disclosure.

FIG. 12 is a diagram of an example of an HDR common RSZ3/RSZ2 use case processing flow 1200 in accordance with embodiments of this disclosure. The HDR common RSZ3/RSZ2 use case processing flow 1200 may be implemented on a processor, such as the ISP 420 shown in FIG. 4. The HDR common RSZ3/RSZ2 use case processing flow 1200 includes a common processing component 1202, a delayed processing component 1204, and a live processing component 1206. The delayed processing component 1204 is configured to process high resolution video data and store the processed high resolution video data in a memory, such as an SD card, a micro-SD card, or another suitable storage device. The live processing component 1206 is configured to process low resolution video data, for example, to display on one or more displays of an image capture device, stream on social media, perform facial analysis, or display on a display of a mobile device.

The common processing component 1202 includes a raw processing component 1208A, a raw processing component 1208B, an RGB processing component 1210A, an RGB processing component 1210B, an RGB processing component 1210C, and a YUV processing component 1212.

The raw processing component 1208A includes circuitry configured to obtain LE video data from an image sensor and the raw processing component 1208B includes circuitry configured to obtain SE video data from an image sensor. The raw processing components 1208A-B include circuitry configured to perform raw processing on the respective LE and SE video data to obtain LE and SE Bayer video data. The raw processing components 1208A-B include circuitry to output the LE and SE Bayer video data to the RGB processing component 1210A and the RGB processing component 1210B via respective direct paths. In some implementations, one or more DDR memory buffers that support lossy compression with a constant 50% compression may be used to store the long exposure frames and one or more DDR memory buffers that support lossless compression with a constant 75% compression may be used to store short exposure frames.

The RGB processing component 1210A includes circuitry configured to obtain the LE Bayer video data from the raw processing component 1208A via the direct path. The RGB processing component 1210A includes circuitry configured to perform RGB processing on the LE Bayer video data to obtain LE HDR video data. The RGB processing component 1210A includes circuitry configured to output the LE HDR video data to the RGB processing component 1210C via a direct path.

The RGB processing component 1210B includes circuitry configured to obtain the SE Bayer video data from the raw processing component 1208B via the direct path. The RGB processing component 1210B includes circuitry configured to perform RGB processing on the SE Bayer video data to obtain SE HDR video data. The RGB processing component 1210B includes circuitry configured to output the SE HDR video data to the RGB processing component 1210C via a direct path.

The RGB processing component 1210C includes circuitry configured to obtain the LE HDR video data from the RGB processing component 1210A. The RGB processing component 1210C includes circuitry configured to obtain the SE HDR video data from the RGB processing component 1210B. The RGB processing component 1210C includes circuitry configured to combine the LE HDR video data and the SE HDR video data and output the combined HDR video data to the YUV processing component 1212 via a direct path.

The YUV processing component 1212 may be the YUV processing component 606 shown in FIG. 6. The YUV processing component 1212 includes circuitry configured to obtain the combined HDR video data from the RGB processing component 1210C via the direct path. The YUV processing component 1212 includes circuitry configured to perform YUV processing on the combined HDR video data to obtain high resolution YUV video data and low resolution YUV video data. In some implementations, an LTM component, such as the LTM component 618 shown in FIG. 6, can be disabled. The RGB processing component 1210C includes circuitry configured to output the combined HDR video data to the YUV processing component 1212 via a direct path.

The YUV processing component 1212 may be the YUV processing component 606 shown in FIG. 6. The YUV processing component 1212 includes circuitry configured to obtain the combined HDR video data from the RGB processing component 1210C via the direct path. The YUV processing component 1212 includes circuitry configured to perform YUV processing on the combined HDR video data to obtain high resolution YUV video data and low resolution YUV video data. In some implementations, an LTM component, such as the LTM component 618 shown in FIG. 6, can be disabled. The YUV processing component 1212 includes circuitry configured to output the high resolution YUV video data to an image scaler 1214 via a direct path.

The image scaler 1214 includes circuitry configured to access the high resolution YUV video data via the direct path. The image scaler 1214 includes circuitry configured to scale the high resolution YUV video data to obtain scaled high resolution YUV video data. In some implementations, the image scaler 1214 may perform a bi-cubic interpolation 1216 to scale the high resolution YUV video data. The bi-cubic interpolation 1216 may use simple binning, for example, for improved image quality. The image scaler 1214 includes circuitry configured to output the scaled high resolution YUV video data to a buffer 1218 via DDR access. The buffer 1218 includes circuitry configured to store the scaled high resolution YUV video data. The buffer 1218 may include one or more DDR memory buffers. The buffer 1218 may support lossy compression with a constant 50% compression.

The YUV processing component 1212 includes circuitry configured to output the low resolution YUV video data to an image scaler 1220 via a direct path. The image scaler 1220 includes circuitry configured to access the low resolution YUV video data via the direct path. The image scaler 1220 includes circuitry configured to scale the low resolution YUV video data to obtain scaled low resolution YUV video data. In some implementations, the image scaler 1220 may perform a bilinear interpolation 1222 to scale the low resolution YUV video data. The bilinear interpolation 1222 may use simple binning, for example, for improved image quality since DCE may use bi-cubic interpolation later in the process. The image scaler 1220 includes circuitry configured to output the scaled low resolution YUV video data to a buffer 1224 via DDR access. The buffer 1224 includes circuitry configured to store the scaled low resolution YUV video data. The buffer 1224 may be an uncompressed DDR memory buffer. In some implementations, the buffer 1224 may be compressed depending on the use case.

The buffer 1218 includes circuitry to obtain the scaled high resolution YUV video data from the image scaler 1214 via DDR access. The buffer 1218 includes circuitry to output the scaled high resolution video data via DDR access to be processed using a delayed processing flow 1226. The buffer 1224 includes circuitry to obtain the scaled low resolution YUV video data from the image scaler 1220 via DDR access. The buffer 1224 includes circuitry to output the scaled low resolution video data via DDR access to be processed using a live processing flow 1228.

Figure 13:
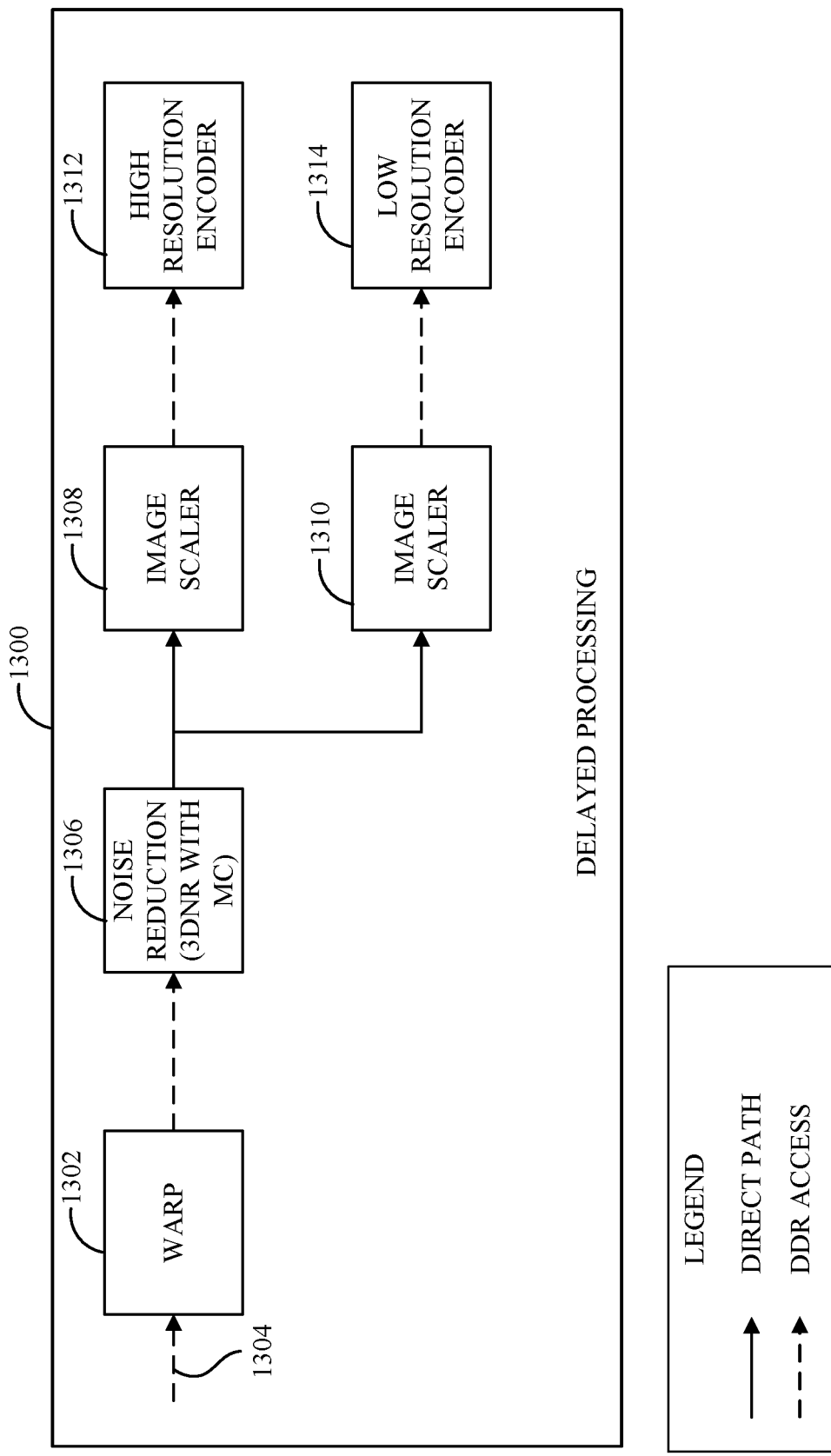
FIG. 13 is a diagram of an example of a delayed processing flow in accordance with embodiments of this disclosure.

FIG. 13 is a diagram of an example of a delayed processing flow 1300 in accordance with embodiments of this disclosure. The delayed processing flow 1300 may be the delayed processing flow 718, shown in FIG. 7, the delayed processing flow 822 shown in FIG. 8, the delayed processing flow 926 shown in FIG. 9, the delayed processing flow 1020 shown in FIG. 10, the delayed processing flow 1122 shown in FIG. 11, or the delayed processing flow 1226 shown in FIG. 12.

The delayed processing flow 1300 includes a warp component 1302 that includes circuitry configured to obtain high resolution YUV video data 1304 from a buffer. The high resolution YUV video data may be obtained via DDR access. The buffer may be a DDR memory buffer. The DDR memory buffer may be configured to support lossy compression with a constant 50% compression. The warp component 1302 includes circuitry configured to warp the high resolution YUV video data to obtain warped video data. The warp component 1302 includes circuitry configured to output the warped video data to a noise reduction component 1306 via DDR access.

The noise reduction component 1306 included circuitry configured to obtain the warped video data from the warp component 1302 via DDR access. The warped video data may be accessed via one or more DDR memory buffers that support lossy compression with a constant 50% compression. The noise reduction component 1306 includes circuitry configured to perform noise reduction on the warped video data to obtain denoised video data. In some implementations, the noise reduction may be a three-dimensional noise reduction (3DNR). In this example, motion compensation is performed. In some implementations, motion estimation and motion compensation may be disabled. In some implementations, 3DNR may be passthrough (i.e., no denoising with minimal power). The noise reduction component 1306 includes circuitry configured to output the denoised video data to image scaler 1308 and image scaler 1310 via a direct path.

The image scaler 1308 includes circuitry configured to obtain the denoised video data from the noise reduction component 1306 via the direct path. The image scaler 1308 includes circuitry configured to scale the denoised video data to obtain scaled video data for a high resolution display. The image scaler 1308 includes circuitry configured to output the scaled video data for a high resolution display to a high resolution encoder 1312 via DDR access.

The image scaler 1310 includes circuitry configured to obtain the denoised video data from the noise reduction component 1306 via the direct path. The image scaler 1310 includes circuitry configured to scale the denoised video data to obtain scaled video data for a low resolution display, such as one or more displays on an image capture device. The image scaler 1308 includes circuitry configured to output the scaled video data for a low resolution display to a low resolution encoder 1314 via DDR access.

The high resolution encoder 1312 includes circuitry configured to obtain the scaled video data for a high resolution display via DDR access. The scaled video data for a high resolution display may be accessed via one or more DDR memory buffers that support lossless compression with a constant 75% compression. The high resolution encoder 1312 includes circuitry to encode the scaled video data for a high resolution display and output high resolution video data.

The low resolution encoder 1314 includes circuitry configured to obtain the scaled video data for a low resolution display via DDR access. The scaled video data for a low resolution display may be accessed via one or more DDR memory buffers that support lossless compression with a constant 75% compression. The low resolution encoder 1314 includes circuitry to encode the scaled video data for a low resolution display and output low resolution video data.

Figure 14:
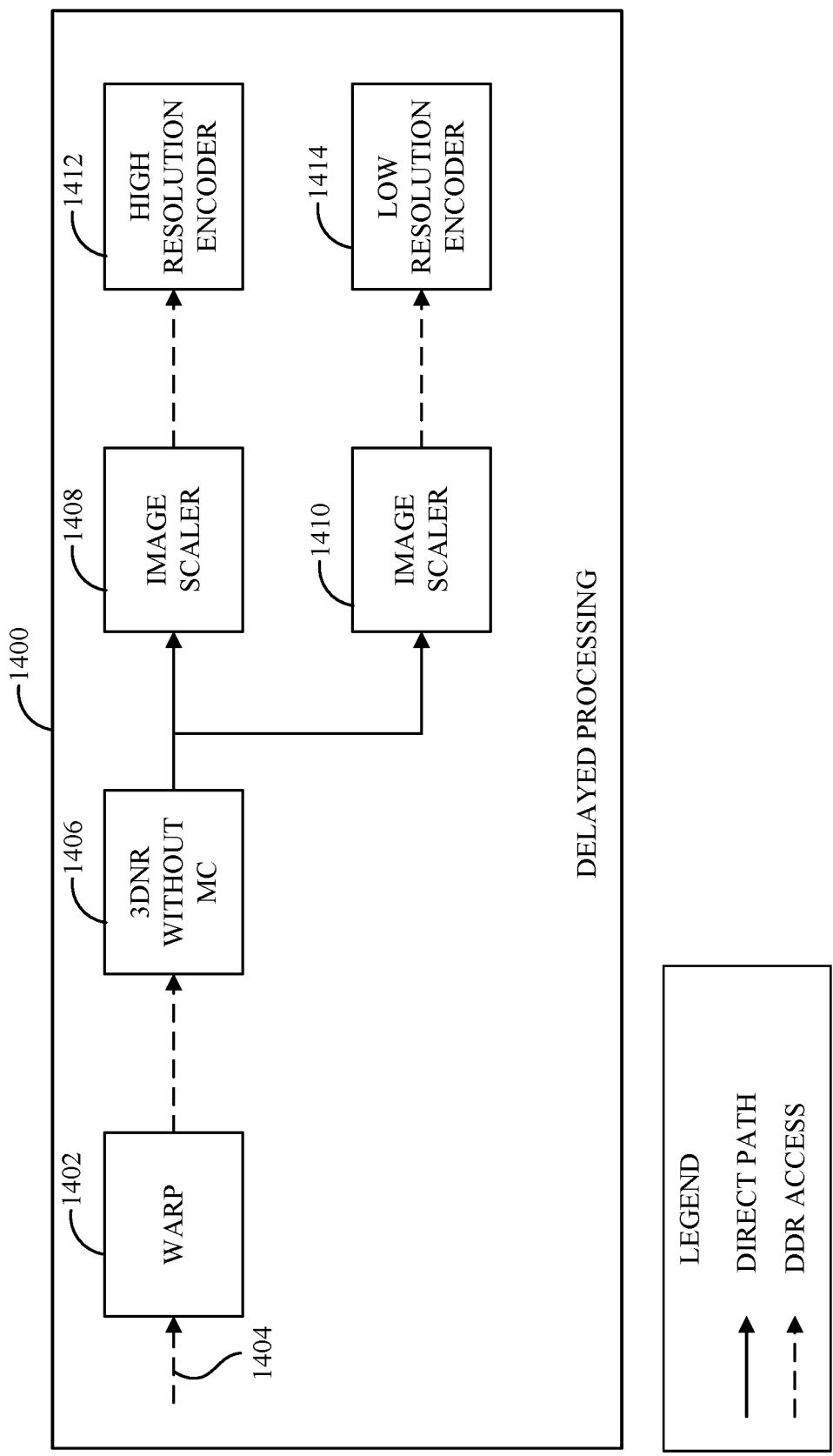
FIG. 14 is a diagram of another example of a delayed processing flow in accordance with embodiments of this disclosure.

FIG. 14 is a diagram of another example of a delayed processing flow in accordance with embodiments of this disclosure. The delayed processing flow 1400 may be the delayed processing flow 718, shown in FIG. 7, the delayed processing flow 822 shown in FIG. 8, the delayed processing flow 926 shown in FIG. 9, the delayed processing flow 1020 shown in FIG. 10, the delayed processing flow 1122 shown in FIG. 11, or the delayed processing flow 1226 shown in FIG. 12.

The delayed processing flow 1400 includes a warp component 1402 that includes circuitry configured to obtain high resolution YUV video data 1404 from a buffer. The high resolution YUV video data may be obtained via DDR access. The buffer may be a DDR memory buffer. The DDR memory buffer may be configured to support lossy compression with a constant 50% compression. The warp component 1402 includes circuitry configured to warp the high resolution YUV video data to obtain warped video data. The warp component 1402 includes circuitry configured to output the warped video data to a noise reduction component 1406 via DDR access.

The noise reduction component 1406 included circuitry configured to obtain the warped video data from the warp component 1402 via DDR access. The warped video data may be accessed via one or more DDR memory buffers that support lossy compression with a constant 50% compression. The noise reduction component 1406 includes circuitry configured to perform noise reduction on the warped video data to obtain denoised video data. In some implementations, the noise reduction may be a 3DNR. In this example, motion compensation is not performed. In some implementations, motion estimation and motion compensation may be disabled. In some implementations, 3DNR may be pass-through (i.e., no denoising with minimal power). The noise reduction component 1406 includes circuitry configured to output the denoised video data to image scaler 1408 and image scaler 1410 via a direct path.

The image scaler 1408 includes circuitry configured to obtain the denoised video data from the noise reduction component 1406 via the direct path. The image scaler 1408 includes circuitry configured to scale the denoised video data to obtain scaled video data for a high resolution display. The image scaler 1408 includes circuitry configured to output the scaled video data for a high resolution display to a high resolution encoder 1412 via DDR access.

The image scaler 1410 includes circuitry configured to obtain the denoised video data from the noise reduction component 1406 via the direct path. The image scaler 1410 includes circuitry configured to scale the denoised video data to obtain scaled video data for a low resolution display, such as one or more displays on an image capture device. The image scaler 1408 includes circuitry configured to output the scaled video data for a low resolution display to a low resolution encoder 1414 via DDR access.

The high resolution encoder 1412 includes circuitry configured to obtain the scaled video data for a high resolution display via DDR access. The scaled video data for a high resolution display may be accessed via one or more DDR memory buffers that support lossless compression with a constant 75% compression. The high resolution encoder 1412 includes circuitry to encode the scaled video data for a high resolution display and output high resolution video data.

The low resolution encoder 1414 includes circuitry configured to obtain the scaled video data for a low resolution display via DDR access. The scaled video data for a low resolution display may be accessed via one or more DDR memory buffers that support lossless compression with a constant 75% compression. The low resolution encoder 1414 includes circuitry to encode the scaled video data for a low resolution display and output low resolution video data.

Figure 15:
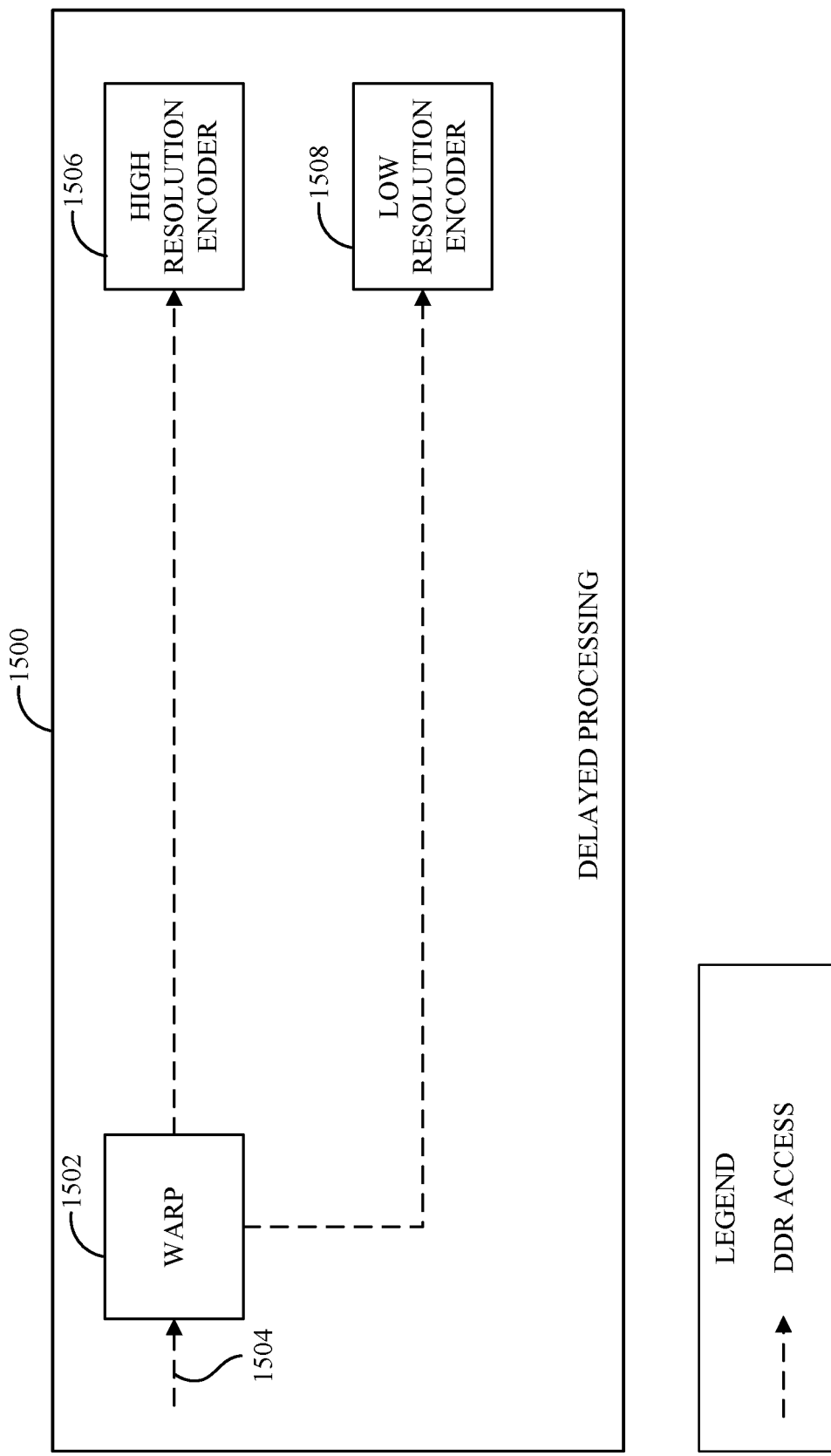
FIG. 15 is a diagram of another example of a delayed processing flow in accordance with embodiments of this disclosure.

FIG. 15 is a diagram of another example of a delayed processing flow 1500 in accordance with embodiments of this disclosure. The delayed processing flow 1500 may be the delayed processing flow 718, shown in FIG. 7, the delayed processing flow 822 shown in FIG. 8, the delayed processing flow 926 shown in FIG. 9, the delayed processing flow 1020 shown in FIG. 10, the delayed processing flow 1122 shown in FIG. 11, or the delayed processing flow 1226 shown in FIG. 12.

The delayed processing flow 1500 includes a warp component 1502 that includes circuitry configured to obtain high resolution YUV video data 1504 from a buffer. The high resolution YUV video data may be obtained via DDR access. The buffer may be a DDR memory buffer. The DDR memory buffer may be configured to support lossy compression with a constant 50% compression. The warp component 1502 includes circuitry configured to warp the high resolution YUV video data to obtain warped video data. The warp component 1502 includes circuitry configured to output the warped video data to a high resolution encoder 1506 and a low resolution encoder 1508 via DDR access.

The high resolution encoder 1506 includes circuitry configured to obtain the warped video data via DDR access. The warped video data may be accessed via one or more DDR memory buffers that support lossless compression with a constant 75% compression. The high resolution encoder 1506 includes circuitry to encode the warped video data for a high resolution display and output high resolution video data.

The low resolution encoder 1508 includes circuitry configured to obtain the warped video data via DDR access. The warped video data may be accessed via one or more DDR memory buffers that support lossless compression with a constant 75% compression. The low resolution encoder 1508 includes circuitry to encode the warped video data for a low resolution display and output low resolution video data.

Figure 16:
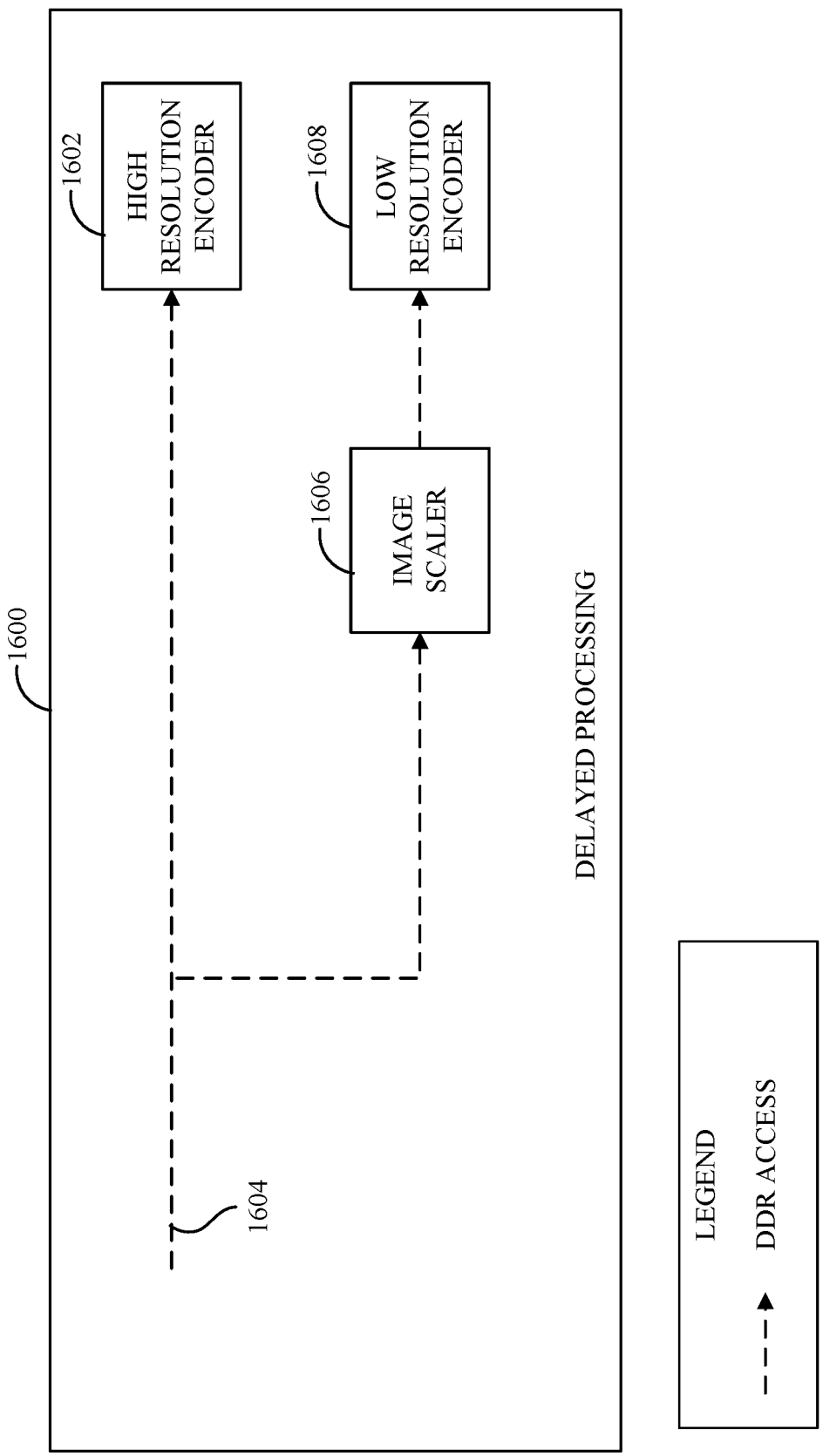
FIG. 16 is a diagram of another example of a delayed processing flow in accordance with embodiments of this disclosure.

FIG. 16 is a diagram of another example of a delayed processing flow 1600 in accordance with embodiments of this disclosure. The delayed processing flow 1600 may be the delayed processing flow 718, shown in FIG. 7, the delayed processing flow 822 shown in FIG. 8, the delayed processing flow 926 shown in FIG. 9, the delayed processing flow 1020 shown in FIG. 10, the delayed processing flow 1122 shown in FIG. 11, or the delayed processing flow 1226 shown in FIG. 12.

The high resolution encoder 1602 includes circuitry configured to obtain the high resolution YUV video data 1604 from a buffer via DDR access. The high resolution YUV video data 1604 may be accessed via one or more DDR memory buffers that support lossy compression with a constant 50% compression. The high resolution encoder 1602 includes circuitry to encode the high resolution YUV video data 1604 and output high resolution video data.

The image scaler 1606 includes circuitry configured to obtain the high resolution YUV video data 1604 from a buffer via DDR access. The high resolution YUV video data 1604 may be accessed via one or more DDR memory buffers that support lossy compression with a constant 50% compression. The image scaler 1606 includes circuitry configured to scale the high resolution YUV video data 1604 to obtain scaled video data for a low resolution display, such as one or more displays on an image capture device. The image scaler 1606 includes circuitry configured to output the scaled video data for a low resolution display to a low resolution encoder 1608 via DDR access.

The low resolution encoder 1608 includes circuitry configured to obtain the scaled video data for a low resolution display via DDR access. The scaled video data for a low resolution display may be accessed via one or more DDR memory buffers that support lossless compression with a constant 75% compression. The low resolution encoder 1608 includes circuitry to encode the scaled video data for a low resolution display and output low resolution video data.

In the example shown in FIG. 16, the flow to the high resolution encoder 1602 may be H264. The flow to the low resolution encoder 1608 may be optional, and may be activated dynamically. The frame rate of the flow to the high resolution encoder 1602 may be different than the frame rate of the flow to the low resolution encoder 1608. In some examples, the flow to the high resolution encoder 1602 can be YUV-10. The input buffer may be a direct output from a CNR (or an image scaler depending on common processing use cases) such that there is no delay. This example may be applicable for 4K120 where the power consumption (i.e., camera run time) is not long enough and other power hungry use cases. A codec callback may provide an image buffer pointer to either the CNR callback (or the image scaler callback depending on scenario data). Accordingly, the codec is the owner of its input buffer allocation.

Figure 17:
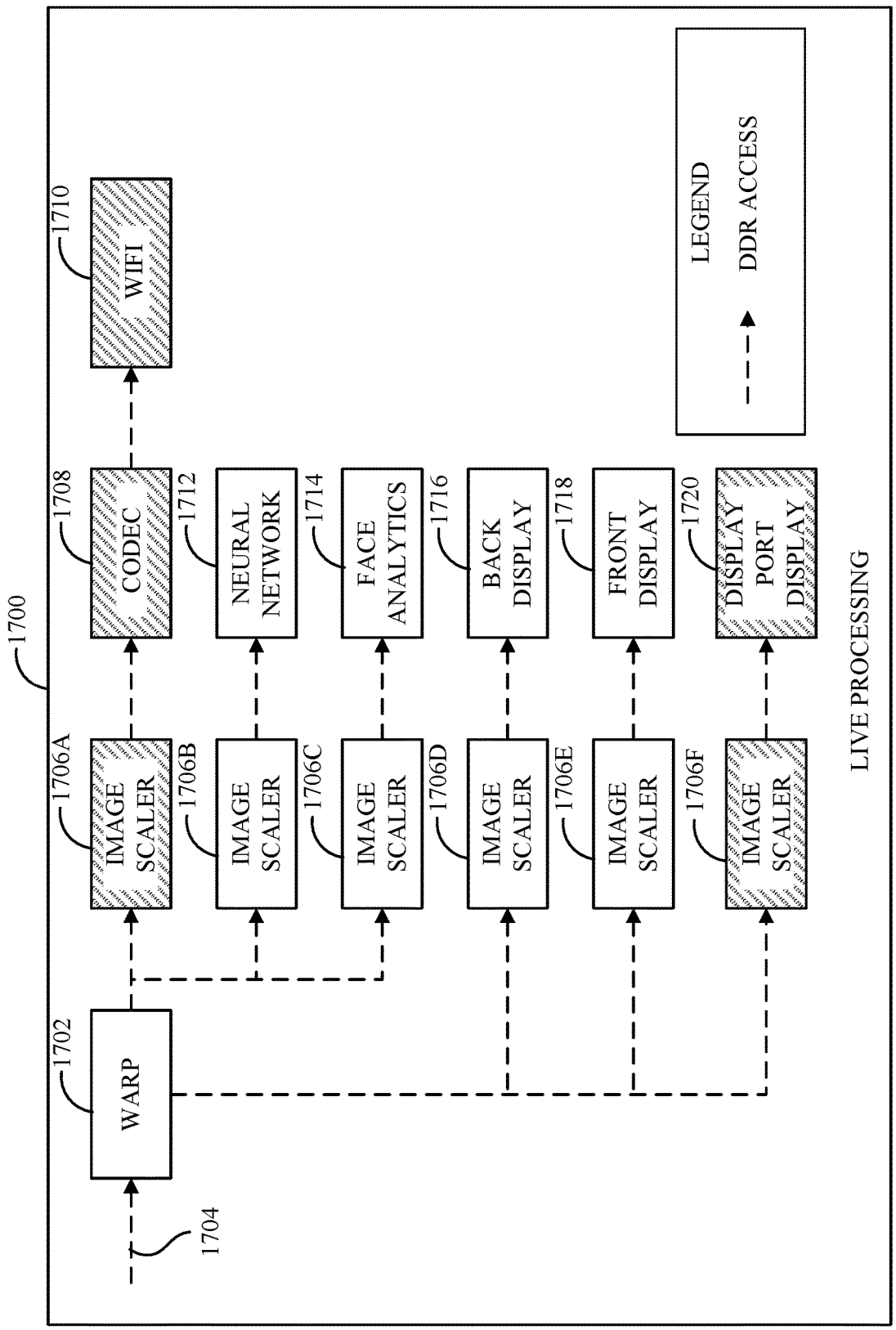
FIG. 17 is a diagram of an example of a live processing flow in accordance with embodiments of this disclosure.

FIG. 17 is a diagram of an example of a live processing flow 1700 in accordance with embodiments of this disclosure. The live processing flow 1700 may be the live processing flow 720, shown in FIG. 7, the live processing flow 824 shown in FIG. 8, the live processing flow 928 shown in FIG. 9, the live processing flow 1022 shown in FIG. 10, the live processing flow 1124 shown in FIG. 11, or the live processing flow 1228 shown in FIG. 12.

The example shown in FIG. 17 may apply for a 16:9 aspect ratio display and/or a 4:3 aspect ratio display. In an example, the live processing flow 1700 may be used during preview (video or still) or video record. The live processing flow 1700 may be configured to switch dynamically without scenario data, switch to live processing with live streaming, switch to live processing with a display port, or switch to live processing with a display port and live streaming. Mobile device preview can be activated and/or deactivated dynamically. The display port can be activated and/or deactivated dynamically. In this example, mobile device preview and the display port are deactivated.

The live processing flow 1700 includes a warp component 1702 that includes circuitry configured to obtain low resolution YUV video data 1704 from a buffer. The low resolution YUV video data 1704 may be obtained via DDR access. The buffer may be a DDR memory buffer. The DDR memory buffer may be configured to support lossy compression with a constant 50% compression. The warp component 1702 includes circuitry configured to warp the low resolution YUV video data 1704 to obtain warped video data. The warp component 1702 includes circuitry configured to output the warped video data to one or more image scalers, such as image scalers 1706A-F, via DDR access.

The image scaler 1706A includes circuitry configured to obtain the warped video data from the warp component 1702 via the DDR access. The image scaler 1706A includes circuitry configured to scale the warped video data to obtain scaled video data for a low resolution display. The image scaler 1706A includes circuitry configured to output the scaled video data for a low resolution display to a codec component 1708 via DDR access. The codec component 1708 is configured to encode the scaled video data for a remote display, such as a display of a mobile device, to obtain encoded video data. The codec component 1708 is configured to output the encoded video data via DDR access to a WiFi component 1710. The Wifi component 1710 includes circuitry configured to transmit the encoded video data to a remote display, such as a display of a mobile device. In this example, the image scaler 1706A, the codec component 1708, and the WiFi component 1710 are disabled and shown in in cross-hatching.

The image scaler 1706B includes circuitry configured to obtain the warped video data from the warp component 1702 via the DDR access. The image scaler 1706B includes circuitry configured to scale the warped video data to obtain scaled video data for a low resolution display. The image scaler 1706B includes circuitry configured to output the scaled video data for a low resolution display to a neural network component 1712, such as a convolutional neural network (CNN) via DDR access. The neural network component 1712 is configured to process the scaled video data scaled video data for a low resolution display to detect objects, detect scenes, or the like.

The image scaler 1706C includes circuitry configured to obtain the warped video data from the warp component 1702 via the DDR access. The image scaler 1706C includes circuitry configured to scale the warped video data to obtain scaled video data for a low resolution display. The image scaler 1706C includes circuitry configured to output the scaled video data for a low resolution display to a face analytics component 1714 via DDR access. The face analytics component 1714 is configured to process the scaled video data for a low resolution display to detect one or more faces. The face analytics component 1714 may be configured to generate bounding boxes around the one or more detected faces for display on one or more displays of an image capture device.

The image scaler 1706D includes circuitry configured to obtain the warped video data from the warp component 1702 via the DDR access. The image scaler 1706D includes circuitry configured to scale the warped video data to obtain scaled video data for a low resolution display. The image scaler 1706D includes circuitry configured to output the scaled video data for a low resolution display to a back display 1716 of the image capture device via DDR access. The back display 1716 is configured to display the scaled video data for a low resolution display.

The image scaler 1706E includes circuitry configured to obtain the warped video data from the warp component 1702 via the DDR access. The image scaler 1706E includes circuitry configured to scale the warped video data to obtain scaled video data for a low resolution display. The image scaler 1706E includes circuitry configured to output the scaled video data for a low resolution display to a front display 1718 of the image capture device via DDR access. The front display 1718 is configured to display the scaled video data for a low resolution display.

The image scaler 1706F includes circuitry configured to obtain the warped video data from the warp component 1702 via the DDR access. The image scaler 1706F includes circuitry configured to scale the warped video data to obtain scaled video data for a low resolution display. The image scaler 1706F includes circuitry configured to output the scaled video data for a low resolution display to a display port display 1720 via DDR access. The display port display 1720 is an external display that is connected to a display port of the image capture device and configured to display the scaled video data for a low resolution display. In this example, the image scaler 1706F and the display port display 1720 are disabled and shown in cross-hatching.

Figure 18:
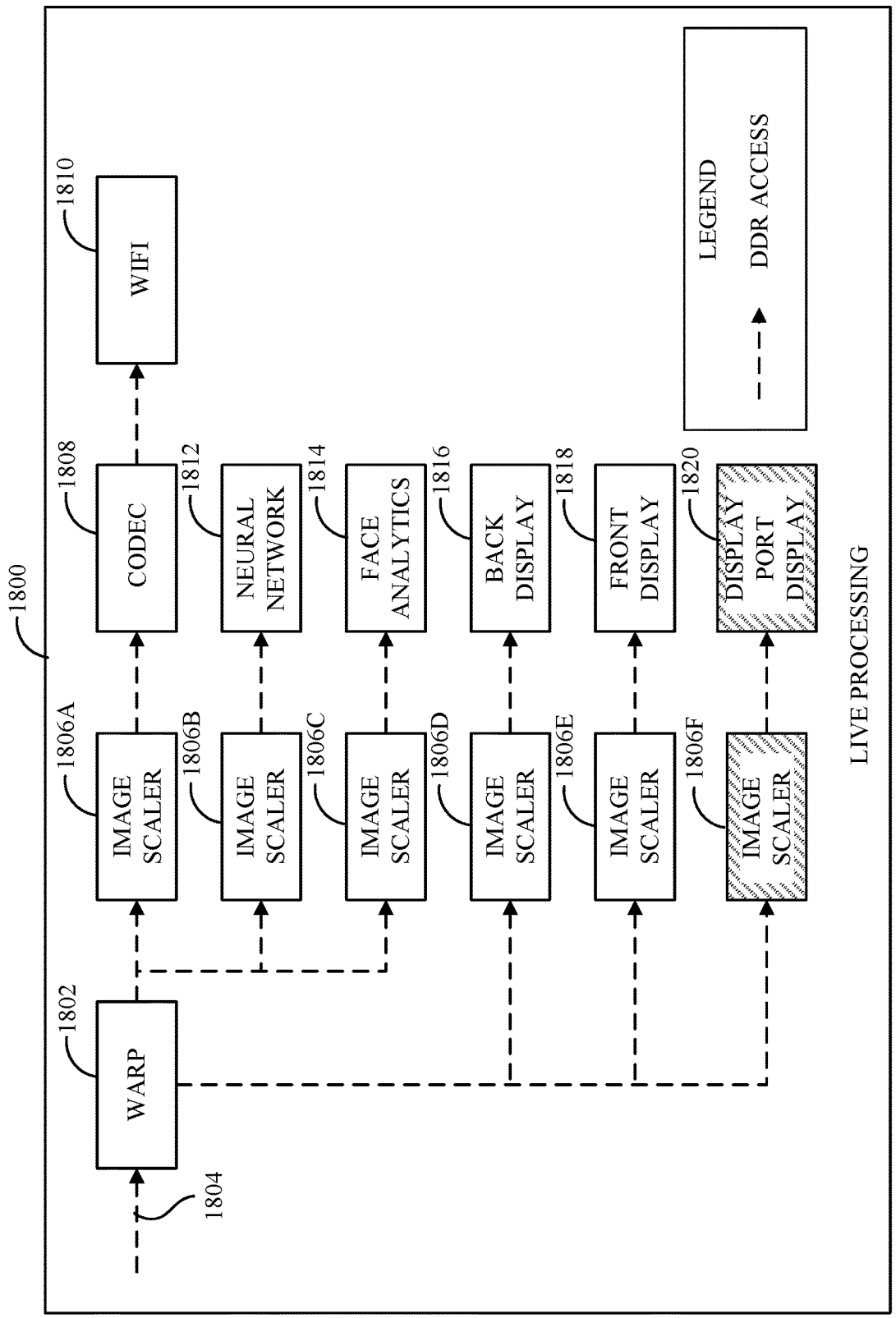
FIG. 18 is a diagram of another example of a live processing flow in accordance with embodiments of this disclosure.

FIG. 18 is a diagram of another example of a live processing flow 1800 in accordance with embodiments of this disclosure. The live processing flow 1800 may be the live processing flow 720, shown in FIG. 7, the live processing flow 824 shown in FIG. 8, the live processing flow 928 shown in FIG. 9, the live processing flow 1022 shown in FIG. 10, the live processing flow 1124 shown in FIG. 11, or the live processing flow 1228 shown in FIG. 12.

The example shown in FIG. 18 may apply for a 16:9 aspect ratio display and/or a 4:3 aspect ratio display. In an example, the live processing flow 1800 may be used during preview (video or still) or video record. The live processing flow 1800 may be configured to switch dynamically without scenario data, switch to live processing with live streaming, switch to live processing with a display port, or switch to live processing with a display port and live streaming. Mobile device preview can be activated and/or deactivated dynamically. The display port can be activated and/or deactivated dynamically. In this example, the display port is deactivated.

The live processing flow 1800 includes a warp component 1802 that includes circuitry configured to obtain low resolution YUV video data 1804 from a buffer. The low resolution YUV video data 1804 may be obtained via DDR access. The buffer may be a DDR memory buffer. The DDR memory buffer may be configured to support lossy compression with a constant 50% compression. The warp component 1802 includes circuitry configured to warp the low resolution YUV video data 1804 to obtain warped video data. The warp component 1802 includes circuitry configured to output the warped video data to one or more image scalers, such as image scalers 1806A-F, via DDR access.

The image scaler 1806A includes circuitry configured to obtain the warped video data from the warp component 1802 via the DDR access. The image scaler 1806A includes circuitry configured to scale the warped video data to obtain scaled video data for a low resolution display. The image scaler 1806A includes circuitry configured to output the scaled video data for a low resolution display to a codec component 1808 via DDR access. The codec component 1808 is configured to encode the scaled video data for a remote display, such as a display of a mobile device, to obtain encoded video data. The codec component 1808 is configured to output the encoded video data via DDR access to a WiFi component 1810. The Wifi component 1710 includes circuitry configured to transmit the encoded video data to a remote display, such as a display of a mobile device.

The image scaler 1806B includes circuitry configured to obtain the warped video data from the warp component 1802 via the DDR access. The image scaler 1806B includes circuitry configured to scale the warped video data to obtain scaled video data for a low resolution display. The image scaler 1806B includes circuitry configured to output the scaled video data for a low resolution display to a neural network component 1812, such as a CNN via DDR access. The neural network component 1812 is configured to process the scaled video data scaled video data for a low resolution display to detect objects, detect scenes, or the like.

The image scaler 1806C includes circuitry configured to obtain the warped video data from the warp component 1802 via the DDR access. The image scaler 1806C includes circuitry configured to scale the warped video data to obtain scaled video data for a low resolution display. The image scaler 1806C includes circuitry configured to output the scaled video data for a low resolution display to a face analytics component 1814 via DDR access. The face analytics component 1814 is configured to process the scaled video data for a low resolution display to detect one or more faces. The face analytics component 1814 may be configured to generate bounding boxes around the one or more detected faces for display on one or more displays of an image capture device.

The image scaler 1806D includes circuitry configured to obtain the warped video data from the warp component 1802 via the DDR access. The image scaler 1806D includes circuitry configured to scale the warped video data to obtain scaled video data for a low resolution display. The image scaler 1806D includes circuitry configured to output the scaled video data for a low resolution display to a back display 1816 of the image capture device via DDR access. The back display 1816 is configured to display the scaled video data for a low resolution display.

The image scaler 1806E includes circuitry configured to obtain the warped video data from the warp component 1802 via the DDR access. The image scaler 1806E includes circuitry configured to scale the warped video data to obtain scaled video data for a low resolution display. The image scaler 1806E includes circuitry configured to output the scaled video data for a low resolution display to a front display 1818 of the image capture device via DDR access. The front display 1818 is configured to display the scaled video data for a low resolution display.

The image scaler 1806F includes circuitry configured to obtain the warped video data from the warp component 1802 via the DDR access. The image scaler 1806F includes circuitry configured to scale the warped video data to obtain scaled video data for a low resolution display. The image scaler 1806F includes circuitry configured to output the scaled video data for a low resolution display to a display port display 1820 via DDR access. The display port display 1820 is an external display that is connected to a display port of the image capture device and configured to display the scaled video data for a low resolution display. In this example, the image scaler 1806F and the display port display 1820 are disabled and shown in cross-hatching.

Figure 19:
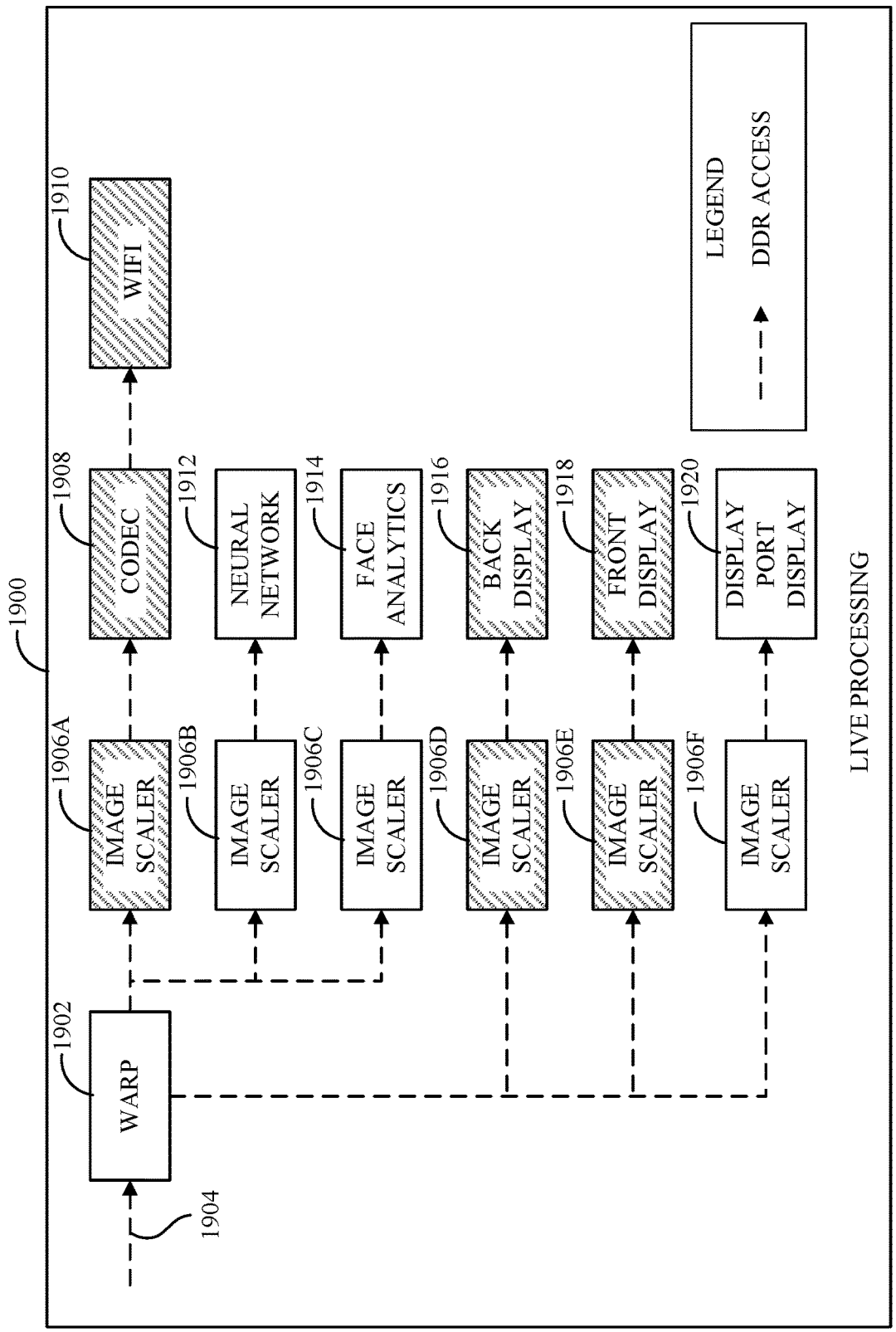
FIG. 19 is a diagram of another example of a live processing flow in accordance with embodiments of this disclosure.

FIG. 19 is a diagram of another example of a live processing flow 1900 in accordance with embodiments of this disclosure. The live processing flow 1900 may be the live processing flow 720, shown in FIG. 7, the live processing flow 824 shown in FIG. 8, the live processing flow 928 shown in FIG. 9, the live processing flow 1022 shown in FIG. 10, the live processing flow 1124 shown in FIG. 11, or the live processing flow 1228 shown in FIG. 12.

The example shown in FIG. 19 may apply for a 16:9 aspect ratio display and/or a 4:3 aspect ratio display. In an example, the live processing flow 1900 may be used during preview (video or still) or video record. The live processing flow 1900 may be configured to switch dynamically without scenario data, switch to live processing with live streaming, switch to live processing with a display port, or switch to live processing with a display port and live streaming. Mobile device preview can be activated and/or deactivated dynamically. The display port can be activated and/or deactivated dynamically. In this example, mobile device preview, the front display of the image capture device, and the back display of the image capture device are deactivated.

The live processing flow 1900 includes a warp component 1902 that includes circuitry configured to obtain low resolution YUV video data 1904 from a buffer. The low resolution YUV video data 1904 may be obtained via DDR access. The buffer may be a DDR memory buffer. The DDR memory buffer may be configured to support lossy compression with a constant 50% compression. The warp component 1902 includes circuitry configured to warp the low resolution YUV video data 1904 to obtain warped video data. The warp component 1902 includes circuitry configured to output the warped video data to one or more image scalers, such as image scalers 1906A-F, via DDR access.

The image scaler 1906A includes circuitry configured to obtain the warped video data from the warp component 1902 via the DDR access. The image scaler 1906A includes circuitry configured to scale the warped video data to obtain scaled video data for a low resolution display. The image scaler 1906A includes circuitry configured to output the scaled video data for a low resolution display to a codec component 1908 via DDR access. The codec component 1908 is configured to encode the scaled video data for a remote display, such as a display of a mobile device, to obtain encoded video data. The codec component 1908 is configured to output the encoded video data via DDR access to a WiFi component 1910. The Wifi component 1910 includes circuitry configured to transmit the encoded video data to a remote display, such as a display of a mobile device. In this example, the image scaler 1906A, the codec component 1908, and the WiFi component 1910 are disabled and shown in in cross-hatching.

The image scaler 1906B includes circuitry configured to obtain the warped video data from the warp component 1902 via the DDR access. The image scaler 1906B includes circuitry configured to scale the warped video data to obtain scaled video data for a low resolution display. The image scaler 1906B includes circuitry configured to output the scaled video data for a low resolution display to a neural network component 1912, such as a CNN via DDR access. The neural network component 1912 is configured to process the scaled video data scaled video data for a low resolution display to detect objects, detect scenes, or the like.

The image scaler 1906C includes circuitry configured to obtain the warped video data from the warp component 1902 via the DDR access. The image scaler 1906C includes circuitry configured to scale the warped video data to obtain scaled video data for a low resolution display. The image scaler 1906C includes circuitry configured to output the scaled video data for a low resolution display to a face analytics component 1914 via DDR access. The face analytics component 1914 is configured to process the scaled video data for a low resolution display to detect one or more faces. The face analytics component 1914 may be configured to generate bounding boxes around the one or more detected faces for display on one or more displays of an image capture device.

The image scaler 1906D includes circuitry configured to obtain the warped video data from the warp component 1902 via the DDR access. The image scaler 1906D includes circuitry configured to scale the warped video data to obtain scaled video data for a low resolution display. The image scaler 1906D includes circuitry configured to output the scaled video data for a low resolution display to a back display 1916 of the image capture device via DDR access. The back display 1916 is configured to display the scaled video data for a low resolution display. In this example, the image scaler 1906D and the back display 1916 are disabled and shown in cross-hatching.

The image scaler 1906E includes circuitry configured to obtain the warped video data from the warp component 1902 via the DDR access. The image scaler 1906E includes circuitry configured to scale the warped video data to obtain scaled video data for a low resolution display. The image scaler 1906E includes circuitry configured to output the scaled video data for a low resolution display to a front display 1918 of the image capture device via DDR access. The front display 1918 is configured to display the scaled video data for a low resolution display. In this example, the image scaler 1906E and the front display 1918 are disabled and shown in cross-hatching.

The image scaler 1906F includes circuitry configured to obtain the warped video data from the warp component 1902 via the DDR access. The image scaler 1906F includes circuitry configured to scale the warped video data to obtain scaled video data for a low resolution display. The image scaler 1906F includes circuitry configured to output the scaled video data for a low resolution display to a display port display 1920 via DDR access. The display port display 1920 is an external display that is connected to a display port of the image capture device and configured to display the scaled video data for a low resolution display.

Figure 20:
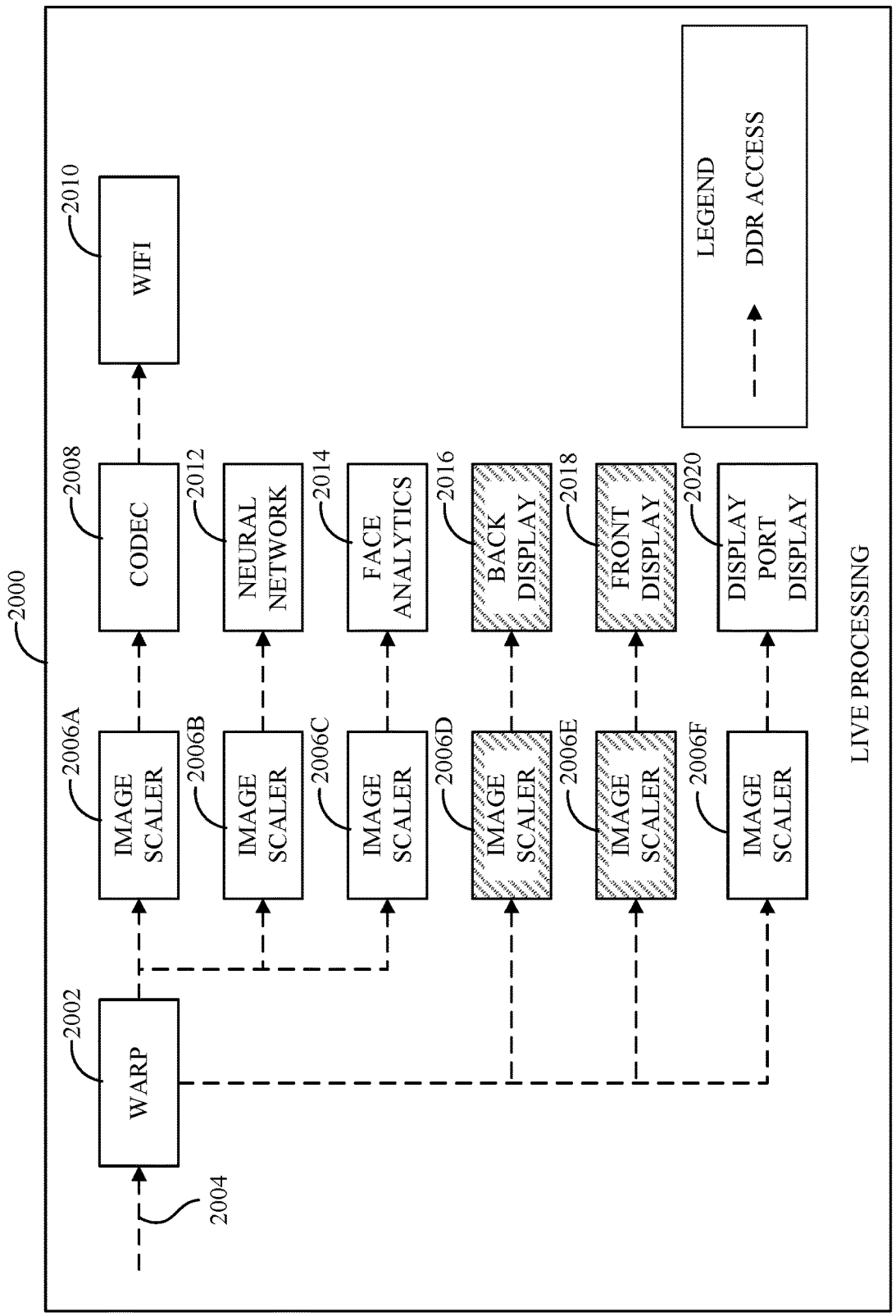
FIG. 20 is a diagram of another example of a live processing flow in accordance with embodiments of this disclosure.

FIG. 20 is a diagram of another example of a live processing flow 2000 in accordance with embodiments of this disclosure. The live processing flow 2000 may be the live processing flow 720, shown in FIG. 7, the live processing flow 824 shown in FIG. 8, the live processing flow 928 shown in FIG. 9, the live processing flow 1022 shown in FIG. 10, the live processing flow 1124 shown in FIG. 11, or the live processing flow 1228 shown in FIG. 12.

The example shown in FIG. 20 may apply for a 16:9 aspect ratio display and/or a 4:3 aspect ratio display. In an example, the live processing flow 2000 may be used during preview (video or still) or video record. The live processing flow 2000 may be configured to switch dynamically without scenario data, switch to live processing with live streaming, switch to live processing with a display port, or switch to live processing with a display port and live streaming. Mobile device preview can be activated and/or deactivated dynamically. The display port can be activated and/or deactivated dynamically. In this example, the back display and the front display of the image capture device are deactivated.

The live processing flow 2000 includes a warp component 2002 that includes circuitry configured to obtain low resolution YUV video data 2004 from a buffer. The low resolution YUV video data 2004 may be obtained via DDR access. The buffer may be a DDR memory buffer. The DDR memory buffer may be configured to support lossy compression with a constant 50% compression. The warp component 2002 includes circuitry configured to warp the low resolution YUV video data 2004 to obtain warped video data. The warp component 2002 includes circuitry configured to output the warped video data to one or more image scalers, such as image scalers 2006A-F, via DDR access.

The image scaler 2006A includes circuitry configured to obtain the warped video data from the warp component 2002 via the DDR access. The image scaler 2006A includes circuitry configured to scale the warped video data to obtain scaled video data for a low resolution display. The image scaler 2006A includes circuitry configured to output the scaled video data for a low resolution display to a codec component 2008 via DDR access. The codec component 2008 is configured to encode the scaled video data for a remote display, such as a display of a mobile device, to obtain encoded video data. The codec component 2008 is configured to output the encoded video data via DDR access to a WiFi component 2010. The Wifi component 2010 includes circuitry configured to transmit the encoded video data to a remote display, such as a display of a mobile device.

The image scaler 2006B includes circuitry configured to obtain the warped video data from the warp component 2002 via the DDR access. The image scaler 2006B includes circuitry configured to scale the warped video data to obtain scaled video data for a low resolution display. The image scaler 2006B includes circuitry configured to output the scaled video data for a low resolution display to a neural network component 2012, such as a CNN via DDR access. The neural network component 2012 is configured to process the scaled video data scaled video data for a low resolution display to detect objects, detect scenes, or the like.

The image scaler 2006C includes circuitry configured to obtain the warped video data from the warp component 2002 via the DDR access. The image scaler 2006C includes circuitry configured to scale the warped video data to obtain scaled video data for a low resolution display. The image scaler 2006C includes circuitry configured to output the scaled video data for a low resolution display to a face analytics component 2014 via DDR access. The face analytics component 2014 is configured to process the scaled video data for a low resolution display to detect one or more faces. The face analytics component 2014 may be configured to generate bounding boxes around the one or more detected faces for display on one or more displays of an image capture device.

The image scaler 2006D includes circuitry configured to obtain the warped video data from the warp component 2002 via the DDR access. The image scaler 2006D includes circuitry configured to scale the warped video data to obtain scaled video data for a low resolution display. The image scaler 2006D includes circuitry configured to output the scaled video data for a low resolution display to a back display 2016 of the image capture device via DDR access. The back display 2016 is configured to display the scaled video data for a low resolution display. In this example, the image scaler 2006D and the back display 2016 are disabled and shown in cross-hatching.

The image scaler 2006E includes circuitry configured to obtain the warped video data from the warp component 2002 via the DDR access. The image scaler 2006E includes circuitry configured to scale the warped video data to obtain scaled video data for a low resolution display. The image scaler 2006E includes circuitry configured to output the scaled video data for a low resolution display to a front display 2018 of the image capture device via DDR access. The front display 2018 is configured to display the scaled video data for a low resolution display. In this example, the image scaler 2006E and the front display 2018 are disabled and shown in cross-hatching.

The image scaler 2006F includes circuitry configured to obtain the warped video data from the warp component 2002 via the DDR access. The image scaler 2006F includes circuitry configured to scale the warped video data to obtain scaled video data for a low resolution display. The image scaler 2006F includes circuitry configured to output the scaled video data for a low resolution display to a display port display 2020 via DDR access. The display port display 2020 is an external display that is connected to a display port of the image capture device and configured to display the scaled video data for a low resolution display.

Figure 21:
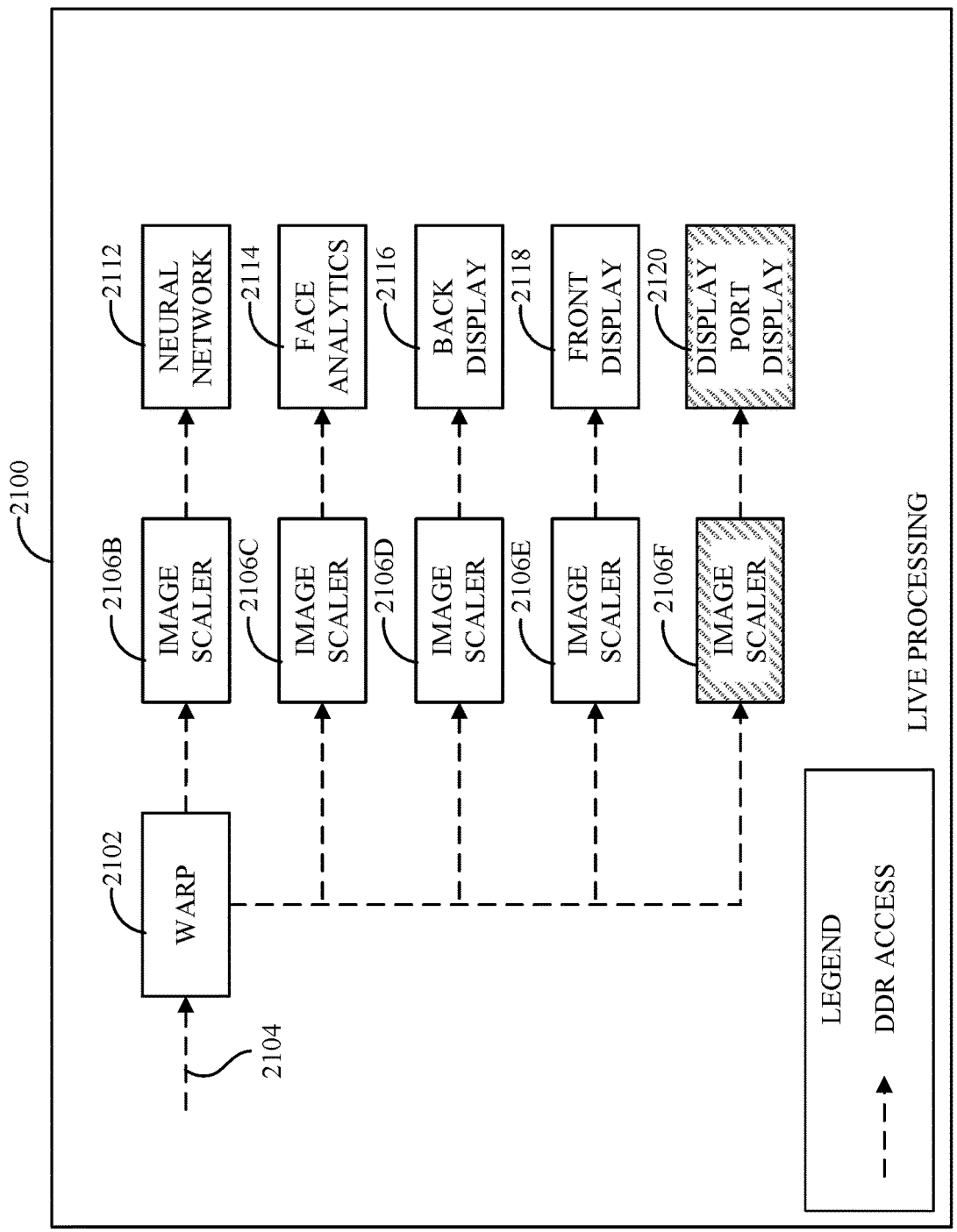
FIG. 21 is a diagram of another example of a live processing flow in accordance with embodiments of this disclosure.

FIG. 21 is a diagram of another example of a live processing flow 2100 in accordance with embodiments of this disclosure. The live processing flow 2100 may be the live processing flow 720, shown in FIG. 7, the live processing flow 824 shown in FIG. 8, the live processing flow 928 shown in FIG. 9, the live processing flow 1022 shown in FIG. 10, the live processing flow 1124 shown in FIG. 11, or the live processing flow 1228 shown in FIG. 12.

The example shown in FIG. 21 may apply for a 16:9 aspect ratio display and/or a 4:3 aspect ratio display. This example may be suitable for low power preview. During low power preview, a resolution of 480p may be used, for example. In an example, the live processing flow 2100 may be used during preview (video or still) or video record. The live processing flow 2100 may be configured to switch dynamically without scenario data, switch to live processing with live streaming, switch to live processing with a display port, or switch to live processing with a display port and live streaming. Mobile device preview can be activated and/or deactivated dynamically. The display port can be activated and/or deactivated dynamically. In this example, the display port is deactivated.

The live processing flow 2100 includes a warp component 2002 that includes circuitry configured to obtain low resolution YUV video data 2104 from a buffer. The low resolution YUV video data 2104 may be obtained via DDR access. The buffer may be a DDR memory buffer. The DDR memory buffer may be configured to support lossy compression with a constant 50% compression. The warp component 2102 includes circuitry configured to warp the low resolution YUV video data 2104 to obtain warped video data. The warp component 2102 includes circuitry configured to output the warped video data to one or more image scalers, such as image scalers 2106A-F, via DDR access.

The image scaler 2106B includes circuitry configured to obtain the warped video data from the warp component 2102 via the DDR access. The image scaler 2106B includes circuitry configured to scale the warped video data to obtain scaled video data for a low resolution display. The image scaler 2106B includes circuitry configured to output the scaled video data for a low resolution display to a neural network component 2112, such as a CNN via DDR access. The neural network component 2112 is configured to process the scaled video data scaled video data for a low resolution display to detect objects, detect scenes, or the like.

The image scaler 2106C includes circuitry configured to obtain the warped video data from the warp component 2102 via the DDR access. The image scaler 2106C includes circuitry configured to scale the warped video data to obtain scaled video data for a low resolution display. The image scaler 2106C includes circuitry configured to output the scaled video data for a low resolution display to a face analytics component 2114 via DDR access. The face analytics component 2114 is configured to process the scaled video data for a low resolution display to detect one or more faces. The face analytics component 2114 may be configured to generate bounding boxes around the one or more detected faces for display on one or more displays of an image capture device.

The image scaler 2106D includes circuitry configured to obtain the warped video data from the warp component 2102 via the DDR access. The image scaler 2106D includes circuitry configured to scale the warped video data to obtain scaled video data for a low resolution display. The image scaler 2106D includes circuitry configured to output the scaled video data for a low resolution display to a back display 2116 of the image capture device via DDR access.

The back display 2116 is configured to display the scaled video data for a low resolution display. In this example, the image scaler 2106D and the back display 2116 are disabled and shown in cross-hatching.

The image scaler 2106E includes circuitry configured to obtain the warped video data from the warp component 2102 via the DDR access. The image scaler 2106E includes circuitry configured to scale the warped video data to obtain scaled video data for a low resolution display. The image scaler 2106E includes circuitry configured to output the scaled video data for a low resolution display to a front display 2118 of the image capture device via DDR access. The front display 2118 is configured to display the scaled video data for a low resolution display. In this example, the image scaler 2106E and the front display 2118 are disabled and shown in cross-hatching.

The image scaler 2106F includes circuitry configured to obtain the warped video data from the warp component 2102 via the DDR access. The image scaler 2106F includes circuitry configured to scale the warped video data to obtain scaled video data for a low resolution display. The image scaler 2106F includes circuitry configured to output the scaled video data for a low resolution display to a display port display 2120 via DDR access. The display port display 2120 is an external display that is connected to a display port of the image capture device and configured to display the scaled video data for a low resolution display. In this example, the image scaler 2106F and the display port display 2120 are disabled and shown in cross-hatching.

Figure 22A:
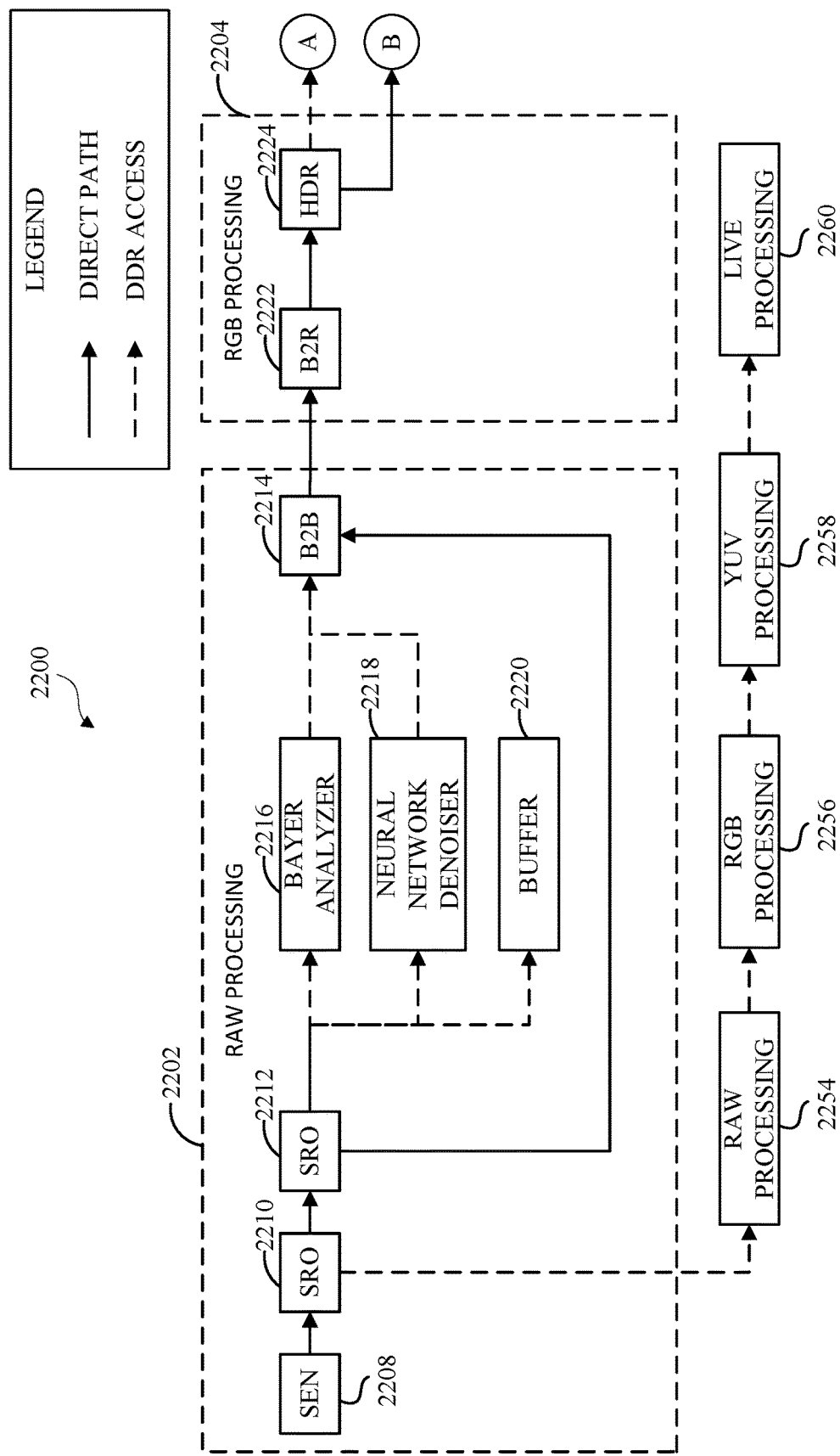
FIGS. 22A-B are a diagram of an example of a still and preview use case processing flow in accordance with embodiments of this disclosure.
Figure 22B:
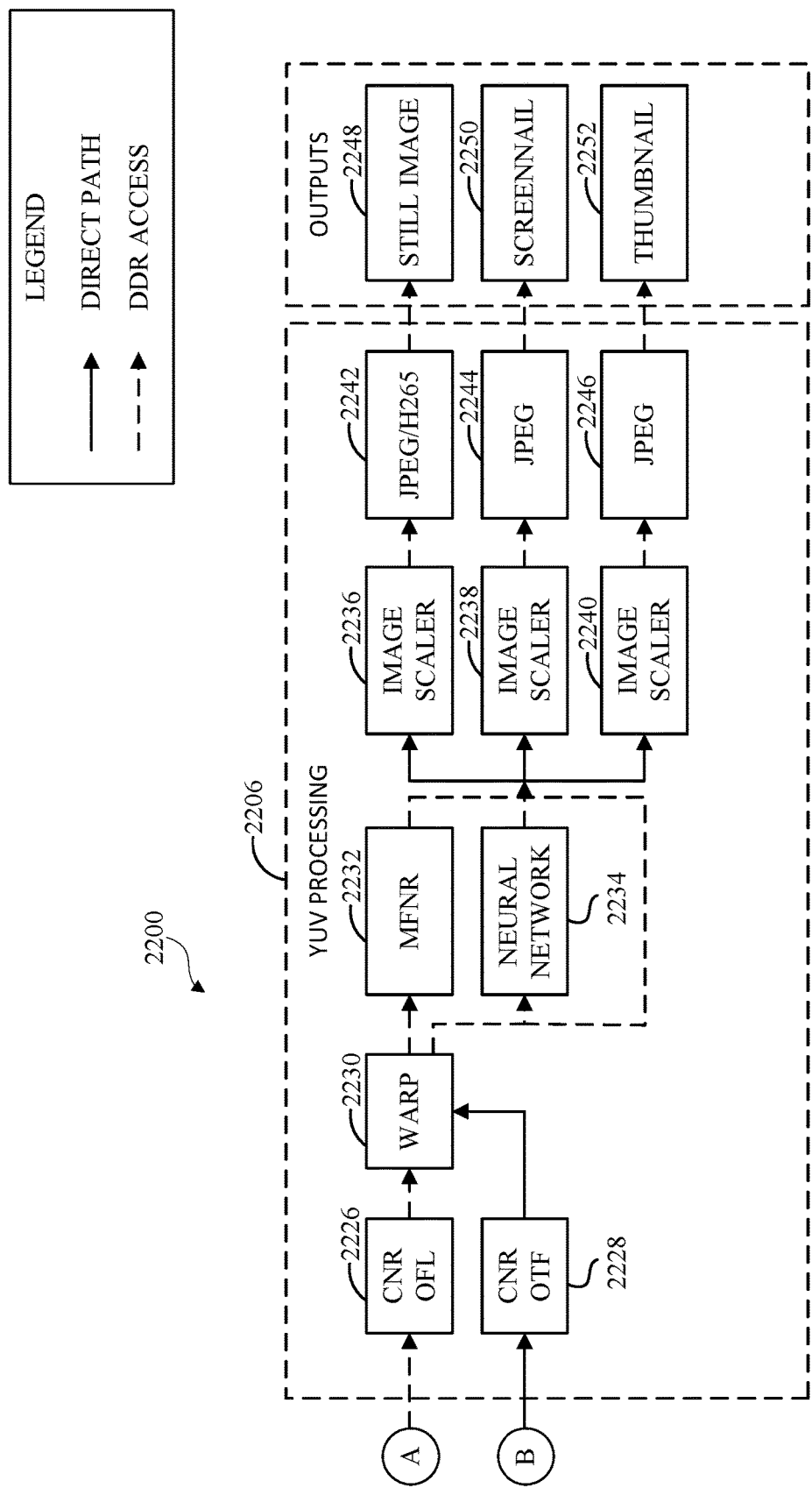

FIGS. 22A-B are a diagram of an example of still and preview processing flow 2200 in accordance with embodiments of this disclosure. This example may be applied to still images with preview. This example may support single photo and continuous photo with preview, timelapse photo and video with preview, bursts with preview, super photo (LTM, BA, MFNR, no HDR), and RAW DNG. The still and preview processing flow 2200 includes a raw processing component 2202, an RGB processing component 2204, and a YUV processing component 2206. The solid arrows shown in FIGS. 22A-B depict a direct access path in which access to a DDR memory buffer is not required. The direct access path remains on the image processor.

The raw processing component 2202 includes a SEN component 2208, SRO component 2210, SRO component 2212, and a B2B component 2214. The SEN component 2208 may be the SEN component 505 shown in FIG. 5. The SRO component 2210 may be the SRO components 515 and 517 shown in FIG. 5. The SEN component 2208 and the SRO component 2210 are configured to perform raw pixel processing for the preview and the still image.

The B2B component 2214 may be the B2B component 540 shown in FIG. 5. In some implementations, the raw processing component 2202 may include a Bayer analyzer 2216, a neural network denoiser 2218, a buffer 2220, or a combination thereof. The buffer 2220 may be a DDR memory buffer that supports lossless compression with a constant 75% compression that may be used to store raw DNG images. In one example, the SRO component 2212, the Bayer analyzer 2216, and the B2B component 2214 may perform raw pixel processing that includes two-dimensional (2D) denoising. In another example, the SRO component 2212, the neural network denoiser 2218, and the B2B component 2214 may perform raw pixel processing that includes 2D denoising.

The RGB processing component 2204 includes a B2R component 2222 and an HDR component 2224. The B2R component 2222 may be the B2R components 550 and 552 shown in FIG. 5. The HDR component 2224 may be the HDR component 555 shown in FIG. 5. The B2R component 2222 and the HDR component 2224 may be used to perform global tone mapping and local tone mapping.

The YUV processing component 2206 includes a CNR OFL component 2226, a CNR OTF component 2228, a warping component 2230, a multiframe noise reduction (MFNR) component 2232, a neural network 2234, an image scaler 2236, an image scaler 2238, an image scaler 2240, a JPEG/H265 generator 2242, a JPEG generator 2244, and a JPEG generator 2246. The CNR OFL component 2226 may be the CNR OFL component 575 shown in FIG. 5. The CNR OFL component 2226 is configured to perform off the flight processing for global tone mapping and local tone mapping. The CNR OTF component 2228 is configured to perform on the flight processing, similar to video flow, for global tone mapping and local tone mapping. The warping component is configured to perform registration and electronic rolling shutter (ERS) correction. The MFNR component 2232 or the neural network 2234 can be used to perform denoising. The neural network 2234 may perform 2D or 3D denoising. In some examples, the MFNR component 2232 and the neural network 2234 may be bypassed.

The image scaler 2236 is configured to obtain a denoised image and scale the denoised image to obtain a scaled image. The JPEG/H265 generator 2242 is configured to obtain the scaled imaged from the image scaler 2236 and generate and output a full resolution still image 2248. The image scaler 2238 is configured to obtain a denoised image and scale the denoised image to obtain a scaled image. The JPEG generator 2244 is configured to obtain the scaled image from the image scaler 2238 and generate and output a screennail image 2250. The image scaler 2240 is configured to obtain a denoised image and scale the denoised image to obtain a scaled image. The JPEG generator 2246 is configured to obtain the scaled image from the image scaler 2240 and generate and output a thumbnail image 2252.

The still and preview processing flow 2200 includes a raw processing component 2254, an RGB processing component 2256, a YUV processing component 2258, and a live processing component 2260. The raw processing component 2254 may be the raw processing component 602 shown in FIG. 6. The RGB processing component 2256 may be the RGB processing component 604 shown in FIG. 6. The YUV processing component 2258 may be the YUV processing component 606 shown in FIG. 6. The live processing component 2260 may implement the live processing flow 1700 shown in FIG. 17, the live processing flow 1800 shown in FIG. 18, the live processing flow 1900 shown in FIG. 19, the live processing flow 2000 shown in FIG. 20, or the live processing flow 2100 shown in FIG. 21.

Figure 23A:
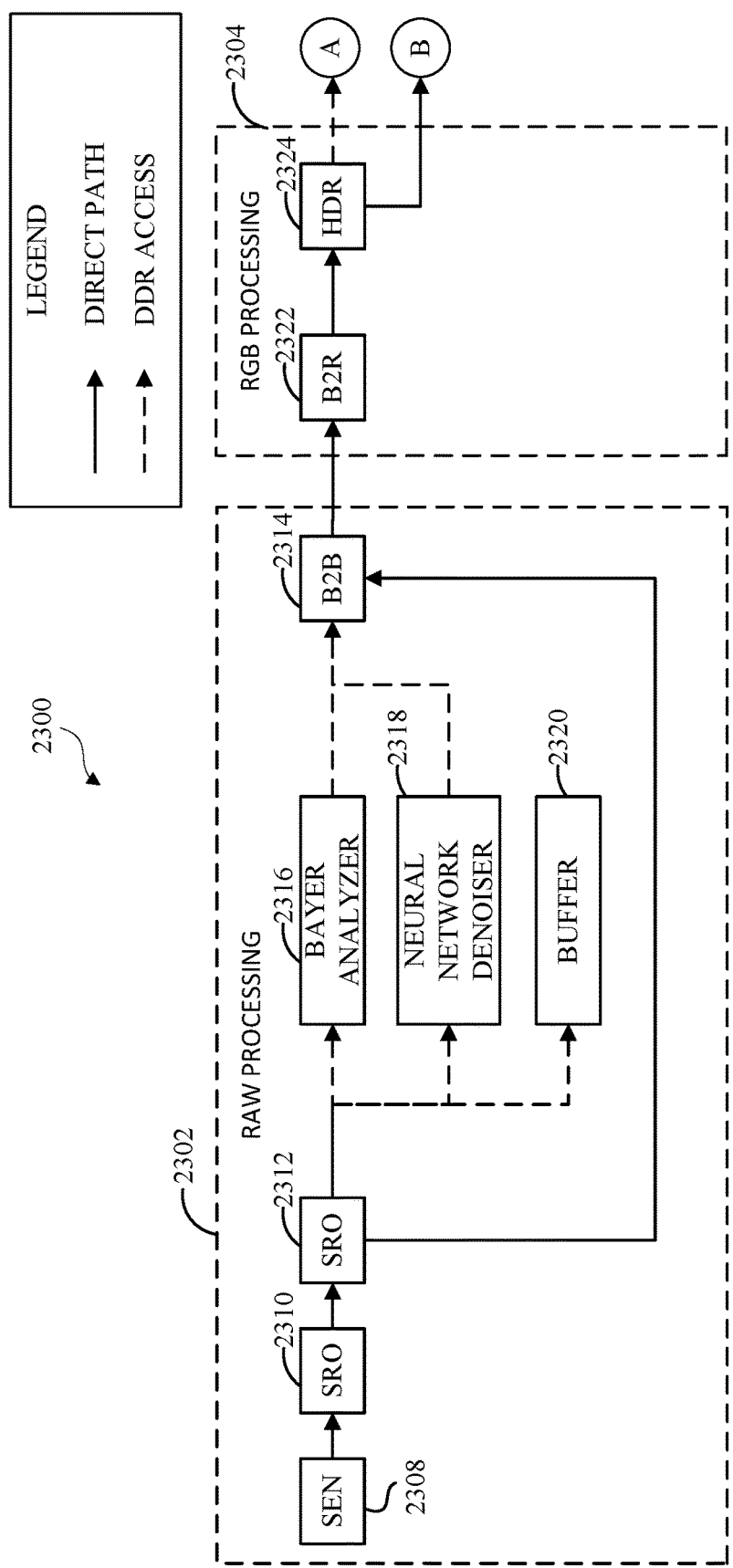
FIGS. 23A-B are a diagram of an example of a still use case processing flow in accordance with embodiments of this disclosure.
Figure 23B:
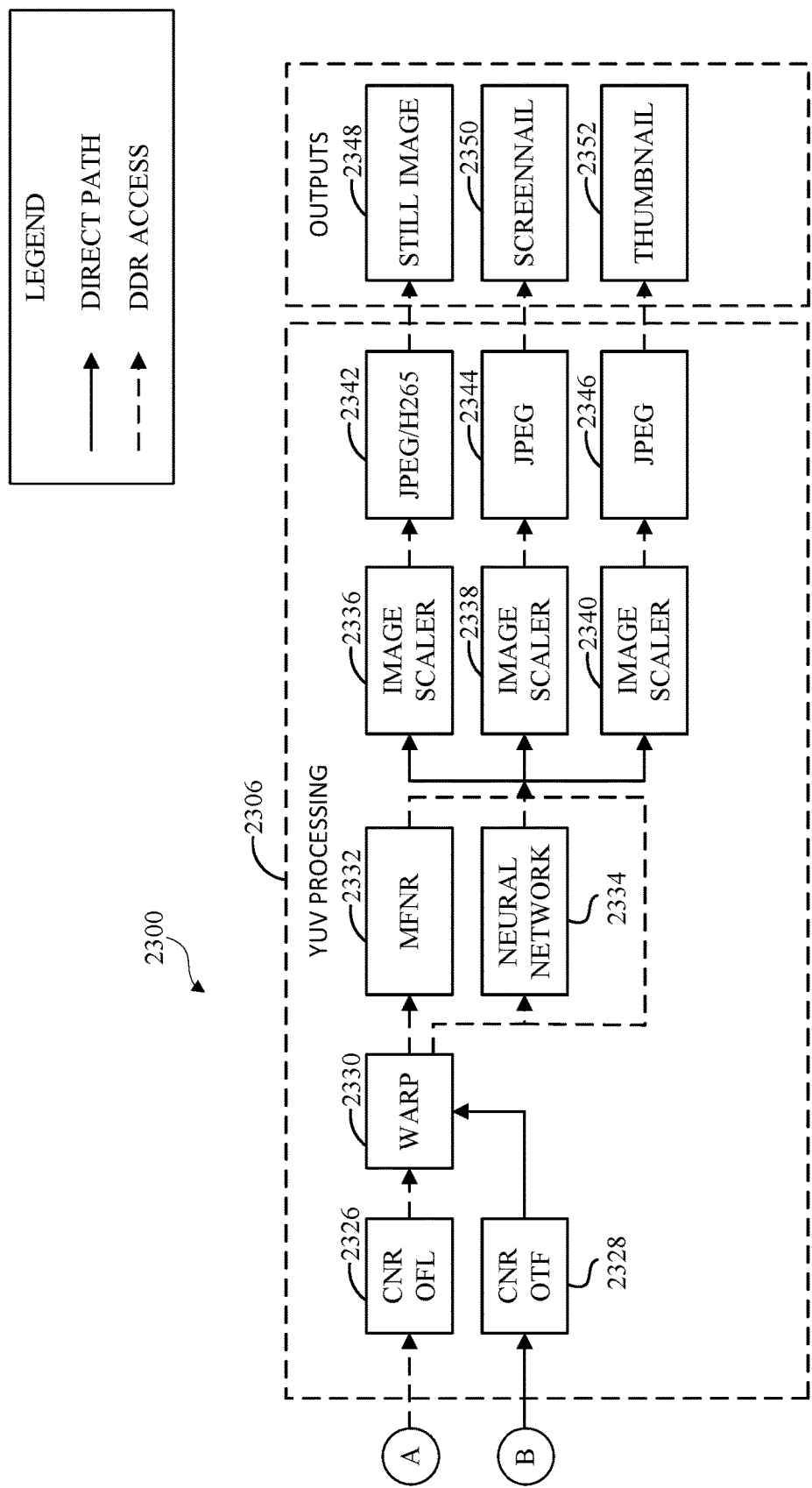

FIGS. 23A-B are a diagram of an example of a still use case processing flow 2300 in accordance with embodiments of this disclosure. This example may be applied to still images without preview. This example may support single photo and continuous photo without preview, timelapse photo and video without preview, bursts without preview, super photo (LTM, BA, MFNR, no HDR), and RAW DNG. The still processing flow 2300 includes a raw processing component 2302, an RGB processing component 2304, and a YUV processing component 2306. The solid arrows shown in FIGS. 23A-B depict a direct access path in which access to a DDR memory buffer is not required. The direct access path remains on the image processor.

The raw processing component 2302 includes a SEN component 2308, SRO component 2310, SRO component 2312, and a B2B component 2314. The SEN component 2308 may be the SEN component 505 shown in FIG. 5. The SRO component 2310 may be the SRO components 515 and 517 shown in FIG. 5. The SEN component 2308 and the SRO component 2310 are configured to perform raw pixel processing for the still image.

The B2B component 2314 may be the B2B component 540 shown in FIG. 5. In some implementations, the raw processing component 2302 may include a Bayer analyzer 2316, a neural network denoiser 2318, a buffer 2320, or a combination thereof. The buffer 2320 may be a DDR memory buffer that supports lossless compression with a constant 75% compression that may be used to store raw DNG images. In one example, the SRO component 2312, the Bayer analyzer 2316, and the B2B component 2314 may perform raw pixel processing that includes two-dimensional (2D) denoising. In another example, the SRO component 2312, the neural network denoiser 2318, and the B2B component 2314 may perform raw pixel processing that includes 2D denoising.

The RGB processing component 2304 includes a B2R component 2322 and an HDR component 2324. The B2R component 2322 may be the B2R components 550 and 552 shown in FIG. 5. The HDR component 2324 may be the HDR component 555 shown in FIG. 5. The B2R component 2322 and the HDR component 2324 may be used to perform global tone mapping and local tone mapping.

The YUV processing component 2306 includes a CNR OFL component 2326, a CNR OTF component 2328, a warping component 2330, an MFNR component 2332, a neural network 2334, an image scaler 2336, an image scaler 2338, an image scaler 2340, a JPEG/H265 generator 2342, a JPEG generator 2344, and a JPEG generator 2346. The CNR OFL component 2326 may be the CNR OFL component 575 shown in FIG. 5. The CNR OFL component 2326 is configured to perform off the flight processing for global tone mapping and local tone mapping. The CNR OTF component 2328 is configured to perform on the flight processing, similar to video flow, for global tone mapping and local tone mapping. The warping component is configured to perform registration and ERS correction. The MFNR component 2332 or the neural network 2334 can be used to perform denoising. The neural network 2334 may perform 2D or 3D denoising. In some examples, the MFNR component 2332 and the neural network 2334 may be bypassed.

The image scaler 2336 is configured to obtain a denoised image and scale the denoised image to obtain a scaled image. The JPEG/H265 generator 2342 is configured to obtain the scaled imaged from the image scaler 2336 and generate and output a full resolution still image 2348. The image scaler 2338 is configured to obtain a denoised image and scale the denoised image to obtain a scaled image. The JPEG generator 2344 is configured to obtain the scaled image from the image scaler 2338 and generate and output a screennail image 2350. The image scaler 2340 is configured to obtain a denoised image and scale the denoised image to obtain a scaled image. The JPEG generator 2346 is configured to obtain the scaled image from the image scaler 2340 and generate and output a thumbnail image 2352.

Figure 24A:
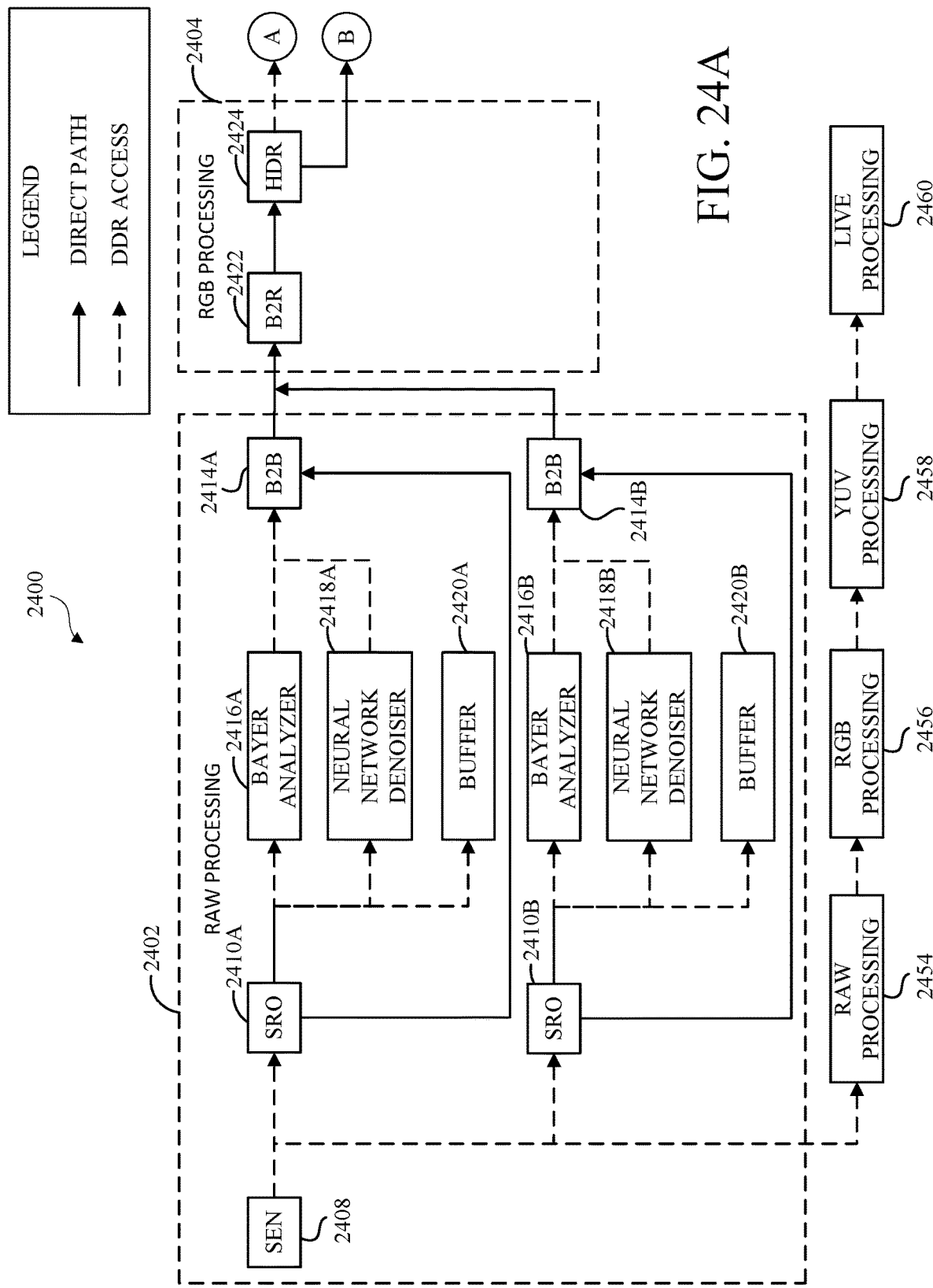
FIGS. 24A-B are a diagram of an example of an HDR still and preview use case processing flow in accordance with embodiments of this disclosure.
Figure 24B:
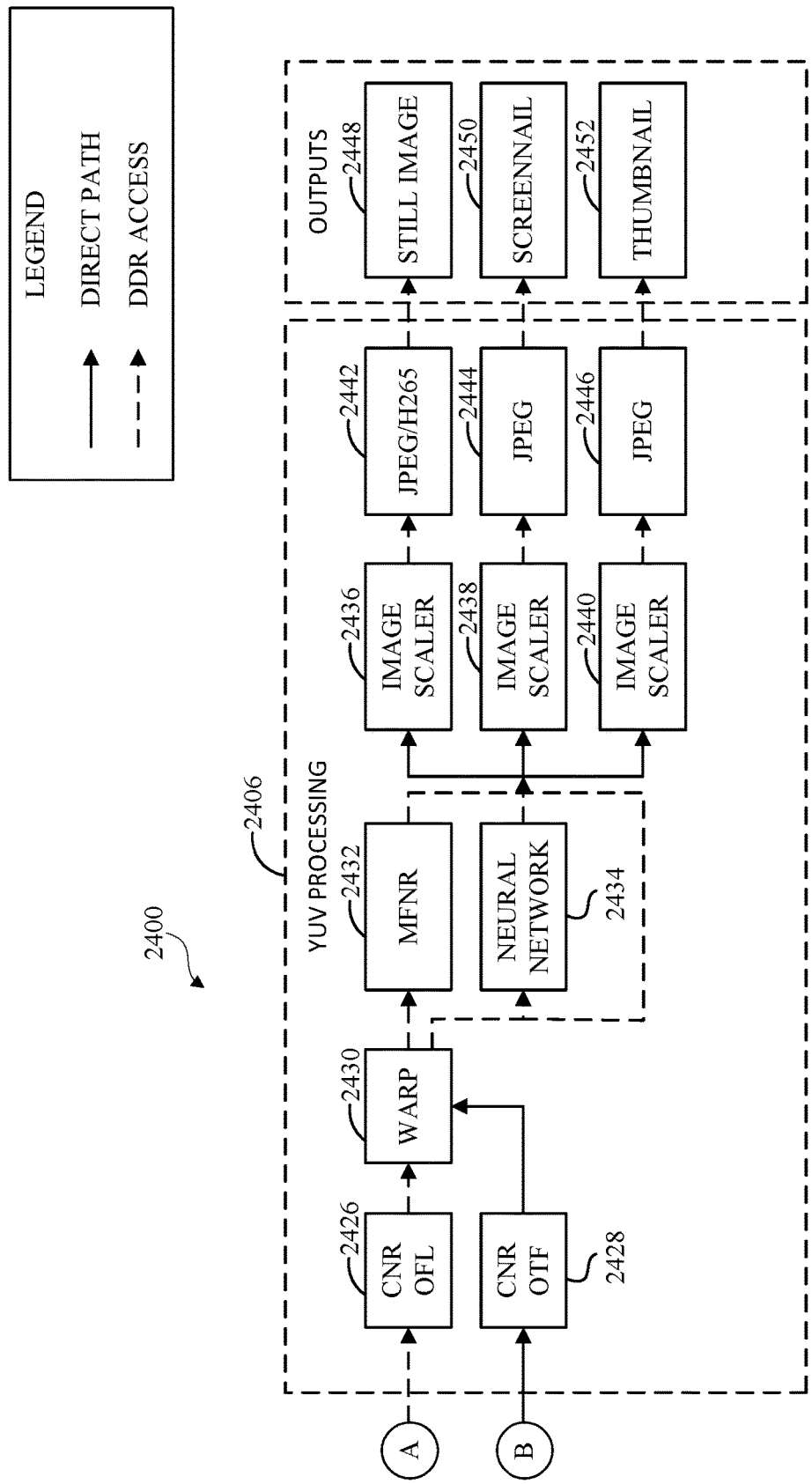

FIG. 24A-B are a diagram of an example of an HDR still and preview use case processing flow 2400 in accordance with embodiments of this disclosure. This example may support super photo HDR and timelapse still/video HDR. The HDR still and preview use case processing flow 2400 includes a raw processing component 2402, an RGB processing component 2404, and a YUV processing component 2406. The solid arrows shown in FIGS. 24A-B depict a direct access path in which access to a DDR memory buffer is not required. The direct access path remains on the image processor.

The raw processing component 2402 includes a SEN component 2408, SRO component 2410A, and B2B component 2414A. The SEN component 2408 may be the SEN component 505 shown in FIG. 5. The SRO component 2410A may be the SRO components 515 and 517 shown in FIG. 5. The SEN component 2408 and the SRO component 2410A are configured to perform raw pixel processing for the preview and the still image.

The B2B component 2414A may be the B2B component 540 shown in FIG. 5. In some implementations, the raw processing component 2402 may include a Bayer analyzer 2416A, a neural network denoiser 2418A, a buffer 2420A, or a combination thereof. The SRO component 2410A, B2B component 2414A, Bayer analyzer 2416A, neural network denoiser 2418A, and buffer 2420A are used for long exposure frames. The buffer 2420A may be a DDR memory buffer that supports lossless compression with a constant 75% compression that may be used to store raw DNG long exposure images. In one example, the SRO component 2412A, the Bayer analyzer 2416A, and the B2B component 2414A may perform raw pixel processing that includes 2D denoising. In another example, the neural network denoiser 2418A, and the B2B component 2414A may perform raw pixel processing that includes 2D denoising.

The SRO component 2410B may be the SRO components 515 and 517 shown in FIG. 5. The SEN component 2408 and the SRO component 2410B are configured to perform raw pixel processing for the preview and the still image.

The B2B component 2414B may be the B2B component 540 shown in FIG. 5. In some implementations, the raw processing component 2402 may include a Bayer analyzer 2416B, a neural network denoiser 2418B, a buffer 2420B, or a combination thereof. The SRO component 2410B, B2B component 2414B, Bayer analyzer 2416B, neural network denoiser 2418B, and buffer 2420B are used for short exposure frames. The buffer 2420B may be a DDR memory buffer that supports lossless compression with a constant 75% compression that may be used to store raw DNG short exposure images. In one example, the SRO component 2412B, the Bayer analyzer 2416B, and the B2B component 2414B may perform raw pixel processing that includes 2D denoising. In another example, the neural network denoiser 2418B, and the B2B component 2414B may perform raw pixel processing that includes 2D denoising.

The RGB processing component 2404 includes a B2R component 2422 and an HDR component 2424. The B2R component 2422 may be the B2R components 550 and 552 shown in FIG. 5. The HDR component 2424 may be the HDR component 555 shown in FIG. 5. The B2R component 2422 and the HDR component 2424 may be used to perform global tone mapping and local tone mapping.

The YUV processing component 2406 includes a CNR OFL component 2426, a CNR OTF component 2428, a warping component 2430, an MFNR component 2432, a neural network 2434, an image scaler 2436, an image scaler 2438, an image scaler 2440, a JPEG/H265 generator 2442, a JPEG generator 2444, and a JPEG generator 2446. The CNR OFL component 2426 may be the CNR OFL component 575 shown in FIG. 5. The CNR OFL component 2426 is configured to perform off the flight processing for global tone mapping and local tone mapping. The CNR OTF component 2428 is configured to perform on the flight processing, similar to video flow, for global tone mapping and local tone mapping. The warping component is configured to perform registration and ERS correction. The MFNR component 2432 or the neural network 2434 can be used to perform denoising. The neural network 2434 may perform 2D or 3D denoising. In some examples, the MFNR component 2432 and the neural network 2434 may be bypassed.

The image scaler 2436 is configured to obtain a denoised image and scale the denoised image to obtain a scaled image. The JPEG/H265 generator 2442 is configured to obtain the scaled imaged from the image scaler 2436 and generate and output a full resolution still image 2448. The image scaler 2438 is configured to obtain a denoised image and scale the denoised image to obtain a scaled image. The JPEG generator 2444 is configured to obtain the scaled image from the image scaler 2438 and generate and output a screennail image 2450. The image scaler 2440 is configured to obtain a denoised image and scale the denoised image to obtain a scaled image. The JPEG generator 2446 is configured to obtain the scaled image from the image scaler 2440 and generate and output a thumbnail image 2452.

The HDR still and preview processing flow 2400 includes a raw processing component 2454, an RGB processing component 2456, a YUV processing component 2458, and a live processing component 2460. The raw processing component 2454 may be the raw processing component 602 shown in FIG. 6. The RGB processing component 2456 may be the RGB processing component 604 shown in FIG. 6. The YUV processing component 2458 may be the YUV processing component 606 shown in FIG. 6. The live processing component 2460 may implement the live processing flow 1700 shown in FIG. 17, the live processing flow 1800 shown in FIG. 18, the live processing flow 1900 shown in FIG. 19, the live processing flow 2000 shown in FIG. 20, or the live processing flow 2100 shown in FIG. 21.

Figure 25A:
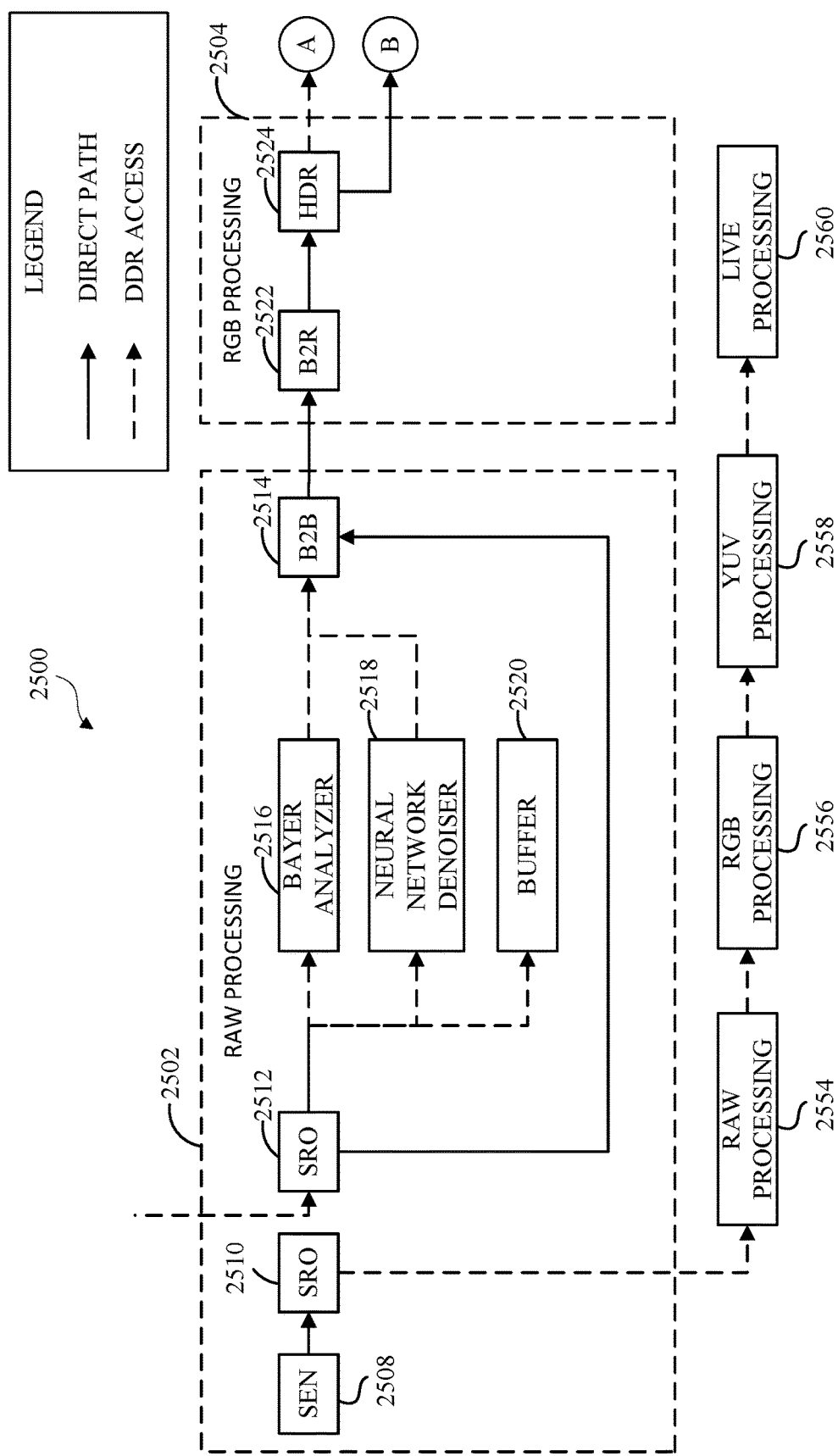
FIGS. 25A-B are a diagram of an example of a still background processing flow in accordance with embodiments of this disclosure.
Figure 25B:
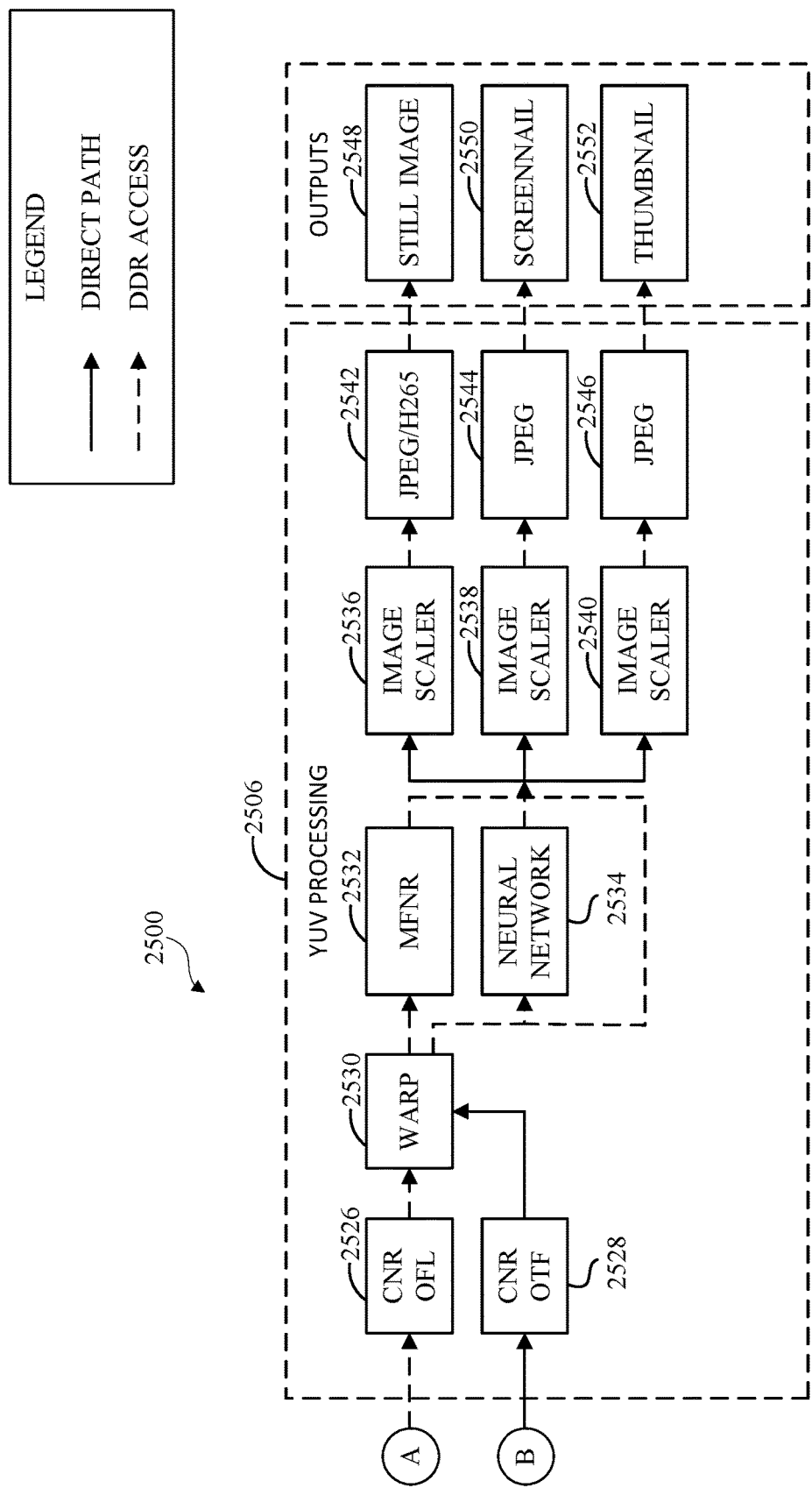

FIG. 25A-B are a diagram of an example of a still background processing flow 2500 in accordance with embodiments of this disclosure. In this example, a still (HDR) and preview use cases may be reused, and still delayed processing may be supplied from host firmware with previously stored RAW images to run background processing. The still background processing flow 2500 includes a raw processing component 2502, an RGB processing component 2504, and a YUV processing component 2506. The solid arrows shown in FIGS. 25A-B depict a direct access path in which access to a DDR memory buffer is not required. The direct access path remains on the image processor.

The raw processing component 2502 includes a SEN component 2508, SRO component 2510, SRO component 2512, and a B2B component 2514. The SEN component 2508 may be the SEN component 505 shown in FIG. 5. The SRO component 2510 may be the SRO components 515 and 517 shown in FIG. 5. The SEN component 2508 and the SRO component 2510 are configured to perform raw pixel processing for the preview and the still image. The SRO component 2512 is configured to obtain image data from a DDR memory buffer (not shown) via DDR access.

The B2B component 2514 may be the B2B component 540 shown in FIG. 5. In some implementations, the raw processing component 2502 may include a Bayer analyzer 2516, a neural network denoiser 2518, a buffer 2520, or a combination thereof. The buffer 2520 may be a DDR memory buffer that supports lossless compression with a constant 75% compression that may be used to store raw DNG images. In one example, the SRO component 2512, the Bayer analyzer 2516, and the B2B component 2514 may perform raw pixel processing that includes 2D denoising. In another example, the SRO component 2512, the neural network denoiser 2518, and the B2B component 2514 may perform raw pixel processing that includes 2D denoising.

The RGB processing component 2504 includes a B2R component 2522 and an HDR component 2524. The B2R component 2522 may be the B2R components 550 and 552 shown in FIG. 5. The HDR component 2524 may be the HDR component 555 shown in FIG. 5. The B2R component 2522 and the HDR component 2524 may be used to perform global tone mapping and local tone mapping.

The YUV processing component 2506 includes a CNR OFL component 2526, a CNR OTF component 2528, a warping component 2530, an MFNR component 2532, a neural network 2534, an image scaler 2536, an image scaler 2538, an image scaler 2540, a JPEG/H265 generator 2542, a JPEG generator 2544, and a JPEG generator 2546. The CNR OFL component 2526 may be the CNR OFL component 575 shown in FIG. 5. The CNR OFL component 2526 is configured to perform off the flight processing for global tone mapping and local tone mapping. The CNR OTF component 2528 is configured to perform on the flight processing, similar to video flow, for global tone mapping and local tone mapping. The warping component is configured to perform registration and ERS correction. The MFNR component 2532 or the neural network 2534 can be used to perform denoising. The neural network 2534 may perform 2D or 3D denoising. In some examples, the MFNR component 2532 and the neural network 2534 may be bypassed.

The image scaler 2536 is configured to obtain a denoised image and scale the denoised image to obtain a scaled image. The JPEG/H265 generator 2542 is configured to obtain the scaled imaged from the image scaler 2536 and generate and output a full resolution still image 2548. The image scaler 2538 is configured to obtain a denoised image and scale the denoised image to obtain a scaled image. The JPEG generator 2544 is configured to obtain the scaled image from the image scaler 2538 and generate and output a screennail image 2550. The image scaler 2540 is configured to obtain a denoised image and scale the denoised image to obtain a scaled image. The JPEG generator 2546 is configured to obtain the scaled image from the image scaler 2540 and generate and output a thumbnail image 2552.

The still background processing flow 2500 includes a raw processing component 2554, an RGB processing component 2556, a YUV processing component 2558, and a live processing component 2560. The raw processing component 2554 may be the raw processing component 602 shown in FIG. 6. The RGB processing component 2556 may be the RGB processing component 604 shown in FIG. 6. The YUV processing component 2558 may be the YUV processing component 606 shown in FIG. 6. The live processing component 2560 may implement the live processing flow 1700 shown in FIG. 17, the live processing flow 1800 shown in FIG. 18, the live processing flow 1900 shown in FIG. 19, the live processing flow 2000 shown in FIG. 20, or the live processing flow 2100 shown in FIG. 21.

FIG. 26 is a flow chart of an example of a method 2600 for a digital lens. The use cases and examples described herein may implement the method shown in FIG. 26. When image stabilization is performed, the method includes determining an image rotation at 2610. At 2620, the method includes mapping the image onto a sphere. Mapping the image onto the sphere may include undoing a sensor physical distortion. In some examples, a distortion model and FOV may be hardcoded as a digital lens. For example, a wide digital lens may have a defined distortion polynomia and FOV of approximately 110×64 deg. Accordingly, when a wide, a linear, or a superview is selected, the output FOV and lens effect may be constant, regardless or any adjustments on the ISLA lens structure. At 2630, the method includes applying an output distortion model and FOV to the image on the sphere. At 2640, the method includes compensating for electronic rolling shutter (ERS).

FIG. 27 is a flow diagram of an example of a method 2700 for use in an image capture device for common processing. At 2702, the method 2700 includes obtaining video data from an image sensor. At 2704, the method 2700 includes performing raw processing on the video data to obtain Bayer video data. The Bayer video data may be output via a direct path.

At 2706, the method 2700 includes performing RGB processing on the Bayer video data to obtain HDR video data. The HDR video data may be output via a direct path. At 2708, the method 2700 includes performing YUV processing on the HDR video data to obtain high resolution YUV video data and low resolution YUV video data. At 2710, the method 2700 includes storing the high resolution YUV video data in a buffer via DDR access. The buffer may include one or more DDR memory buffers. The buffer may support lossy compression with a constant 50% compression. At 2712, the method 2700 includes storing the low resolution YUV video data to a buffer via DDR access. The buffer for storing the low resolution YUV video data may be an uncompressed DDR memory buffer. In some implementations, the buffer for storing the low resolution YUV video data may be compressed depending on the use case. At 2714, the method 2700 includes performing delayed processing on the high resolution YUV video data. At 2716, the method 2700 includes performing live processing on the low resolution YUV video data.

FIG. 28 is a flow diagram of an example of a method 2800 for use in an image capture device for delayed processing. At 2802, the method 2800 includes obtaining high resolution YUV video data from a buffer. The high resolution YUV video data may be obtained via DDR access. The buffer may be a DDR memory buffer. The DDR memory buffer may be configured to support lossy compression with a constant 50% compression. At 2804, the method 2800 includes warping the high resolution YUV video data to obtain warped video data. The warped video data may be output via DDR access.

At 2806, the method 2800 includes performing noise reduction on the warped video data to obtain denoised video data. Performing the noise reduction includes obtaining the warped video data via DDR access. The warped video data may be accessed via one or more DDR memory buffers that support lossy compression with a constant 50% compression. In some implementations, the noise reduction may be a 3DNR. In this example, motion compensation is performed. In some implementations, motion estimation and motion compensation may be disabled. In some implementations, 3DNR may be passthrough (i.e., no denoising with minimal power). The denoised video data may be output via a direct path.

At 2808, the method 2800 includes scaling the denoised video data to obtain scaled video data. Scaling the denoised video data includes obtaining the denoised video data via the direct path. The denoised video data is scaled for a high resolution display. The scaled video data for a high resolution display may be output via DDR access.

At 2810, the method 2800 includes encoding the scaled video data for a high resolution display. Encoding the scaled video data may include obtaining the scaled video data via DDR access. The scaled video data may be accessed via one or more DDR memory buffers that support lossless compression with a constant 75% compression. The scaled video data is encoded for a high resolution display and high resolution video data is outputted.

FIG. 29 is a flow diagram of an example of a method 2900 for use in an image capture device for live processing. At 2902, the method 2900 includes obtaining low resolution video data from a buffer. The low resolution video data may be obtained via DDR access. The buffer may be an uncompressed DDR memory buffer. At 2904, the method 2900 includes warping the low resolution video data to obtain warped video data. At 2906, the method 2900 includes scaling the warped video data to obtain scaled video data. At 2908, the method 2900 includes outputting the scaled video data to a display of the image capture device, such as a front display, a back display, or both. In some examples, the scaled video data may be output to a display of a mobile device or output to an external display via a display port of the image capture device.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for use in an image capture device, the method comprising:
   obtaining first video data from an image sensor;
   performing raw processing on the first video data to obtain Bayer video data;
   performing RGB processing on the Bayer video data to obtain high dynamic range (HDR) video data;
   performing YUV processing on the HDR video data to obtain high resolution YUV video data and low resolution YUV video data;
   storing the high resolution YUV video data in a first double data rate (DDR) memory buffer;
   storing the low resolution YUV video data in a second DDR memory buffer;
   performing delayed processing on the high resolution YUV video data to obtain second video data to store in a memory; and
   performing live processing on the low resolution YUV video data to obtain third video data to display on a display of the image capture device.

2. The method of claim 1, further comprising:
   accessing the low resolution YUV video data via a first direct path;
   scaling the low resolution YUV video data to obtain scaled low resolution YUV video data; and
   storing the scaled low resolution YUV video data in the second DDR memory buffer.

3. The method of claim 2, wherein scaling the low resolution YUV video data includes performing a bilinear interpolation on the low resolution YUV video data.

4. The method of claim 3, further comprising:
   accessing the high resolution YUV video data via a second direct path;
   scaling the high resolution YUV video data to obtain scaled high resolution YUV video data; and
   storing the scaled high resolution YUV video data in the first DDR memory buffer.

5. The method of claim 4, wherein scaling the high resolution YUV video data includes performing a bi-cubic interpolation of the high resolution YUV video data.

6. The method of claim 1, wherein the delayed processing comprises:
obtaining the high resolution YUV video data from the first DDR memory buffer;
warping the high resolution YUV video data to obtained warped video data;
performing a noise reduction on the warped video data to obtain denoised video data;
scaling the denoised video data to obtain scaled video data; and
encoding the scaled video data.

7. The method of claim 6, wherein the noise reduction is a three-dimensional noise reduction.

8. The method of claim 1, wherein the first DDR memory buffer is configured to support lossy compression with a constant 50% compression.

9. The method of claim 1, wherein the second DDR memory buffer is an uncompressed DDR memory buffer.

10. An image capture device, comprising:
an image sensor configured to obtain first video data;
a first double data rate (DDR) memory buffer configured to support a constant lossy compression;
a second DDR memory buffer; and
a processor configured to:
obtain the first video data from the image sensor; and
process the first video data to obtain high resolution YUV video data and low resolution YUV video data;
wherein the first DDR memory buffer is configured to store the high resolution YUV video data and the second DDR memory buffer is configured to store the low resolution YUV video data;
wherein the processor is further configured to:
obtain the low resolution YUV video data from the second DDR memory buffer;
warp the low resolution YUV video data to obtain warped video data;
scale the warped video data to obtain scaled video data; and
output the scaled video data to a display of the image capture device.

11. The image capture device of claim 10, wherein the processor is further configured to:
access the low resolution YUV video data via a first direct path; and
scale the low resolution YUV video data to obtain scaled low resolution YUV video data; and
wherein the second DDR memory buffer is configured to store the scaled low resolution YUV video data.

12. The image capture device of claim 11, wherein the processor is further configured to:
perform a bilinear interpolation on the low resolution YUV video data to scale the low resolution YUV video data.

13. The image capture device of claim 12, wherein the processor is further configured to:
access the high resolution YUV video data via a second direct path; and
scale the high resolution YUV video data to obtain scaled high resolution YUV video data; and
wherein the first DDR memory buffer is configured to store the scaled high resolution YUV video data.

14. The image capture device of claim 13, wherein the processor is further configured to:
perform a bi-cubic interpolation on the high resolution YUV video data to scale the high resolution YUV video data.

15. The image capture device of claim 10, wherein the constant lossy compression is 50% compression.

16. The image capture device of claim 10, wherein the second DDR memory buffer is an uncompressed DDR memory buffer.

17. A non-transitory computer-readable medium comprising instructions stored on a memory, that when executed by a processor, cause the processor to perform operations comprising:
obtaining first video data from an image sensor;
performing raw processing on the first video data to obtain Bayer video data;
performing RGB processing on the Bayer video data to obtain high dynamic range (HDR) video data;
performing YUV processing on the HDR video data to obtain high resolution YUV video data and low resolution YUV video data;
storing the high resolution YUV video data in a first double data rate (DDR) memory buffer configured to support a constant lossy compression;
storing the low resolution YUV video data in a second DDR memory buffer; and
performing delayed processing on the high resolution YUV video data to obtain second video data to store in a memory, wherein performing the delayed processing comprises:
obtaining the high resolution YUV video data from the first DDR memory buffer;
warping the high resolution YUV video data to obtained warped video data;
performing a noise reduction on the warped video data to obtain denoised video data;
scaling the denoised video data to obtain scaled video data; and
encoding the scaled video data.

18. The non-transitory computer-readable medium of claim 17, wherein the noise reduction is a three-dimensional noise reduction.

19. The non-transitory computer-readable medium of claim 17, wherein the constant lossy compression is 50% compression.

20. The non-transitory computer-readable medium of claim 17, wherein the second DDR memory buffer is an uncompressed DDR memory buffer.

* * * * *